(12) United States Patent
Hagiwara

(10) Patent No.: US 12,174,479 B2
(45) Date of Patent: Dec. 24, 2024

(54) LIGHT MODULATING DEVICE

(71) Applicant: DAI NIPPON PRINTING CO., LTD., Tokyo-to (JP)

(72) Inventor: Yusuke Hagiwara, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/370,449

(22) Filed: Sep. 20, 2023

(65) Prior Publication Data

US 2024/0004231 A1 Jan. 4, 2024

Related U.S. Application Data

(63) Continuation of application No. 17/969,255, filed on Oct. 19, 2022, now Pat. No. 11,803,076, which is a continuation of application No. 17/194,719, filed on Mar. 8, 2021, now Pat. No. 11,556,028, which is a continuation of application No. 16/097,644, filed as
(Continued)

(30) Foreign Application Priority Data

| | | |
|---|---|---|
| May 24, 2016 | (JP) | 2016-103432 |
| Nov. 8, 2016 | (JP) | 2016-217888 |
| Nov. 21, 2016 | (JP) | 2016-226202 |

(51) Int. Cl.
*G02F 1/1335* (2006.01)
*G02F 1/13* (2006.01)
*G02F 1/1333* (2006.01)
*G02F 1/1334* (2006.01)
*G02F 1/1347* (2006.01)

(52) U.S. Cl.
CPC .............. *G02F 1/1334* (2013.01); *G02F 1/13* (2013.01); *G02F 1/1333* (2013.01); *G02F 1/1335* (2013.01); *G02F 1/133528* (2013.01); *G02F 1/13475* (2013.01); *G02F 2413/00* (2013.01)

(58) Field of Classification Search
CPC ........................ G02F 1/133528; G02F 1/1335
See application file for complete search history.

(56) References Cited

U.S. PATENT DOCUMENTS

| | | | | |
|---|---|---|---|---|
| 4,709,991 A | * | 12/1987 | Hoshikawa | ........... G02F 1/1333 349/122 |
| 5,327,271 A | | 7/1994 | Takeuchi et al. | |

(Continued)

FOREIGN PATENT DOCUMENTS

| | | |
|---|---|---|
| CN | 102473363 A | 5/2012 |
| CN | 103119505 A | 5/2013 |

(Continued)

OTHER PUBLICATIONS

Dec. 22, 2023 Office Action issued in Japanese Patent Application No. 2023-098325.
(Continued)

*Primary Examiner* — Jonathan Y Jung
(74) *Attorney, Agent, or Firm* — Oliff PLC

(57) ABSTRACT

A light modulating device including: a light transmissive plate having a curved surface; a light modulating cell; and an optically transparent adhesive film which is disposed between the curved surface of the light transmissive plate and the light modulating cell and attaches one side of the light modulating cell to the curved surface of the light transmissive plate.

21 Claims, 31 Drawing Sheets

Related U.S. Application Data application No. PCT/JP2017/011214 on Mar. 21, 2017, now Pat. No. 11,003,007.

(56) References Cited

U.S. PATENT DOCUMENTS

| | | | |
|---|---|---|---|
| 5,847,798 | A | 12/1998 | Yang et al. |
| 5,959,762 | A | 9/1999 | Bandettini et al. |
| 6,128,056 | A | 10/2000 | Kubota et al. |
| 6,204,907 | B1 | 3/2001 | Hiraishi et al. |
| 6,621,550 | B1 | 9/2003 | Arakawa et al. |
| 6,836,313 | B2 | 12/2004 | Ishizaki |
| 2003/0142057 | A1 | 7/2003 | Niiyama et al. |
| 2004/0070704 | A1 | 4/2004 | Lazarev et al. |
| 2005/0164470 | A1* | 7/2005 | Yamazaki ............ G02F 1/1339 438/455 |
| 2005/0206832 | A1* | 9/2005 | Tahara ................. G02F 1/1334 349/182 |
| 2007/0058114 | A1 | 3/2007 | Niiyama et al. |
| 2008/0158448 | A1 | 7/2008 | Fernando et al. |
| 2008/0284948 | A1* | 11/2008 | Koishi ............... G02F 1/13363 359/489.07 |
| 2009/0093562 | A1* | 4/2009 | Tanikawa ............ C08G 59/18 522/71 |
| 2012/0020056 | A1* | 1/2012 | Yamagata ............ G09F 9/33 361/679.01 |
| 2012/0257123 | A1 | 10/2012 | Lee |
| 2013/0107193 | A1 | 5/2013 | Hamada et al. |
| 2013/0141656 | A1 | 6/2013 | Kujawa et al. |
| 2014/0340609 | A1 | 11/2014 | Taylor et al. |
| 2015/0314573 | A1 | 11/2015 | Niiyama |
| 2015/0351272 | A1 | 12/2015 | Wildner et al. |
| 2017/0097537 | A1 | 4/2017 | Park et al. |

FOREIGN PATENT DOCUMENTS

| | | |
|---|---|---|
| CN | 203037966 U | 7/2013 |
| CN | 104657707 A | 5/2015 |
| EP | 2006-343515 A | 12/2006 |
| EP | 1 762 885 A2 | 3/2007 |
| EP | 2 515 164 A1 | 10/2012 |
| JP | S61-201216 A | 9/1986 |
| JP | S64-2219 U | 1/1989 |
| JP | H02-150818 A | 6/1990 |
| JP | H04-66284 U | 6/1992 |
| JP | H04-247426 A | 9/1992 |
| JP | H05-173160 A | 7/1993 |
| JP | H105-263572 A | 10/1993 |
| JP | H06-018856 A | 1/1994 |
| JP | H06-160823 A | 6/1994 |
| JP | H07-135383 A | 5/1995 |
| JP | H08-511109 A | 11/1996 |
| JP | H09-61780 A | 3/1997 |
| JP | H10-86262 A | 4/1998 |
| JP | 2003-320617 A | 11/2003 |
| JP | 2004-163837 A | 6/2004 |
| JP | 3105679 U | 11/2004 |
| JP | 2005-202391 A | 7/2005 |
| JP | 2005-530185 A | 10/2005 |
| JP | 2006-003453 A | 1/2006 |
| JP | 2006-301018 A | 11/2006 |
| JP | 2006-330100 A | 12/2006 |
| JP | 2007-061446 A | 3/2007 |
| JP | 2007-78870 A | 3/2007 |
| JP | 2007-102210 A | 4/2007 |
| JP | 2008-213409 A | 9/2008 |
| JP | 2008-231358 A | 10/2008 |
| JP | 2009-036967 A | 2/2009 |
| JP | 2009-046525 A | 3/2009 |
| JP | 2009-237212 A | 10/2009 |
| JP | 2010-009017 A | 1/2010 |
| JP | 3156807 U | 1/2010 |
| JP | 2010-044200 A | 2/2010 |
| JP | 2011-059266 A | 3/2011 |
| JP | 2011-105829 A | 6/2011 |
| JP | 2011-189751 A | 9/2011 |
| JP | 2011-228137 A | 11/2011 |
| JP | 2011-252934 A | 12/2011 |
| JP | 2012-221858 A | 11/2012 |
| JP | 2013-531276 A | 8/2013 |
| JP | 2014-182287 A | 9/2014 |
| JP | 2015-007699 A | 1/2015 |
| JP | 2015-168585 A | 9/2015 |
| JP | 2015-210418 A | 11/2015 |
| JP | 3203546 U | 4/2016 |
| JP | 5910788 B1 | 4/2016 |
| JP | 2016-161862 A | 9/2016 |
| JP | 2016-164617 A | 9/2016 |
| KR | 10-2011-0125297 A | 11/2011 |
| KR | 10-2014-0097661 A | 8/2014 |
| WO | 2010/100807 A1 | 9/2010 |
| WO | 2012/042787 A1 | 4/2012 |
| WO | 2012/077806 A1 | 6/2012 |
| WO | 2016-181756 A1 | 11/2016 |

OTHER PUBLICATIONS

Mar. 22, 2024 Office Action issued in Japanese Patent Application No. 2023-098325.
Sep. 16, 2016 Office Action issued in Japanese Patent Application No. 2016-103432.
Dec. 9, 2016 Office Action issued in Japanese Patent Application No. 2016-217888.
Mar. 3, 2017 Office Action issued in Japanese Patent Application No. 2016-226202.
Jul. 4, 2017 Office Action issued in Japanese Patent Application No. 2016-226202.
Dec. 15, 2017 Office Action issued in Japanese Patent Application No. 2017-222076.
Sep. 4, 2018 Office Action issued in Japanese Patent Application No. 2018-035352.
Nov. 27, 2018 International Preliminary Report on Patentability issued in International Patent Application No. PCT/JP2017/011214.
Jun. 6, 2017 International Search Report issued in International Patent Application No. PCT/JP2017/011214.
Jul. 2, 2019 Report of Preliminary Reconsideration by Examiner before Appeal issued in Japanese Patent Application No. 2018-035352.
Oct. 22, 2018 Notification of Reason for Revocation issued in Japanese Patent No. 6245537 (Japanese Patent Application No. 2016-226202).
May 16, 2019 Notification of Reason for Revocation issued in Japanese Patent No. 6245537 (Japanese Patent Application No. 2016-226202).
Oct. 24, 2019 Communication pursuant to Rule 114(2) EPC issued in European Patent Application No. 17802411.3.
Nov. 29, 2019 Extended Search Report issued in European Patent Application No. 17802411.3.
Nov. 1, 2019 Information Offer Form submitted by third party in Japanese Patent Application No. 2018-035352.
Jan. 8, 2020 Decision on Patent Opposition issued in Japanese Patent No. 6245537.
Feb. 28, 2020 Trial Decision issued in Japanese Patent Application No. 2018-035352.
Jul. 30, 2020 Office Action issued in European Patent Application No. 17 802 411.3.
Jun. 26, 2023 Written Decision on Dismissal of Amendment issued in Korean Patent Application No. 2022-7009724.
Oct. 9, 2020 Office Action issued in Japanese Patent Application No. 2019-079389.
Jan. 26, 2021 Office Action issued in Korean Patent Application No. 10-2018-7027002.
Mar. 2, 2021 Office Action issued in Chinese Patent Application No. 2017800195891.
Jan. 25, 2021 Office Action issued in European Application No. 17 802 411.3.
May 14, 2021 Office Action issued in Japanese Patent Application No. 2019-079389.

(56) References Cited

OTHER PUBLICATIONS

Jul. 12, 2021 Office Action issued in Korean Patent Application No. 10-2018-7027002.
Aug. 12, 2021 Office Action issued in Chinese Patent Application No. 201780019589.1.
Sep. 22, 2021 Reconsideration Report by Examiner before Appeal issued in Japanese Patent Application No. 2019-079389.
Nov. 16, 2021 Office Action issued in Japanese Patent Application No. 2020-203602.
Dec. 28, 2021 Office Action isssued in Korean Patent Application No. 10-2018-7027002.
Dec. 28, 2021 Office Action issued in Chinese Patent Application No. 201780019589.1.
Feb. 16, 2022 Search Report issued in European Patent Application No. 21214829.0.
Apr. 2, 2022 Office Action issued in Chinese Patent Application No. 201780019589.1.
Jun. 7, 2022 Office Action issued in Japanese Patent Application No. 2019-79389.
May 27, 2022 Office Action issued in Japanese Patent Application No. 2020-203602.
May 23, 2022 Office Action issued in Korean Patent Application No. 2022-7009724.
Oct. 18, 2022 Office Action issued in Japanese Patent Application No. 2020-203602.
Nov. 18, 2022 Office Action issued in Japanese Patent Application No. 2019-079389.
Nov. 28, 2022 Office Action issued in Korean Patent Application No. 2022-7009724.
Feb. 21, 2023 Office Action issued in Japanese Patent Application No. 2020-203602.
Jun. 26, 2023 Office Action issued in Korean Patent Application No. 2022-7009724.
May 16, 2024 Office Action issued in Korean Patent Application No. 10-2023-7033649.
Jun. 5, 2024 Office Action issued in Chinese Patent Application No. 202210843429.1.
Jun. 25, 2024 Office Action issued in Japanese Patent Application No. 2023-098325.

* cited by examiner

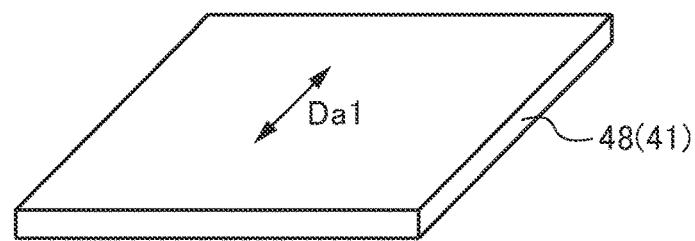
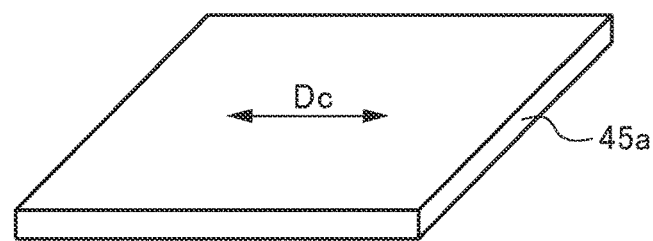
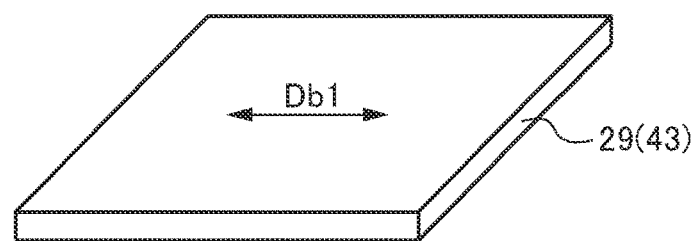
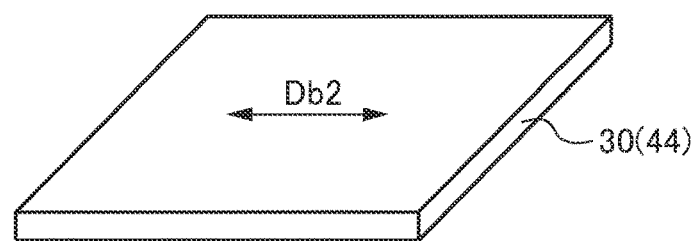
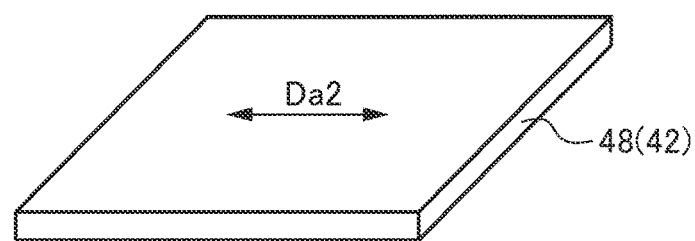
FIG. 9

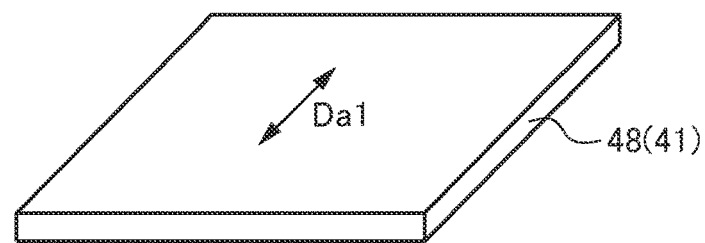
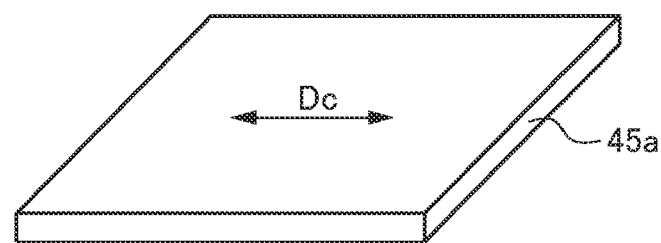
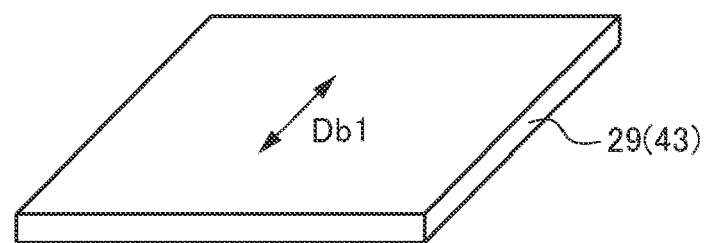
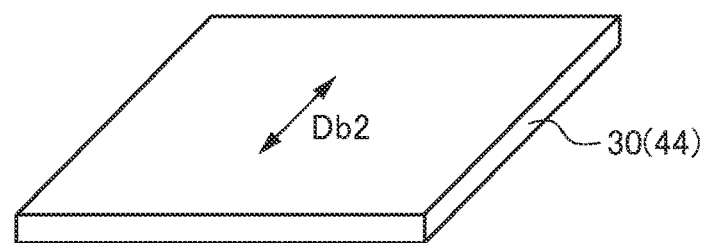
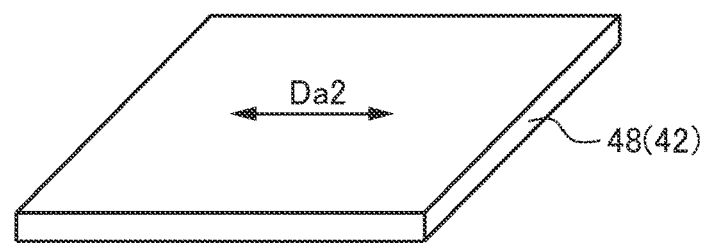
FIG. 10

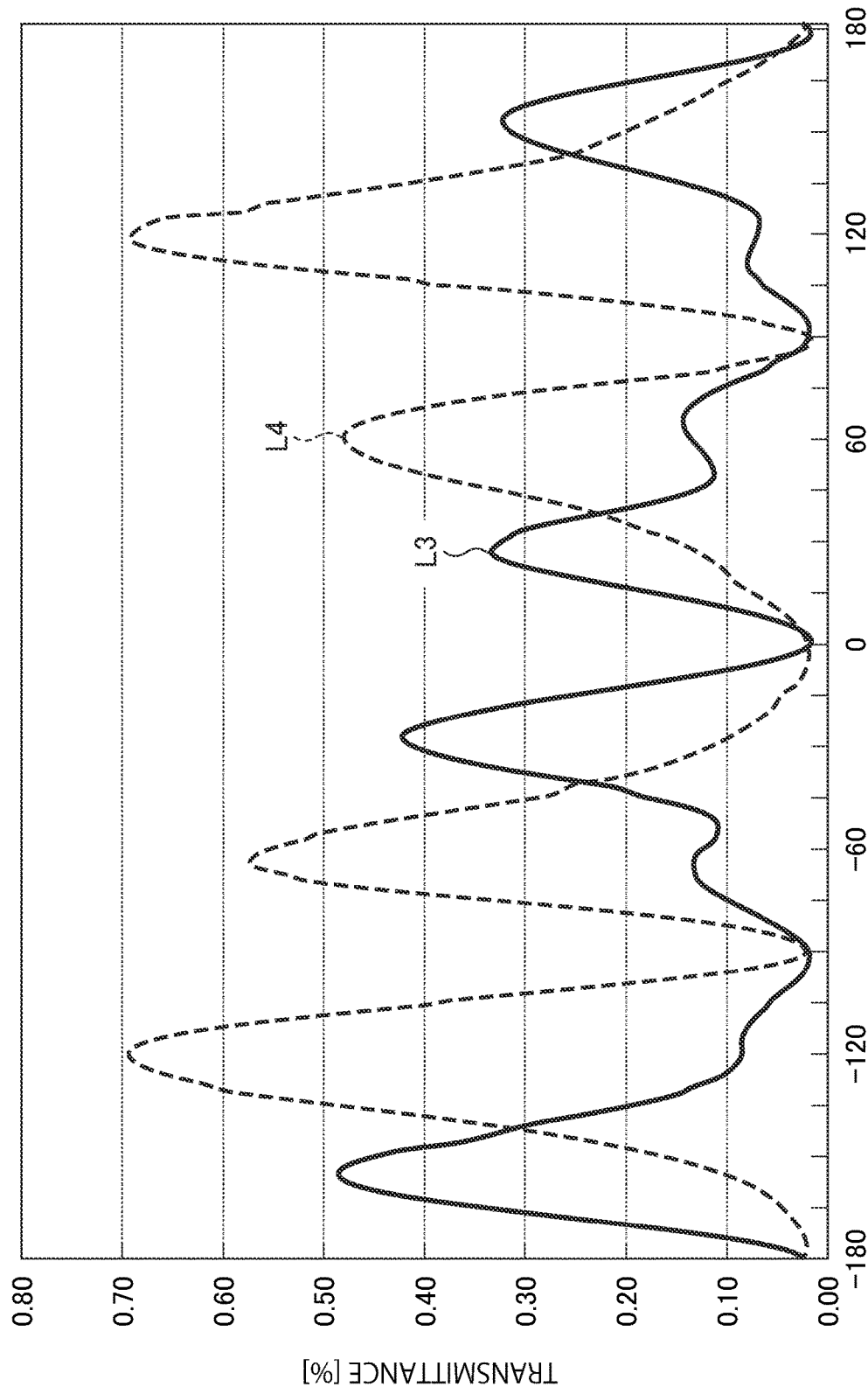

| | EXAMPLE 1 | EXAMPLE 2 | EXAMPLE 3 |
|---|---|---|---|
| SIZE OF LIGHT TRANSMISSIVE PLATE (X DIRECTION LENGTH × Y DIRECTION LENGTH × Z DIRECTION LENGTH) | 466mm × 358mm × 2mm | 423mm × 337mm × 0.7mm | 423mm × 337mm × 0.7mm |
| CURVATURE OF CURVED SURFACE OF LIGHT TRANSMISSIVE PLATE | 1800R | 1400R | 1400R |
| PLANAR SIZE OF LIGHT MODULATING CELL | 280mm × 288mm | 280mm × 280mm | 280mm × 288mm |
| LIQUID CRYSTAL DRIVE MODE | TN | VA | TN |
| THICKNESS OF LIGHT MODULATING CELL | 0.63mm | 0.54mm | 0.63mm |
| SUBSTRATE | POLYCARBONATE | COP | POLYCARBONATE |
| SPACER | BEAD SHAPE | COLUMNAR SHAPE | BEAD SHAPE |
| LENGTH OF WIDTH OF SEALING MEMBER | 1.5mm | 5mm | 1.5mm |
| PASTING STATE | Good | Not Good | Good |

| | EXAMPLE 4 | EXAMPLE 5 | EXAMPLE 6 | EXAMPLE 7 | EXAMPLE 8 | EXAMPLE 9 |
|---|---|---|---|---|---|---|
| SUBSTRATE | COP | POLYCARBONATE | COP | COP | POLYCARBONATE | POLYCARBONATE |
| SPACER | COLUMNAR SHAPE | COLUMNAR SHAPE | COLUMNAR SHAPE | COLUMNAR SHAPE | COLUMNAR SHAPE | BEAD SHAPE |
| SEAL WIDTH | 5mm (+MARGIN OF 5 mm) | 5mm (+MARGIN OF 5 mm) | 5mm (+MARGIN OF 5 mm) | 1.5mm (+MARGIN OF 0 mm) | 1.5mm (+MARGIN OF 0 mm) | 1.5mm (+MARGIN OF 0 mm) |
| FIRST POLARIZING PLATE | IODINE-BASED (WITH COP BIAXIAL COMPENSATION PLATE) | IODINE-BASED (WITH COP BIAXIAL COMPENSATION PLATE) | DYE-BASED | IODINE-BASED (WITH COP BIAXIAL COMPENSATION PLATE) | DYE-BASED | DYE-BASED |
| SECOND POLARIZING PLATE | IODINE-BASED | IODINE-BASED | DYE-BASED | IODINE-BASED | DYE-BASED | DYE-BASED |
| PASTING STATE | Very Bad | Bad | Average | Good | Excellent | Excellent |

| | OCA THICKNESS ($\mu$m) | STORAGE MODULUS (Pa) | LOSS TANGENT | PASTING STATE OF LIGHT MODULATING CELL |
|---|---|---|---|---|
| EXAMPLE 10 | 250 | $2.9 \times 10^7$ (25°C) | 0.95 (25°C) | Average |
| | | $2.5 \times 10^6$ (50°C) | 0.66 (50°C) | |
| EXAMPLE 11 | 250 | $1.1 \times 10^7$ (25°C) | 0.90 (25°C) | Good |
| | | $2.1 \times 10^6$ (50°C) | 0.89 (50°C) | |
| EXAMPLE 12 | 200 | $4.6 \times 10^7$ (25°C) | 0.41 (25°C) | Excellent |
| | | $1.2 \times 10^7$ (50°C) | 0.58 (50°C) | |

FIG. 14

|  | EXAMPLE 13 | EXAMPLE 14 | EXAMPLE 15 | EXAMPLE 16 | EXAMPLE 17 | EXAMPLE 18 | EXAMPLE 19 | EXAMPLE 20 | EXAMPLE 21 | EXAMPLE 22 | EXAMPLE 23 |
|---|---|---|---|---|---|---|---|---|---|---|---|
| Xs (μm) | 22.2 | 16.9 | 16.9 | 16.9 | 40.2 | 40.2 | 40.2 | 16.9 | 16.9 | 40.2 | 40.2 |
| Xf (μm) | 24.8 | 11.8 | 24.8 | 35.9 | 11.8 | 24.8 | 35.9 | 10.2 | 38.5 | 10.2 | 38.5 |
| CELL GAP DECREASE | G | G | G | G | G | G | G | G | N | G | N |
| FILM PENETRATION | G | G | G | G | G | G | G | G | G | N | G |
| SCRATCH | G | G | G | G | G | G | G | N | N | N | N |
| CRACK | G | G | G | G | G | G | G | N | G | N | N |

FIG. 16

| | EXAMPLE 24 | EXAMPLE 25 | EXAMPLE 26 | EXAMPLE 27 | EXAMPLE 28 | EXAMPLE 29 | EXAMPLE 30 | EXAMPLE 31 | EXAMPLE 32 | EXAMPLE 33 |
|---|---|---|---|---|---|---|---|---|---|---|
| Xs (μm) | 16.9 | 22.2 | 40.2 | 16.9 | 22.2 | 40.2 | 14.8 | 51.4 | 14.8 | 51.4 |
| Xf (μm) | 11.8 | 11.8 | 11.8 | 35.9 | 35.9 | 35.9 | 11.8 | 11.8 | 35.9 | 35.9 |
| CELL GAP DECREASE | G | G | G | G | G | G | N | N | N | G |
| FILM PENETRATION | G | G | G | G | G | G | N | N | G | G |
| SCRATCH | G | G | G | G | G | G | N | G | G | N |
| CRACK | G | G | G | G | G | G | N | G | G | G |

FIG. 17

| Xs | PHOTORESIST MATERIAL | MANUFACTURING CONDITION OF SPACER ||||
|---|---|---|---|---|---|
| | | HEATING TEMPERATURE IN COATING STEP [°C] | HEATING TIME IN COATING STEP [MIN] | EXPOSURE LIGHT AMOUNT [mJ] | EXPOSURE TIME [SEC] |
| 14.8 | ACRYLIC POSITIVE PHOTORESIST | 130 | 30 | 80 | 20 |
| 16.9 | | 130 | 60 | 90 | 23 |
| 22.2 | | 130 | 60 | 100 | 25 |
| 40.2 | | 140 | 60 | 150 | 38 |
| 51.4 | | 140 | 120 | 150 | 38 |

FIG. 18

| Xf | MANUFACTURING CONDITION OF ALIGNMENT LAYER | |
|---|---|---|
| | HEATING TEMPERATURE OF THERMAL CURING [°C] | HEATING TIME OF THERMAL CURING [MIN] |
| 10.2 | 110 | 30 |
| 11.8 | 120 | 10 |
| 24.8 | 120 | 30 |
| 35.9 | 130 | 30 |
| 38.5 | 130 | 60 |

FIG. 19

LIGHT MODULATING DEVICE

CROSS REFERENCE TO RELATED APPLICATIONS

This is a Continuation of application Ser. No. 17/969,255 filed Oct. 19, 2022, which in turn is a Continuation of application Ser. No. 17/194,719 filed Mar. 8, 2021 (issued as U.S. Pat. No. 11,556,028), which in turn is a Continuation of application Ser. No. 16/097,644 filed Oct. 30, 2018 (issued as U.S. Pat. No. 11,003,007), which in turn is a national stage entry of PCT/JP2017/011214 filed Mar. 21, 2017, which claims priority to JP 2016-226202 filed Nov. 21, 2016, JP 2016-217888 filed Nov. 8, 2016, and JP 2016-103432 filed May 24, 2016. The disclosure of the prior applications is hereby incorporated by reference herein in its entirety.

TECHNICAL FIELD

The present invention relates to a light modulating device capable of adjusting a light transmittance, and more particularly, to a light modulating device including a light modulating cell of a liquid crystal drive system attached to a curved surface.

BACKGROUND ART

Conventionally, a light modulating device capable of changing a light transmittance has been known, for example, a suspended particle device (SPD) using suspended particles whose alignment state fluctuates depending on whether or not an electric field is applied has been known. In addition, an electrochromic (EC) light modulating device, a light modulating device using polymer dispersed liquid crystal (PDLC), a gas chromic light modulating device, a thermochromic light modulating device, a photochromic light modulating device, and the like are also known.

For example, JP 2011-189751 A discloses a laminate film used for the SPD. In the SPD described in JP 2011-189751 A, a suspension in which suspended particles are mixed in a liquid medium is used, and the particles are randomly disposed to block light transmission in a power-off state where no electric field is applied. On the other hand, the particles are aligned, and most of light incident on the SPD (cell) transmits through the SPD in a power-on state where the electric field is applied. Therefore, a user can change the light transmittance of the SPD by controlling the electric field to be applied to the suspension.

SUMMARY OF INVENTION

Technical Problem

A system that uses a liquid crystal and a polarizing plate in addition to the above-described SPD can be considered as a system that adjusts a light transmittance by a light modulating cell. The light modulating cell of such a type that uses the liquid crystal and the polarizing plate can be simply configured, and an extremely high light shielding performance can be secured.

For example, when a light modulating cell is applied to a window of a vehicle or the like, a transmittance of light in a visible light wavelength range (that is, visible rays) is required to be suppressed to less than 1% in order to appropriately shield sunlight at the time of light shielding, and there is also a case that the transmittance is required to be suppressed to 0.5% or less depending on cases. However, the light modulating cell using the above-described SPD is not necessarily suitable for applications such as the vehicle in terms of light shielding performance since the transmittance of visible rays at the time of light shielding is about 1% to 5%. On the other hand, the light modulating cell using the polarizing plate has light shielding performance sufficient for practical use in applications such as the vehicle since the transmittance of visible rays at the time of light shielding can be set to 0.1% or less.

In addition, when the light modulating cell using the SPD and the light modulating cell using the polarizing plate are compared, the light modulating cell using the polarizing plate is superior in various aspects such as a design, cost, a drive voltage, and drive speed. For example, a color of the light modulating cell using the SPD at the time of light shielding is "blue", whereas s color of the light modulating cell using the polarizing plate at the time of light shielding is "black". In general, it is easier to harmonize colors with black than blue, and it is easier to select a color of another object to be disposed around the light modulating cell from the viewpoint of design characteristics. In addition, manufacturing cost is higher, a drive voltage is higher, and drive speed is slower in the light modulating cell using the SPD than those of the light modulating cell using the polarizing plate.

Since the light modulating cell using the polarizing plate is superior to the light modulating cell using the SPD in terms of performance in various aspects, the "light modulating cell using the polarizing plate" is extremely advantageous.

On the other hand, a need for a light modulating cell applicable not only to a flat surface but also to a curved surface has increased in order to make the light modulating cell applicable to various applications. Thus, there is a demand for a technique to appropriately apply the "light modulating cell using the polarizing plate" capable of securing desired light-transmitting characteristics and light-shielding characteristics to the curved surface.

In general, a glass substrate is widely used as a substrate holding an electrode configured to control the alignment of a liquid crystal member, but the glass substrate is a member which is extremely hard and has no flexibility. Thus, a light modulating cell including the glass substrate has a fixed shape and it is difficult to change the shape of the light modulating cell after manufacturing the light modulating cell. Therefore, the light modulating cell using the glass substrate can be effectively applied to the flat surface, but is not necessarily applicable to a curved surface having various curvatures appropriately. On the other hand, when a resin substrate having excellent flexibility is used instead of the glass substrate, it is possible to change the shape of the light modulating cell even after manufacturing the light modulating cell, and it is also possible to bend the light modulating cell in accordance with the curved surface to be attached.

However, it is not always easy to properly paste the light modulating cell constituted by a plurality of members having different stiffnesses and elasticities to the curved surface, and there is a case where distortion such as wrinkles sometimes occurs in the sheet-shaped light modulating cell at the time of attachment. Such distortion such as wrinkles affects optical characteristics of the light modulating cell to impair not only the original light transmitting performance and light shielding performance but also impair a product design, which is not preferable.

The light modulating cell using the SPD as disclosed in the above-described JP 2011-189751 A can be formed into a curved surface shape, but is not a type of being pastable to an object to be attached, so that it is necessary to make the light modulating cell in a predetermined shape, and it is difficult to flexibly deal with various surface shapes.

The present invention has been made in view of the above circumstances, and an object thereof is to provide a light modulating device capable of appropriately attaching a light modulating cell to a curved surface and having high light transmitting performance and light shielding performance.

Solution to Problem

An aspect of the present invention relates to a light modulating device including: a light transmissive plate having a curved surface and containing an ultraviolet ray inhibiting component which inhibits transmission of an ultraviolet ray; a light modulating cell; and an optically transparent adhesive film which is disposed between the curved surface of the light transmissive plate and the light modulating cell and attaches one side of the light modulating cell to the curved surface of the light transmissive plate. In the light modulating device, the light modulating cell includes: a first polarizing plate; a second polarizing plate provided at a position apart from the light transmissive plate farther than the first polarizing plate; a hard coat layer provided at a position apart from the light transmissive plate farther than the second polarizing plate; a first resin substrate disposed on a side of the first polarizing plate and a second resin substrate disposed on a side of the second polarizing plate, which are provided between the first polarizing plate and the second polarizing plate; a first electrode layer disposed on a side of the first resin substrate and a second electrode layer disposed on a side of the second resin substrate, which are provided between the first resin substrate and the second resin substrate; a first alignment layer disposed on the first electrode layer side and a second alignment layer disposed on the second electrode layer side which are provided between the first electrode layer and the second electrode layer; a sealing member provided between the first alignment layer and the second alignment layer and defining a liquid crystal space between the first alignment layer and the second alignment layer; and a liquid crystal layer provided in the liquid crystal space.

The curved surface of the light transmissive plate may be a three-dimensional curved surface.

Preferably, a thickness of the optically transparent adhesive film in a direction in which the optically transparent adhesive film and the light modulating cell are stacked is not less than 50 μm and not more than 500 μm, and preferably not less than 200 μm and not more than 300 μm, and more preferably, a storage elastic modulus of the optically transparent adhesive film in a room temperature environment (for example, 1 to 30° C. (particularly 15 to 25° C.)) is not less than $1 \times 10^7$ Pa and not more than $1 \times 10^8$ Pa. Incidentally, a loss tangent (tan δ) of the optically transparent adhesive film is preferably not less than 0.5 and not more than 1.5, and more preferably, not less than 0.7 and not more than 1.2. The "loss tangent" referred to herein is expressed as a ratio of a storage shear modulus (G') and a loss shear modulus (G") (for example, "G"/G'").

At least one of the first resin substrate and the second resin substrate may contain polycarbonate or a cyclo olefin polymer.

A length of the sealing member in a direction perpendicular to a direction in which the first alignment layer, the sealing member, and the second alignment layer are stacked may be not less than 1 mm and not more than 5 mm.

It is preferable that the liquid crystal layer is preferably at the same pressure as the atmospheric pressure, and it is more preferable to set the interior of the liquid crystal layer to a negative pressure with respect to the atmospheric pressure.

The light modulating device may further include a phase difference compensation film provided in at least any one of a space between the first polarizing plate and the first electrode layer and a space between the second polarizing plate and the second electrode layer.

The liquid crystal layer may be a liquid crystal layer of a VA type, a TN type, an IPS type, or an FFS type.

An optical axis of the first resin substrate may be perpendicular to an optical axis of the second resin substrate, the optical axis of the first resin substrate and an absorption axis of the first polarizing plate may be parallel to each other, and the optical axis of the second resin substrate and an absorption axis of the second polarizing plate may be parallel to each other.

An optical axis of the first resin substrate and an optical axis of the second resin substrate may be parallel to each other, the optical axis of the first resin substrate may be perpendicular to an absorption axis of the first polarizing plate, and the optical axis of the second resin substrate and an absorption axis of the second polarizing plate may be parallel to each other.

The light modulating device may further include a phase difference compensation film provided between the first resin substrate and the first polarizing plate. The absorption axis of the first polarizing plate may be perpendicular to the absorption axis of the second polarizing plate, the phase difference compensation film may function as an A-plate, and a slow-axis direction of the phase difference compensation film may be parallel to the optical axis of the first resin substrate, the optical axis of the second resin substrate, and the absorption axis of the second polarizing plate. In addition, the light modulating device may further include a phase difference compensation film provided between the second resin substrate and the second polarizing plate, the absorption axis of the first polarizing plate may be perpendicular to the absorption axis of the second polarizing plate, the phase difference compensation film may function as an A-plate, and a slow-axis direction of the phase difference compensation film may be parallel to the optical axis of the first resin substrate, the optical axis of the second resin substrate, and the absorption axis of the first polarizing plate.

The light modulating device may further include a plurality of spacers which are disposed in at least the liquid crystal space and support the first alignment layer and the second alignment layer. When a Vickers hardness value of each of the plurality of spacers is represented by Xs and a Vickers hardness value of a portion of the first alignment layer on which a distal end of each of the plurality of spacers abuts is represented by Xf, $16.9 \leq Xs \leq 40.2$ may be satisfied, and $11.8 \leq Xf \leq 35.9$ may be satisfied.

Another aspect of the present invention relates to a light modulating device which includes: a light transmissive plate having a curved surface; a light modulating cell; and an optically transparent adhesive film which is disposed between the curved surface of the light transmissive plate and the light modulating cell and attaches one side of the light modulating cell to the curved surface of the light transmissive plate, and in which the light modulating cell has a liquid crystal layer containing a dichroic dye.

Another aspect of the present invention relates to a light modulating device including: a light transmissive plate having a curved surface; a light modulating cell; and an optically transparent adhesive film which is disposed between the curved surface of the light transmissive plate and the light modulating cell and attaches one side of the light modulating cell to the curved surface of the light transmissive plate. The light modulating cell includes: a first laminated body including a first substrate and a first transparent electrode and a first alignment layer which are provided on the first substrate; a second laminated body including a second substrate and a second alignment layer provided on the second substrate; and a liquid crystal layer provided between the first laminated body and the second laminated body. Each of the first laminated body and the second laminated body includes an E-shaped linear polarizing plate.

The linear polarizing plate of the first laminated body may be provided on a side of the liquid crystal layer on the first substrate, and the linear polarizing plate of the second laminated body may be provided on a side of the liquid crystal layer on the second substrate.

In the first laminated body, the first transparent electrode, the linear polarizing plate, a negative C-plate layer, and the first alignment layer may be provided sequentially on the first substrate, and in the second laminated body, the linear polarizing plate and the second alignment layer may be provided sequentially on the second substrate.

In the first laminated body, the linear polarizing plate, a negative C-plate layer, the first transparent electrode, and the first alignment layer may be provided sequentially on the first substrate, and in the second laminated body, the linear polarizing plate and the second alignment layer may be provided sequentially on the second substrate.

The negative C-plate layer may be laminated on an adhesive layer in the first laminated body.

Another aspect of the present invention relates to a light modulating device including: a first light transmissive plate having a curved surface; a second light transmissive plate; a light modulating cell disposed between the first light transmissive plate and the second light transmissive plate; and an optically transparent adhesive film which is disposed between the curved surface of the first light transmissive plate and the light modulating cell and adheres one side of the light modulating cell to the curved surface of the first light transmissive plate.

The second light transmissive plate may be disposed to be spaced apart from the light modulating cell.

The second light transmissive plate may be attached to the light modulating cell via an adhesive layer.

A space between the second light transmissive plate and the light modulating cell may be sealed with a sealing member.

A silicone may be disposed in the space between the second light transmissive plate and the light modulating cell which is sealed by the sealing member.

The space between the second light transmissive plate and the light modulating cell which is sealed by the sealing member may be a vacuum.

The light transmissive plate may have a higher stiffness than the light modulating cell with respect to bending.

The first light transmissive plate may have a higher stiffness than the light modulating cell with respect to bending.

The light modulating device may further include a reflection preventing layer.

The light modulating device may further include a reflection preventing layer, and the reflection preventing layer may be provided in at least one of the light modulating cell and the light transmissive plate.

The light modulating device may further include a reflection preventing layer, and the reflection preventing layer may be provided in at least one of the light modulating cell and the second light transmissive plate.

The reflection preventing layer may include at least one of an anti-glare layer, an anti-reflection layer, and a low-reflection layer.

The curved surface may be a three-dimensional curved surface.

A thickness of the optically transparent adhesive film in a direction in which the optically transparent adhesive film and the light modulating cell are stacked may be not less than 50 μm and not more than 500 μm, and a storage elastic modulus of the optically transparent adhesive film in a room temperature environment may be not less than $1 \times 10^7$ Pa and not more than $1 \times 10^8$ Pa.

The optically transparent adhesive film may have a loss tangent of not less than 0.5 and not more than 1.5.

According to the present invention, the light modulating cell is properly attached to the curved surface of the light transmissive plate via the optically transparent adhesive film, and high light transmitting performance and light shielding performance are exhibited by the light modulating cell.

BRIEF DESCRIPTION OF DRAWINGS

FIG. 9 is a view illustrating the first resin substrate, the second resin substrate, the polarizing layer of the first polarizing plate, the polarizing layer of the second polarizing plate, and a phase difference compensation film for describing a second arrangement mode.

FIG. 10 is a view illustrating the first resin substrate, the second resin substrate, the polarizing layer of the first polarizing plate, the polarizing layer of the second polarizing plate, and a phase difference compensation film, which illustrates a comparative mode with respect to the second arrangement mode.

FIG. 11 illustrates a viewing angle characteristic (see a reference sign "L3" in FIG. 11) of the light modulating cell related to the second arrangement mode illustrated in FIG. 9 and a viewing angle characteristic (see a reference sign "L4" in FIG. 11) of the light modulating cell related to the comparative mode illustrated in FIG. 10.

FIG. 12 is a table illustrating state evaluations of pasting of light modulating cells (Examples 1 to 3) with respect to a curved surface of a light transmissive plate.

FIG. 13 is a table illustrating state evaluations of pasting of light modulating cells (Examples 4 to 9) with respect to the curved surface of the light transmissive plate.

FIG. 14 is a table illustrating state evaluations of pasting of light modulating cells (Examples 10 to 12) with respect to the curved surface of the light transmissive plate.

FIG. 16 is a table illustrating test results used to confirm a configuration relating to a spacer.

FIG. 17 is a table illustrating test results used to confirm the configuration relating to the spacer.

FIG. 18 is a table illustrating manufacturing conditions of the spacer.

FIG. 19 is a table illustrating manufacturing conditions of an alignment layer.

DESCRIPTION OF EMBODIMENTS

Figure 1:
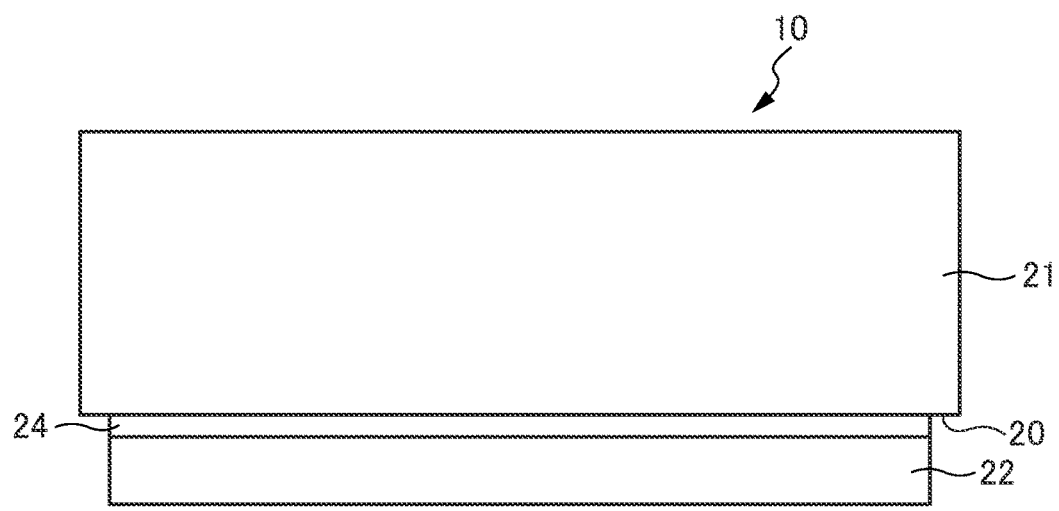
FIG. 1 is a schematic cross-sectional view illustrating an example of a light modulating device.

Hereinafter, an embodiment of the present invention will be described with reference to the drawings.

A light modulating device 10 to be described hereinafter can be applied to various technical fields where adjustment of a transmittance of light is required, and an application range thereof is not particularly limited. For example, the light modulating device 10 according to the present invention is used as an arbitrary device that requires switching of light transmitting and light shielding, for example, a window (including a skylight) of a vehicle such as a car or a building, a showcase, a partition disposed in a room, and the like. In addition, each element constituting the light modulating device 10 can be manufactured by a known method, and is manufactured using arbitrary lamination technique, photolithography technique and/or pasting technique.

Incidentally, the light modulating device 10 (a light modulating cell 22 and the like) to be described hereinafter merely exemplifies one embodiment of the present invention. Therefore, for example, some of the elements to be listed below as constituent elements of the light modulating device 10 may be replaced by other elements or are not necessarily included. In addition, elements not to be listed below may be included as constituent elements of the light modulating device 10. In addition, there are parts where a scale, a dimensional ratio, and the like are changed or exaggerated as appropriate from those of actual ones in the drawings for convenience of illustrations and ease of understanding.

FIG. 1 is a schematic cross-sectional view illustrating an example of the light modulating device 10.

The light modulating device 10 of the present embodiment includes: a light transmissive plate 21 having a curved surface 20; a light modulating cell 22 whose transmittance of light (particularly, visible rays) is variable, and an optically transparent adhesive film (OCA) 24 disposed between the curved surface 20 of the light transmissive plate 21 and one side of the light modulating cell 22.

The light transmissive plate 21 contains an ultraviolet ray inhibiting component and transmits visible rays while inhibiting transmission of ultraviolet rays. The light transmissive plate 21 has the curved surface 20 and includes one or a plurality of glass plates. Incidentally, the light transmissive plate 21 does not necessarily contain the ultraviolet ray inhibiting component, and the light modulating cell 22 and the optically transparent adhesive film 24 to be described later can be applied to the light transmissive plate 21 not containing the ultraviolet ray inhibiting component. The light transmissive plate 21 may have, for example, glass plates (two glass plates in total) disposed on a front side and a back side, respectively, or may have a single glass plate such as tempered glass. In addition, the light transmissive plate 21 may include a member other than the glass plate. For example, an arbitrary functional layer such as a high-stiffness film (for example, a cyclo olefin polymer (COP) resin layer and the like) and a heat reflecting film may be provided on the light transmissive plate 21.

The curved surface 20 of the light transmissive plate 21 is not particularly limited, but is typically a two-dimensional curved surface or a three-dimensional curved surface, and the curved surface 20 of the light transmissive plate 21 in the drawing is the three-dimensional curved surface. In general, it is not easy to paste the light modulating cell 22 in a thin film shape without generating wrinkles on the three-dimensional curved surface. According to a "technique for attaching the light modulating cell 22 to the light transmissive plate 21" to be described later, however, it is easy to paste the light modulating cell 22 in the thin film shape without generating wrinkles to the three-dimensional curved surface.

Figure 2:
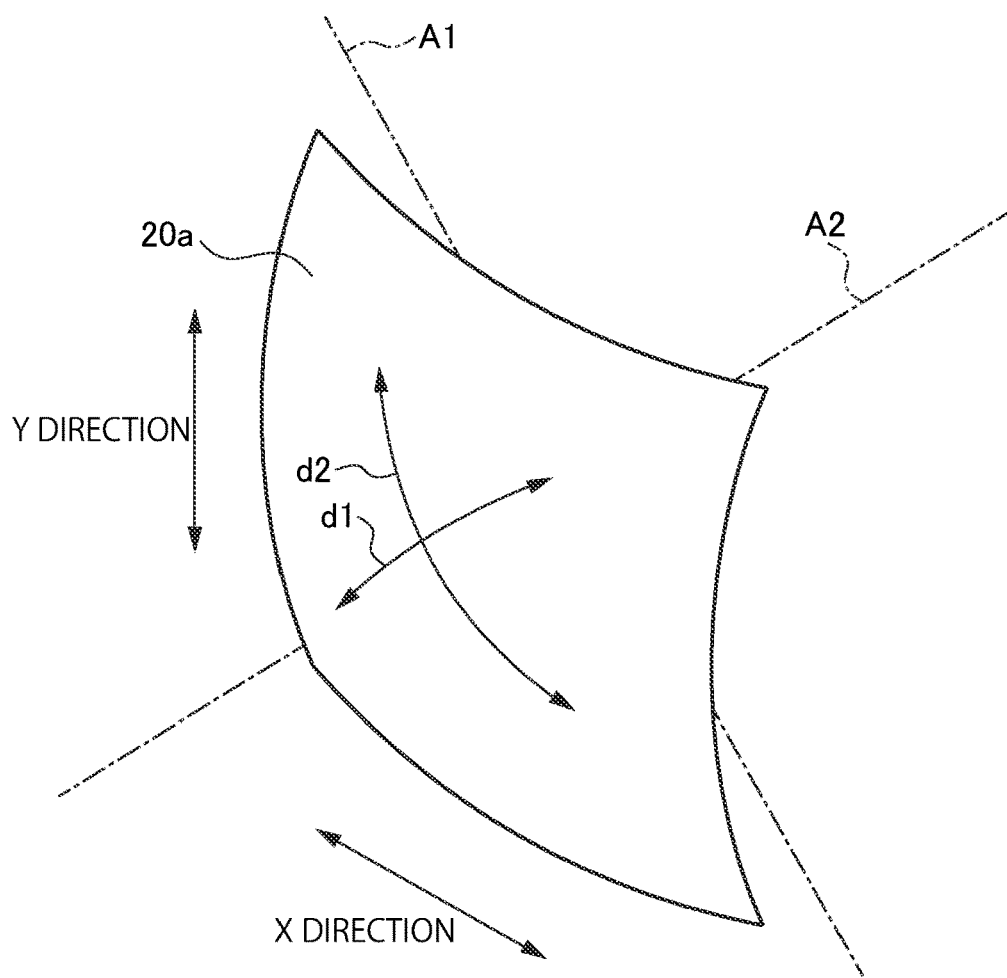
FIG. 2 is a view for describing a three-dimensional curved surface.

FIG. 2 is a view for describing the three-dimensional curved surface 20a. The three-dimensional curved surface 20a to be described herein is distinguished from a two-dimensional curved surface that is two-dimensionally bent about a single axis, or a two-dimensional curved surface that is two-dimensionally bent with different curvatures about a plurality of axes parallel to each other. That is, the three-dimensional curved surface 20a means a surface which is partially or totally bent about each of the plurality of axes inclined with respect to each other.

One surface of the light transmissive plate 21 in the drawing (that is, the curved surface 20 to which the optically transparent adhesive film 24 is attached) is bent as a whole as illustrated in FIG. 2 to be bent in a first direction d1 about a first axis A1 and to be also bent in a second direction d2 about a second axis A2.

In the illustrated example, both the first axis A1 and the second axis A2 are inclined with respect to an X direction and a Y direction illustrated in FIG. 2, and the first axis A1 is perpendicular to the second axis A2.

One side of the light modulating cell 22 adheres to the curved surface 20 of the light transmissive plate 21 via the optically transparent adhesive film 24.

Figure 3:
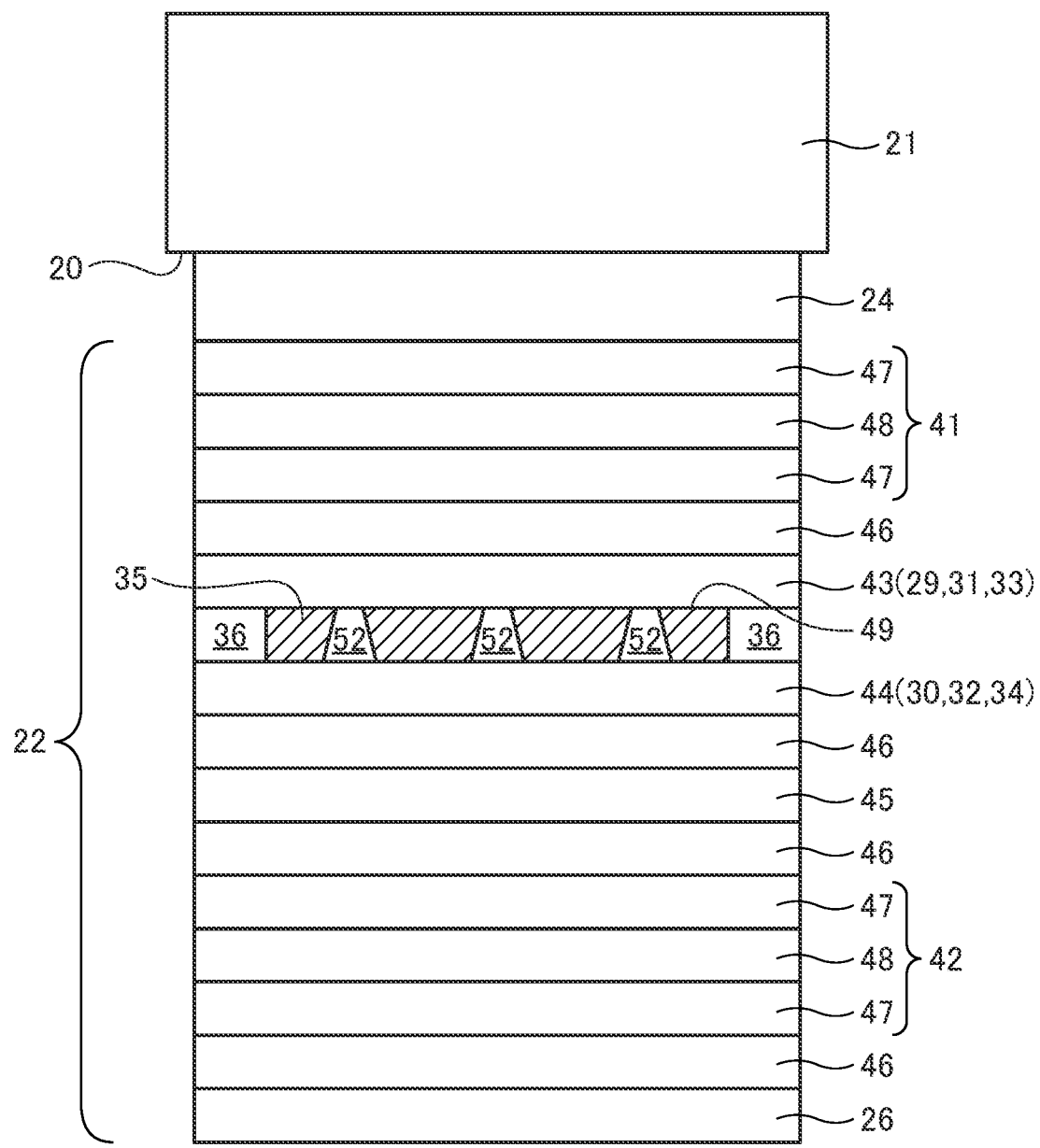
FIG. 3 is a schematic cross-sectional view for describing a layer configuration of an optically transparent adhesive film and a light modulating cell.

FIG. 3 is a schematic cross-sectional view for describing a layer configuration of the optically transparent adhesive film 24 and the light modulating cell 22. As described above, the optically transparent adhesive film 24 is provided on the one side of the light modulating cell 22. In addition, a hard coat layer 26 is provided on the other side of the light modulating cell 22.

The optically transparent adhesive film 24 of the present embodiment is configured using a transparent adhesive sheet called the OCA, can be configured only by a pressure-sensitive adhesive containing no substrate and having a substantially constant film thickness, and can be configured using, for example, an acrylic pressure-sensitive adhesive having an excellent transparency or the like. The optically transparent adhesive film 24 (OCA) is formed by sandwiching the pressure-sensitive adhesive with a sheet (a separator (releasing material)) having an excellent releasability. As a laminated body of a pressure-sensitive adhesive material and the separator is cut into a desired shape and the separator is removed, the pressure-sensitive adhesive material (the optically transparent adhesive film 24) can be pasted to a desired location. For example, the optically transparent adhesive film 24 can be formed by applying a transparent adhesive resin called optical clear resin (OCR).

The light modulating cell 22 has a multilayer structure, "a protective layer 47, a polarizing layer 48, the protective layer 47, an adhesive layer 46, a first electrode alignment layer 43, a liquid crystal layer 49, a second electrode alignment layer 44, the adhesive layer 46, a phase difference compensation film 45, the adhesive layer 46, the protective layer 47, the polarizing layer 48, the protective layer 47, the adhesive layer 46, and the hard coat layer 26" are sequentially provided in layers from the optically transparent adhesive film 24 side to the outside (that is, in a direction away from the light transmissive plate 21) as illustrated in FIG. 3. By these layers, a laminated structure of "polarizing plate-electrode layer-alignment layer-liquid crystal layer-alignment layer-electrode layer-polarizing plate-hard coat layer" is formed.

That is, the first polarizing plate 41 is formed by the "protective layer 47, the polarizing layer 48, and the protective layer 47" disposed on the light transmissive plate 21 side, and the second polarizing plate 42 is formed by the other "protective layer 47, polarizing layer 48, and protective layer 47" provided on the hard coat layer 26 side. The first polarizing plate 41 of the present embodiment is pasted to the curved surface 20 of the light transmissive plate 21 via the optically transparent adhesive film 24, and the second polarizing plate 42 is provided at a position to be spaced apart from the light transmissive plate 21 farther than the first polarizing plate 41.

The polarizing layers 48 of the first polarizing plate 41 and the second polarizing plate 42 are configured using a member which achieves a desired polarizing function, and typically, formed by stretching polyvinyl alcohol (PVA) doped with an iodine compound. Typical arrangement modes of the polarizing layers 48 include a mode called "parallel nicol" in which an absorption axis of the polarizing layer 48 of the first polarizing plate 41 and an absorption axis of the polarizing layer 48 of the first polarizing plate 41 are parallel to each other, and a mode called "cross nicol (see FIGS. 6 and 9 to be described later)" in which the absorption axis of the polarizing layer 48 of the first polarizing plate 41 and the absorption axis of the polarizing layer 48 of the first polarizing plate 41 are perpendicular to each other.

The protective layer 47 serves a role of protecting an adjacent layer and can be made of arbitrary material capable of transmitting visible rays, and typically made of triacetyl-cellulose (TAC) or acrylic. Incidentally, the protective layers 47 formed at a plurality of locations of the first polarizing plate 41 and the second polarizing plate 42 may be made of different materials or may be made of the same material depending on positions.

Between the first polarizing plate 41 and the second polarizing plate 42, the first electrode alignment layer 43 is disposed on the first polarizing plate 41 side, and the second electrode alignment layer 44 is disposed on the second polarizing plate 42 side, and an "electrode layer and an alignment layer supported on a base member" are formed by each of the first electrode alignment layer 43 and the second electrode alignment layer 44.

Figure 4A:
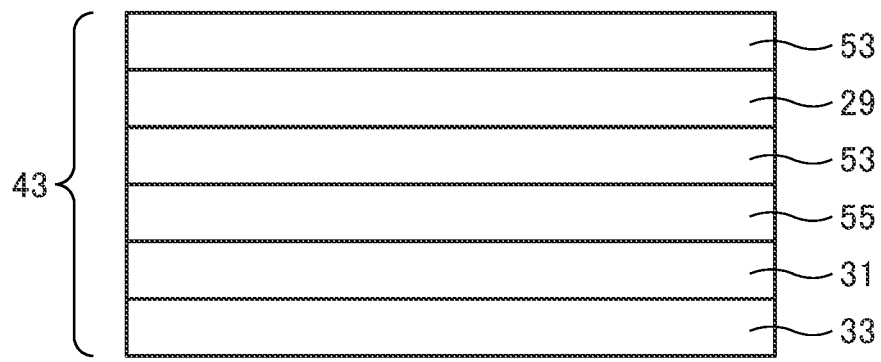
FIG. 4A is a schematic cross-sectional view for describing a layer configuration of a first electrode alignment layer.

FIG. 4A is a schematic cross-sectional view for describing a layer configuration of the first electrode alignment layer 43.

The first electrode alignment layer 43 of the present embodiment is provided with a hard coat layer 53, a first resin substrate 29, the hard coat layer 53, an index matching layer 55, a first electrode layer 31, and a first alignment layer 33 sequentially from the first polarizing plate 41 side to the liquid crystal layer 49 side.

Figure 4B:
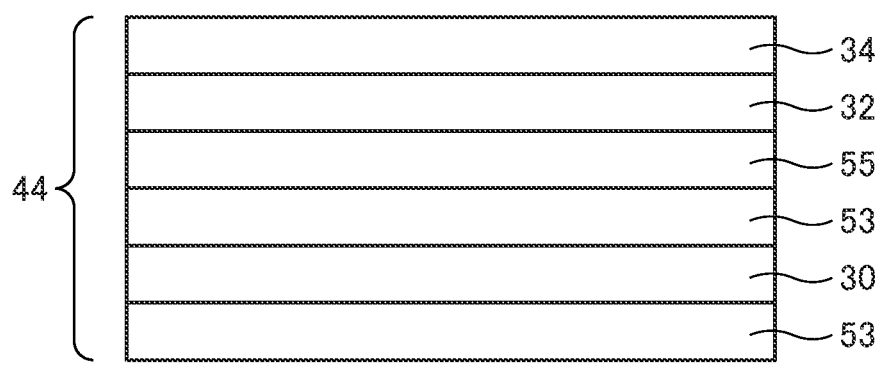
FIG. 4B is a schematic cross-sectional view for describing a layer configuration of a second electrode alignment layer.

FIG. 4B is a schematic cross-sectional view for describing a layer configuration of the second electrode alignment layer 44.

The second electrode alignment layer 44 of the present embodiment is provided with a second alignment layer 34, a second electrode layer 32, the index matching layer 55, the hard coat layer 53, a second resin substrate 30, and the hard coat layer 53 sequentially from the liquid crystal layer 49 side to the second polarizing plate 42 side.

In this manner, the first electrode layer 31 disposed on the first resin substrate 29 side and the second electrode layer 32 disposed on the second resin substrate 30 side are provided between the first resin substrate 29 and the second resin substrate 30. The first electrode layer 31 and the second electrode layer 32 can be formed using various materials, such as indium tin oxide (ITO), as a transparent electrode, and to which a power supply means such as a flexible printed circuit (FPC) is connected to apply a voltage. Depending on the voltage applied to the first electrode layer 31 and the second electrode layer 32, an electric field acting on the liquid crystal layer 49 disposed between the first electrode layer 31 and the second electrode layer 32 changes so that an alignment of a liquid crystal member forming the liquid crystal layer 49 is adjusted.

The first alignment layer 33 disposed on the first electrode layer 31 side, the second alignment layer 34 disposed on the second electrode layer 32 side are provided between the first electrode layer 31 and the second electrode layer 32. A method of manufacturing the first alignment layer 33 and the second alignment layer 34 is not particularly limited, and the first alignment layer 33 and the second alignment layer 34 having liquid crystal alignment properties can be formed by an arbitrary method. For example, the first alignment layer 33 and the second alignment layer 34 may be formed by rubbing a resin layer of polyimide or the like, and the first alignment layer 33 and the second alignment layer 34 may be formed on the basis of a photo-alignment method in which a polymer film is irradiated with linearly polarized ultraviolet rays to selectively react a polymer chain in a polarization direction.

Not only the liquid crystal layer 49 but also a spacer 52 and a sealing member 36 are provided between the first alignment layer 33 and the second alignment layer 34 as illustrated in FIG. 3. That is, the sealing member 36 defining the liquid crystal space 35 between the first alignment layer 33 and the second alignment layer 34 is provided between the first alignment layer 33 and the second alignment layer 34, and the liquid crystal space 35 is filled with a liquid crystal material to form the liquid crystal layer 49. The plurality of spacers 52 is disposed in at least the liquid crystal space 35 and is discretely disposed so as to support the first alignment layer 33 and the second alignment layer 34. Each of the spacers 52 may be configured using a single member or a plurality of members, and may extend in the laminating direction only in the liquid crystal space 35, or may extend in the laminating direction so as to pass through one alignment layer (for example, the second alignment layer 34) and the liquid crystal space 35. In addition, the spacer 52 has a core portion and a covering portion, and the covering portion may directly contact the other alignment layer (for example, the first alignment layer 33). Therefore, for example, the core portion of each of the spacers 52 may extend in the liquid crystal space 35 right before reaching the first alignment layer 33 while passing through the second alignment layer 34 from above the second electrode layer 32, the covering portion having the same component as that of the second alignment layer 34 may be provided on the core portion, and a gap (cell gap) between the first alignment layer 33 and the second alignment layer 34 may be held by each of the spacers 52 by bringing the covering portion into direct contact with the first alignment layer 33.

The sealing member 36 serves a role of preventing a leakage of the liquid crystal member forming the liquid crystal layer 49, and serves a role of attaching the first electrode alignment layer 43 (the first alignment layer 33) to the second electrode alignment layer 44 (the second alignment layer 34) to fix both alignment layers to each other. In general, a thermosetting epoxy resin is used as the sealing member 36, and the sealing member 36 made of an epoxy resin is preferably used when a method of filling the liquid crystal space 35 with the liquid crystal material is a vacuum injection method. Incidentally, when a one-drop-fill (ODF) method is used as the method of filling the liquid crystal member, a hybrid-type material having both a thermosetting property and a UV curing property (ultraviolet curing property) can be suitably used as the sealing member 36. This is because the contact of the liquid crystal with the uncured sealing member 36 causes an appearance defect. Therefore, it is preferable that a material constituting the sealing member 36 (composition component of the sealing member 36) contain, for example, the ultraviolet curable acrylic resin and the epoxy resin. In addition, a maximum point of the solidity (hardness) of the sealing member 36 as measured with a durometer (Type A in compliance with JIS K 6253; a load of 10 N) is preferably not less than 20 and not more than 90, and more preferably not less than 20 and not more than 50 from the viewpoint of fixing the first electrode alignment layer 43 (the first alignment layer 33) and the second electrode alignment layer 44 (the second alignment layer 34) to each other while preventing the leakage of the liquid crystal member. In addition, a glass transition point (glass transition temperature (Tg)) of the sealing member 36 is preferably not less than 0° C. and not more than 60° C., and more preferably not less than 0° C. and not more than 40° C.

In addition, the plurality of spacers 52 is disposed between the first electrode alignment layer 43 (the first alignment layer 33) and the second electrode alignment layer 44 (the second alignment layer 34) to define a thickness of the liquid crystal layer 49 (that is, the gap between the first electrode alignment layer 43 (the first alignment layer 33) and the second electrode alignment layer 44 (the second alignment layer 34)). Each of the spacers 52 can be made of various resin materials and may have a columnar shape such as a truncated cone, or have a spherical bead shape. The columnar liquid crystal space 35 can be formed at a desired location based on a photolithography technique, and the liquid crystal space 35 in the bead shape is formed in advance and dispersed in the liquid crystal space 35.

The liquid crystal layer 49 of the present embodiment has a negative pressure in the liquid crystal space 35 from the viewpoint of "improving the pastability of the light modulating cell 22 to the light transmissive plate 21 (that is, preventing distortion of the light modulating cell 22)". For example, such a negative pressure can be realized by injecting the liquid crystal member into the liquid crystal space 35 such that the liquid crystal member forming the liquid crystal layer 49 occupies "less than 100% (preferably about 99%) of the volume of the liquid crystal space 35". The light modulating cell 22 of the present embodiment is attached to the curved surface 20 of the light transmissive plate 21 in a curved state, but the flexibility of the light modulating cell 22 is impaired if the liquid crystal space 35 is filled excessively with the liquid crystal member so that the attachment of the light modulating cell 22 to the light transmissive plate 21 deteriorates. Therefore, it is preferable to secure the flexibility of the light modulating cell 22 by injecting the liquid crystal member into the liquid crystal space 35 such that the liquid crystal member forming the liquid crystal layer 49 occupies "about 99% of the volume of the liquid crystal space 35". Incidentally, when the injection amount of the liquid crystal member is too small relative to the volume of the liquid crystal space 35, air bubbles are caused in the liquid crystal space 35, which is not preferable.

The liquid crystal layer 49 of the present embodiment is a liquid crystal layer of a vertical alignment (VA) type, and adopts a mode called "normally black" which is turned into a light shielding state when no voltage is applied to the first electrode layer 31 and the second electrode layer 32. However, the liquid crystal layer 49 may adopt another drive method, and the liquid crystal layer 49 may be driven by a twisted nematic (TN) mode, an in-plane switching (IPS) mode, a fringe field switching (FFS) mode, or another mode.

The phase difference compensation film 45 having compensation performance in accordance with the drive mode of the liquid crystal layer 49 is provided between the second polarizing plate 42 and the second electrode layer 32 (the second electrode alignment layer 44). In the present embodiment, the phase difference compensation film 45 configured to eliminate a phase difference of the VA-type liquid crystal layer 49 is provided. In the VA type, since a phase difference change caused by an angle is large, the phase difference compensation film 45 of the present embodiment has compensation performance capable of effectively compensating for such a phase difference change. On the other hand, when the liquid crystal layer 49 employs the TN mode, the phase difference compensation film 45 has compensation performance for compensating for a phase difference (for example, angle dependence of liquid crystal molecules) of the TN-mode liquid crystal layer 49. Incidentally, a phase difference is small and a phase difference change caused by an angle is small in general in the case of the IPS-mode liquid crystal layer 49, and thus, basically no phase difference compensation film is required in many cases, and the phase difference compensation film 45 is not necessarily provided.

The phase difference compensation film 45 is not necessarily an indispensable element, and thus, is not necessarily provided in the light modulating cell 22, and an installation position is not limited as long as it is a position where desired compensation performance can be exerted.

Typically, the phase difference compensation film 45 is provided in at least one of a space "between the first polarizing plate 41 and the first electrode layer 31 (the first electrode alignment layer 43)" and a space "between the second polarizing plate 42 and the second electrode layer 32 (the second electrode alignment layer 44)". Therefore, the phase difference compensation film 45 may be provided between the first polarizing plate 41 (the protective layer 47) and the first electrode alignment layer 43 (hard coat layer 53), instead of the position illustrated in FIG. 3 (that is, between the second electrode alignment layer 44 (the hard coat layer 53) and the second polarizing plate 42 (the protective layer 47)). In addition, the phase difference compensation film 45 may be provided in two or more layers (that is, at two or more locations), and it suffices if the phase difference of the liquid crystal layer 49 can be compensated by the phase difference compensation film 45 as a whole.

Figure 5:
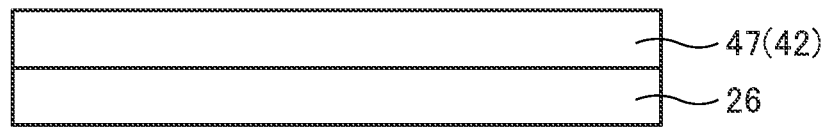
FIG. 5 is a schematic cross-sectional view illustrating a modified example of a second polarizing plate (protective layer) and a hard coat layer.

The hard coat layer 26 is provided at a position apart from the light transmissive plate 21 farther than the second polarizing plate 42 and forms the outermost layer of the light modulating cell 22 of the present embodiment. The illustrated hard coat layer 26 is fixed to the second polarizing plate 42 via the adhesive layer 46 and can contain an arbitrary component. For example, the hard coat layer 26 can be constituted by the same component (for example, TAC or the like) as the protective layer 47. Incidentally, the hard coat layer 26 may be directly formed on a surface of the second polarizing plate 42 (the protective layer 47 in the present embodiment) as illustrated in FIG. 5. A cured film containing fine particles (for example, titanium dioxide or the like) may be formed on the surface (on the protective layer 47) of the second polarizing plate 42 using, for example, a silicone-based ultraviolet curing resin to function as the hard coat layer 26.

Further, the above functional layers (the first polarizing plate 41, the first electrode alignment layer 43, the second electrode alignment layer 44, the phase difference compensation film 45, the second polarizing plate 42, and the hard coat layer 26 illustrated in FIG. 3) have an integrally laminated structure as adjacent functional layers adheres to each other by an adhesive layer 46. A component forming the adhesive layer 46 is not particularly limited, and the constituent component of the adhesive layer 46 may be determined in accordance with characteristics of each layer to be attached.

Although all the adhesive layers 46 are made of the same material as the optically transparent adhesive film (that is, OCA) 24 in the present embodiment, the adhesive layer 46 containing another component such as an ultraviolet curable resin may be used, or the adhesive layer 46 containing a different component from the adhesive layers 46 in other locations may be used in accordance with an arrangement position and an object to be attached.

Incidentally, the layer structure of the light transmissive plate 21, the optically transparent adhesive film 24, and the light modulating cell 22 illustrated in FIG. 3 and the like is merely an example, and other functional layers may be provided as a part of the light modulating cell 22, or other functional portions may additionally be provided for the light modulating cell 22. For example, a seal protection material functioning as a protective material can be provided from side portions of the light modulating cell 22 and the optically transparent adhesive film 24 to a part of the curved surface 20 of the light transmissive plate 21 although not illustrated. This seal protection material can reinforce an adhesive force between adjacent layers of the light modulating cell 22 and the optically transparent adhesive film 24 as well as reinforce adhesive forces of the light modulating cell 22 and the optically transparent adhesive film 24 with respect to the light transmissive plate 21.

As a result of intensive research, the inventor of the present application has found that it is preferable to adjust the light modulating cell 22 and the optically transparent adhesive film 24 so as to satisfy the following conditions in order to paste the light modulating cell 22 in the thin film shape to the curved surface 20 (particularly, the three-dimensional curved surface) without distortion such as wrinkles.

That is, a thickness of the optically transparent adhesive film 24 in a direction in which the optically transparent adhesive film 24 and the light modulating cell 22 are stacked is not less than 50 μm and not more than 500 μm, and preferably not less than 200 μm and not more than 300 μm, and it is more preferable that a storage elastic modulus of the optically transparent adhesive film 2 in a room temperature environment be not less than $1\times10^7$ Pa and not more than $1\times10^8$ Pa. A loss tangent (tan δ) of the optically transparent adhesive film 24 is preferably not less than 0.5 and not more than 1.5, and more preferably not less than 0.7 and not more than 1.2.

The optically transparent adhesive film 24 serves a role of attaching the curved surface 20 of the light transmissive plate 21 and the first polarizing plate 41 (the protective layer 47) to each other, and serves a role as a cushion to fill a difference in curvature between the curved surface 20 of the light transmissive plate 21 and the first polarizing plate 41 (the protective layer 47). Therefore, it becomes difficult to properly serve the role as the cushion when the thickness of the optically transparent adhesive film 24 in the laminating direction is too small, and it becomes difficult to properly fix the first polarizing plate 41 (the protective layer 47) with respect to the curved surface of the light transmissive plate 21 when the thickness in the laminating direction is too large. In addition, the stiffness of the light modulating cell 22 as a whole increases when the storage elastic modulus of the optically transparent adhesive film 24 is too large, so that the followability to the curved surface whose shape changes three-dimensionally becomes insufficient. On the other hand, when the storage elastic modulus of the optically transparent adhesive film 24 is too small, the fluidity of the optically transparent adhesive film 24 excessively increases, it becomes difficult to properly fix the first polarizing plate 41 (the protective layer 47) to the curved surface of the light transmissive plate 21, the reliability such as heat resistance becomes insufficient, and there is concern that foaming may occur even under a normal use environment.

Further, when the storage elastic modulus of the optically transparent adhesive film 24 is too small, the processability of the optically transparent adhesive film 24 deteriorates, and undesired separation of the optically transparent adhesive film 24 may occur due to protrusion of the paste, for example, when the optically transparent adhesive film 24 is cut. Thus, the inventor of the present application has newly found that it is preferable to set the thickness and the storage elastic modulus in the laminating direction of the optically transparent adhesive film 24 within the above ranges in order to properly paste the light modulating cell 22 to the curved surface 20 without causing distortion such as wrinkles.

In addition, the first resin substrate 29 and the second resin substrate 30 can be made by various transparent film materials, and is preferably made of a film material having a low optical anisotropy such as the COP. In particular, at least one of the first resin substrate 29 and the second resin substrate 30 preferably contains polycarbonate from the viewpoint of properly pasting the light modulating cell 22 to the curved surface 20. Incidentally, the constituent materials, shapes, and/or sizes of the first resin substrate 29 and the second resin substrate 30 may be the same as each other or different from each other.

In addition, a length of the sealing member 36 in a direction perpendicular to the laminating direction (the direction in which the first alignment layer 33, the sealing member 36, and the second alignment layer 34 are stacked) (that is, a width direction) is preferably not less than 1 mm and not more than 5 mm, and particularly preferably 1.5 mm.

As the length of the sealing member 36 in the width direction decreases, the stiffness of the entire light modulating cell 22 can be reduced, and it becomes easy to paste the light modulating cell 22 to the curved surface 20 without causing distortion such as wrinkles. On the other hand, when the length of the sealing member 36 in the width direction is too small, the original functions of the sealing member 36 such as "sealing of the liquid crystal layer 49 in the liquid crystal space 35" and "attachment between the first electrode alignment layer 43 (the first alignment layer 33) and the second electrode alignment layer 44 (the second alignment layer 34)" are impaired. Taking these circumstances into consideration, the inventor of the present application has newly found that the length of the sealing member 36 in the width direction is preferably not less than 1 mm and not more than 5 mm (more preferably 1.5 mm) as described above.

In general, the laminated body forming the light modulating cell 22 has a smaller stiffness is easily deformed in accordance with the curved surface 20 of the light transmissive plate 21, and it is easy to paste the light modulating cell 22 to the curved surface 20 without causing distortion such as wrinkles. However, it is difficult to properly paste the light modulating cell 22 to the curved surface 20 of the light transmissive plate 21 only with the condition that the stiffness of the laminated body is sufficiently small, and the inventor of the present application has newly found that there are appropriate conditions for the optically transparent adhesive film 24 and the light modulating cell 22.

In addition, a light transmittance (particularly a total light transmittance) of the light modulating cell 22 is preferably 30% or higher, and more preferably 35% or higher. The "total light transmittance" described herein represents a ratio of a total transmitted light flux relative to the parallel incident light flux of a test piece. In the case of a diffusive sample, the "total transmitted light flux" includes a transmitted light flux that has been diffused (diffusion component). Incidentally, details of the total light transmittance can be determined based on "Japanese Industrial Standards (JIS) 7375: 2008". It is possible to calculate the total light transmittance by a "ratio of light transmitted through the light modulating cell 22" obtained based on a light intensity of a wavelength of 555 nm out of light before being transmitted through the light modulating cell 22. In addition, a color of the light modulating cell 22 is preferably "black" in consideration of harmony with other peripheral members, and is also preferably an "achromatic color other than black".

Incidentally, the distortion such as wrinkles of the light modulating cells 22 caused by the pasting to the curved surface 20 of the light transmissive plate 21 is likely to occur particularly at the start of the pasting process (that is, a pasting start region). It is possible to reduce the substantial influence of the distortion of the light modulating cell 22 by pasting the light modulating cell 22 to the curved surface 20 of the light transmissive plate 21 from a location whose optical use is not originally intended or a location that is hardly viewed by the user as the pasting start region in the light modulating device 10 (the light transmissive plate 21, the optically transparent adhesive film 24, and the light modulating cell 22) based on such findings. Thus, it is possible to substantially reduce the "influence of the distortion occurring in the light modulating cell 22" with respect to the light passing through the liquid crystal layer 49, for example, by setting a region outside the sealing member 36 where the liquid crystal layer 49 is not provided as the pasting start region. Therefore, when the first electrode alignment layer 43 and the second electrode alignment layer 44 (particularly the first electrode layer 31 and the second electrode layer 32) are extended to the outside of the sealing member 36, and a "power supply means for the first electrode layer 31 and the second electrode layer 32" such as an FPC is connected to such extension portions, a "region to which this power supply means is connected" is utilized as the pasting start region to paste the light modulating cell 22 to the curved surface 20 of the light transmissive plate 21 from the region, whereby it is possible to effectively hide the distortion occurring in the light modulating cell 22. In particular, a distance from the region (active area) where the liquid crystal layer 49 is provided to a position where the power supply means such as the FPC is connected among the extension portions of the first electrode layer 31 and the second electrode layer 32 is relatively long, and thus, it is easy to set the distortion of the light modulating cell 22 occurring in the pasting start region within a range of an inactive area.

As described above, it is possible to properly paste the light modulating cell 22 to the curved surface 20 of the light transmissive plate 21 via the optically transparent adhesive film 24 without the distortion according to the light modulating device 10 of the present embodiment. In particular, the lighting control is performed by a combination of the polarizing plates (the first polarizing plate 41 and the second polarizing plate 42) and the alignment control of the liquid crystal layer 49 according to the light modulating cell 22 of the present embodiment, and thus, it is possible to realize high light transmitting performance and light shielding performance with a simple configuration.

In addition, the light modulating cell 22 of the present embodiment does not include a stiff element such as glass, but is made up of a combination of flexible members. Thus, it is possible to accurately perform the "pasting of the light modulating cells 22 with respect to the curved surface 20", which is difficult when glass is used as a substrate for supporting the first electrode layer 31 and the second electrode layer 32 in the light modulating cell 22 of the present embodiment.

Incidentally, a light modulating cell using a resin substrate generally has low stiffness, and such a low-stiff light modulating cell deforms relatively easily when an external force is directly applied, optical characteristics of a liquid crystal layer are disturbed. Thus, when a light modulating device is used under an environment where an external force such as vibration is suddenly or continuously applied to the low-stiff light modulating cell, an alignment of liquid crystal members of the liquid crystal layer is disturbed so that an original optical function is not sufficiently exerted, and a phenomenon such as flickering may occur in light to be observed through the light modulating device. However, the light modulating cell 22 (the liquid crystal layer 49) of the present embodiment is pasted to the light transmissive plate 21 having a relatively high stiffness (that is, the light transmissive plate 21 having a higher stiffness with respect to bending than the light modulating cell 22) to be firmly supported, and thus, it is possible to effectively reduce the disturbance of the liquid crystal alignment caused by the external force and to avoid the phenomenon such as flickering.

Incidentally, a mode of disposing the light modulating cell 22 between two glass plates and a mode of disposing the light modulating cell 22 outside the two glass plates are conceivable as modes of attaching the light modulating cell 22 to the light transmissive plate 21 having two or more glass plates. When the light modulating cell 22 is disposed between two glass plates, it is possible to adjust the transmittance of light incident on the glass plates with the light modulating cell 22 while protecting the light modulating cell 22 with the glass plates. However, a relatively large force (such as a compression force and a shear force) is applied between the two glass plates in some cases, and further, the light modulating cell 22 including the polarizing plates (the first polarizing plate 41 and the second polarizing plate 42) does not always have high resistance to a force applied from the outside. In addition, a temperature between the glass plates becomes extremely high depending on a use environment, but the polarizing plate is not always excellent in high temperature resistance. Therefore, when the light modulating cell 22 having the polarizing plate is disposed between the two glass plates, there is concern that the light modulating cell 22 may fail to achieve a desired lighting control function due to crushing or deterioration of the light modulating cell 22.

On the other hand, the proof stress performance and the temperature resistance performance required for the light modulating cell 22 are not high in the mode of attaching the light modulating cell 22 to the outer surface of the light transmissive plate 21 as in the light modulating device 10 of the present embodiment illustrated in FIGS. 1 and 3, and the like.

Therefore, it is possible to continuously exert the desired lighting control function in the light modulating device 10 of the present embodiment although the light modulating cell 22 is provided with the polarizing plates (the first polarizing plate 41 and the second polarizing plate 42). In addition, it is possible to appropriately attach the light modulating cell 22 to the light transmissive plate 21 in accordance with a specific curved state of the curved surface 20 having various shapes without excessively impairing the light transmitting performance and the light shielding performance of the light modulating cell 22 by using the light modulating cell 22 that satisfies the above-described conditions that make it easy to attach the light modulating cell 22 to the curved surface 20 without causing distortion such as wrinkles.

<Directionality Between Absorption Axis of Polarizing Plate and Optical Axis of Substrate Regarding VA Type>

When the drive mode of the liquid crystal layer 49 is the VA type, the following relationship is established regarding "directions of the absorption axes of the polarizing layers 48 of the first polarizing plate 41 and the second polarizing plate 42" and "directions of the optical axes of the substrates (the first resin substrate 29 and the second resin substrate 30) of the first electrode alignment layer 43 and the second electrode alignment layer 44".

<First Arrangement Mode>

Figure 6:
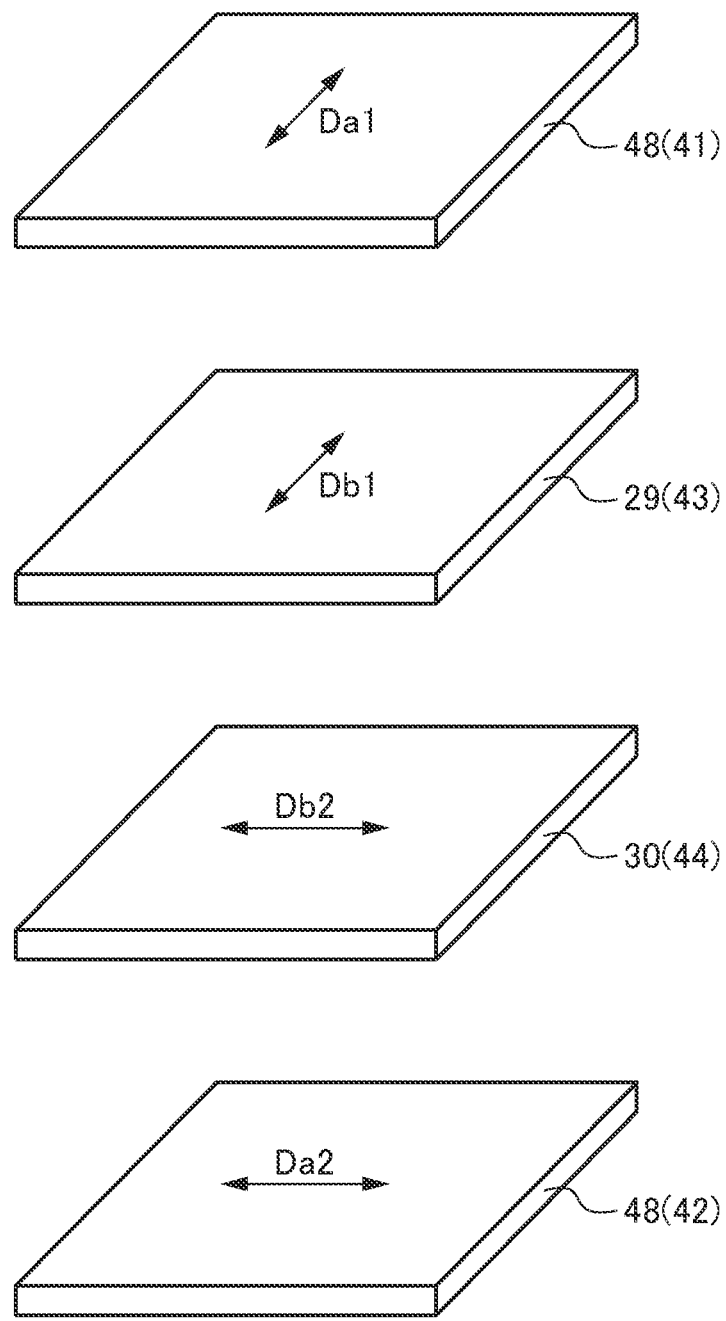
FIG. 6 is a view illustrating a first resin substrate, a second resin substrate, a polarizing layer of a first polarizing plate, and a polarizing layer of a second polarizing plate for describing a first arrangement mode.

FIG. 6 is a view illustrating the first resin substrate 29, the second resin substrate 30, the polarizing layer 48 of the first polarizing plate 41, and the polarizing layer 48 of the second polarizing plate 42 for describing a first arrangement mode.

In the present embodiment, the optical axis of the first resin substrate 29 is perpendicular to the optical axis of the second resin substrate 30 (see optical axis directions "Db1" and "Db2" in FIG. 6), the absorption axis of the polarizing layer 48 of the first polarizing plate 41 is perpendicular to the absorption axis of the polarizing layer 48 of the second polarizing plate 42 (see absorption axis directions "Da1" and "Da2" in FIG. 6), the optical axis direction Db1 of the first resin substrate 29 is parallel to the absorption axis direction Da1 of the polarizing layer 48 of the first polarizing plate 41, and the optical axis direction Db2 of the second resin substrate 30 is parallel to the absorption axis direction Da2 of the polarizing layer 48 of the second polarizing plate 42.

As the first resin substrate 29 and the second resin substrate 30 are disposed such that "the optical axis direction Db1 of the first resin substrate 29 is perpendicular to the optical axis direction Db2 of the second resin substrate 30" as described above, a phase difference imparted to transmitted light by the first resin substrate 29 can be canceled by a phase difference imparted by the second resin substrate 30.

Therefore, it is possible to reduce a phase difference imparted by the first resin substrate 29 and the second resin substrate 30 to the transmitted light as a whole.

In addition, it is possible to suppress "deterioration of viewing angle characteristics and deterioration of a light shielding ratio at the time of light shielding (that is, at the time of black display)" caused by the optical anisotropy of the first resin substrate 29 and the second resin substrate 30 can be suppressed by arranging the first resin substrate 29, the second resin substrate 30, the first polarizing plate 41, and the second polarizing plate 42 such that "the optical axis direction Db1 of the first resin substrate 29 and the absorption axis direction Da1 of the polarizing layer 48 of the first polarizing plate 41 are parallel" and "the optical axis direction Db2 of the second resin substrate 30 and the absorption axis direction Da2 of the polarizing layer 48 of the second polarizing plate 42 are parallel". That is, the resin substrates (the first resin substrate 29 and the second resin substrate 30) inherently having the optical anisotropy affect the transmitted light, and particularly, cause deterioration in the viewing angle and the light shielding ratio at the time of light shielding in the light modulating cell 22 having the VA-type liquid crystal layer 49 (the light modulating device 10). On the other hand, when "the optical axis directions Db1 and Db2 of the first resin substrate 29 and the second resin substrate 30 disposed in front and rear of the liquid crystal layer 49 with respect to the laminating direction are perpendicular to each other" and "the optical axis direction of the substrate and the absorption axis direction of the polarizing plate disposed on the same side via the liquid crystal layer 49 ("the optical axis direction Db1 of the first resin substrate 29 and the absorption axis direction Da1 of the polarizing layer 48 of the first polarizing plate 41" and "the optical axis direction Db2 of the second resin substrate 30 and the absorption axis direction Da2 of the polarizing layer 48 of the second polarizing plate 42") are parallel to each other" as in the present embodiment, it is possible to suppress the deterioration in the viewing angle and the light shielding ratio at the time of light shielding.

Figure 7:
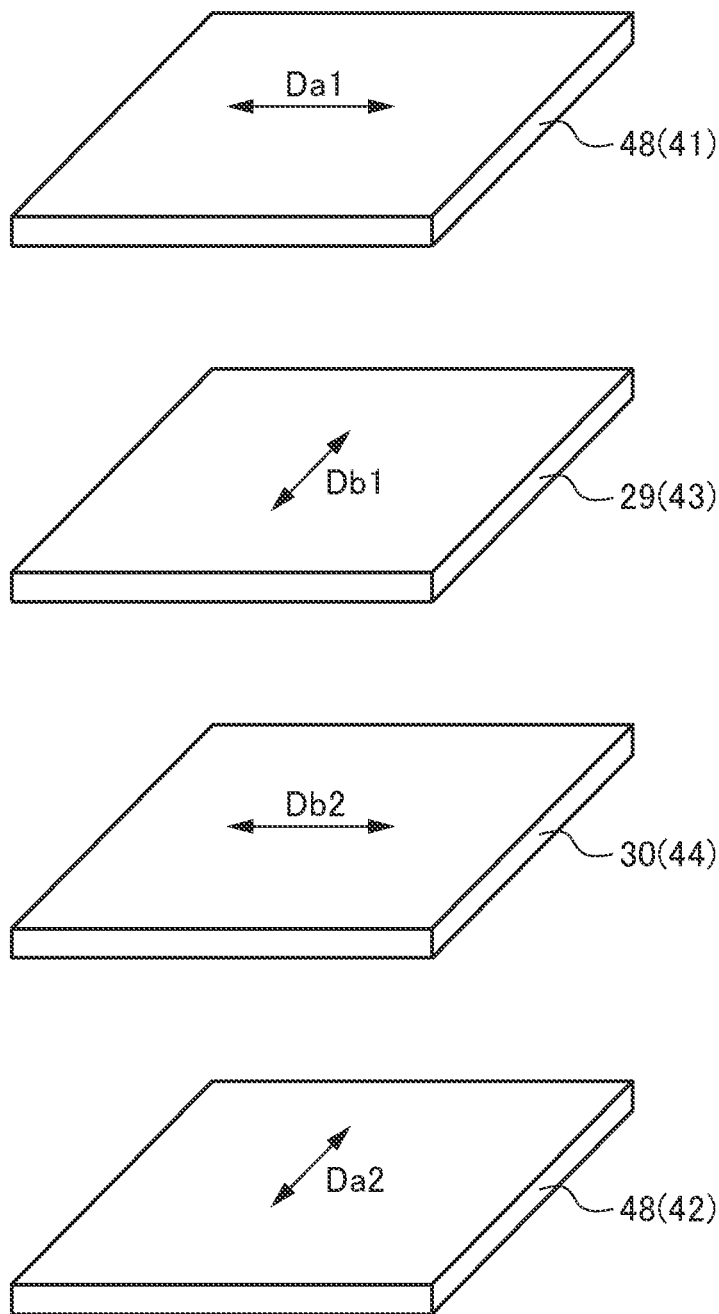
FIG. 7 is a view illustrating the first resin substrate, the second resin substrate, the polarizing layer of the first polarizing plate and the polarizing layer of a second polarizing plate, which illustrates a comparative mode with respect to the first arrangement mode.

FIG. 7 is a view illustrating the first resin substrate 29, the second resin substrate 30, the polarizing layer 48 of the first polarizing plate 41, and the polarizing layer 48 of the second polarizing plate 42 illustrating a comparative mode with respect to the first arrangement mode. In the comparative mode illustrated in FIG. 7, the optical axis direction Db1 of the first resin substrate 29 is perpendicular to the optical axis direction Db2 of the second resin substrate 30, the absorption axis direction Da1 of the polarizing layer 48 of the first polarizing plate 41 is perpendicular to the absorption axis direction Da2 of the polarizing layer 48 of the second polarizing plate 42, the optical axis direction Db1 of the first resin substrate 29 is perpendicular to the absorption axis direction Da1 of the polarizing layer 48 of the first polarizing plate 41, and the optical axis direction Db2 of the second resin substrate 30 is perpendicular to the absorption axis direction Da2 of the polarizing layer 48 of the second polarizing plate 42.

Figure 8:
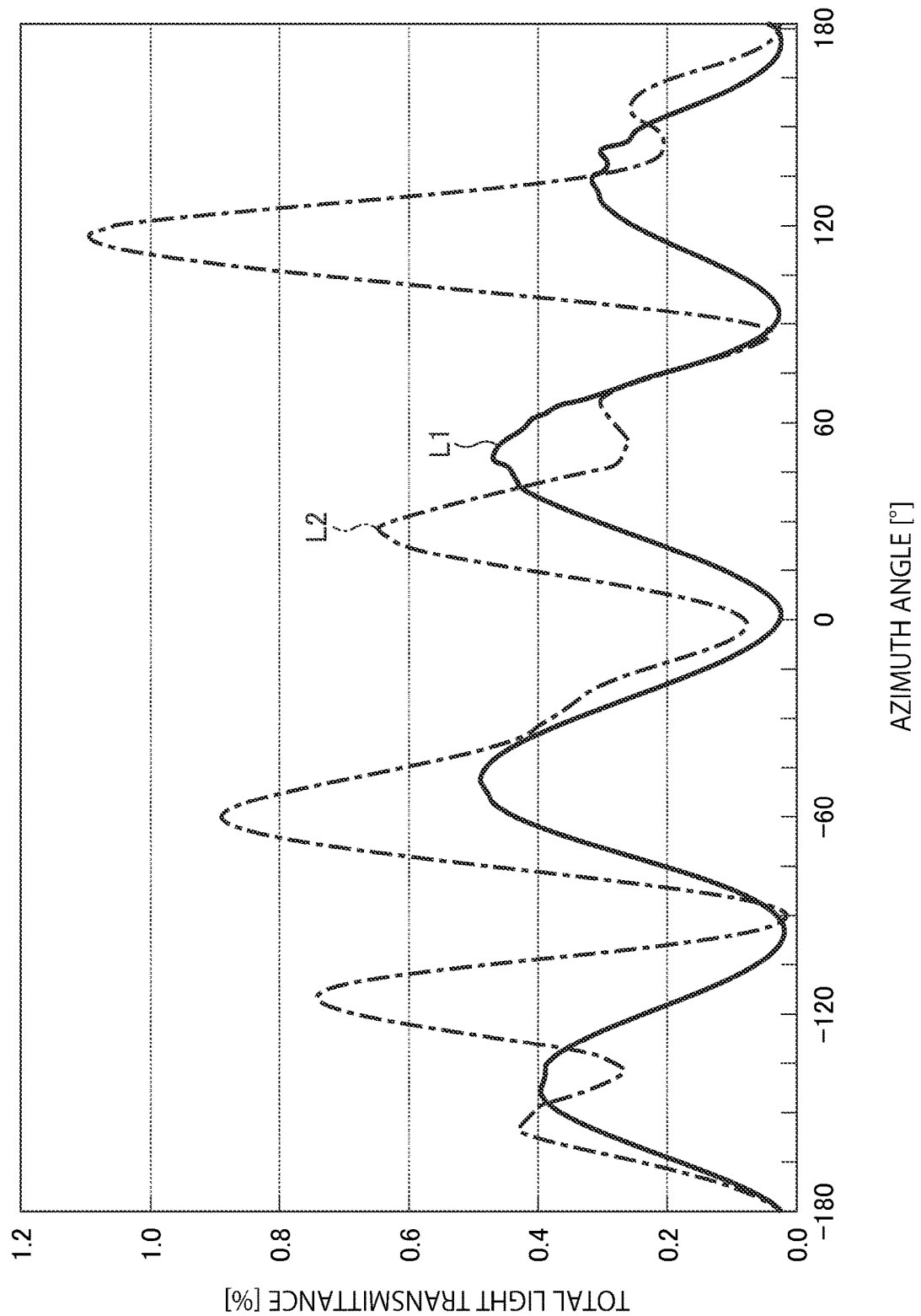
FIG. 8 illustrates a viewing angle characteristic (see a reference sign "L1" in FIG. 8) of the light modulating cell related to the first arrangement mode illustrated in FIG. 6 and a viewing angle characteristic (see a reference sign "L2" in FIG. 8) of the light modulating cell related to the comparative mode illustrated in FIG. 7.

FIG. 8 illustrates a viewing angle characteristic (see a reference sign "L1" in FIG. 8) of the light modulating cell 22 related to the first arrangement mode illustrated in FIG. 6 and a viewing angle characteristic (see a reference sign "L2" in FIG. 8) of the light modulating cell 22 related to the comparative mode illustrated in FIG. 7. Incidentally, the viewing angle characteristics L1 and L2 illustrated in FIG. 8 were obtained by using the light modulating device 10 having the configurations illustrated in FIGS. 1, 3, 4A, and 4B to measure the transmittance while changing an azimuth angle with a polar angle set at 60 degrees in a light shielding state (that is, a power-off state). In FIG. 8, the horizontal axis represents the azimuth angle (°) and the vertical axis represents the total light transmittance (%) including a diffusing component. Incidentally, the "azimuth angle=0°" illustrated in FIG. 8 corresponds to one side of the absorption axis direction Da1 of the polarizing layer 48 of the first polarizing plate 41.

In addition, the "total light transmittance" described herein represents a ratio of a total transmitted light flux relative to the parallel incident light flux of a test piece. In the case of a diffusive sample, the "total transmitted light flux" includes a transmitted light flux that has been diffused (diffusion component). Incidentally, details of the total light transmittance can be determined based on "Japanese Industrial Standards (JIS) 7375: 2008". A "halogen lamp with a dichroic mirror" was used as a light source for measurement of the total light transmittance. The total light transmittance is calculated by the "ratio of light transmitted through the light modulating cell 22" obtained based on the light intensity of the wavelength of 555 nm out of light before being transmitted through the light modulating cell 22 to be measured. Therefore, the total light transmittance can be expressed by a value (%) of the light intensity of the visible light wavelength after transmitted through the light modulating cell 22 when the light intensity of the wavelength of 555 nm before transmitted through the light modulating cell 22 is expressed as "100(%)". A thickness of the light modulating cell 22 used for the measurement was about 0.55 mm, and a haze meter HM-150 of Murakami Color Research Laboratory Co., Ltd. was used as a measurement device.

As apparent from FIG. 8, it is understood that it is possible to reduce a fluctuation amount of the transmittance accompanying a change of the azimuth angle as compared with the comparative mode (refer to reference character "L2" in FIG. 8) illustrated in FIG. 7, and to provide the light modulating cell 22 (the light modulating device 10) excellent in viewing angle characteristics according to the first arrangement mode (see reference character "L1" in FIG. 8) illustrated in FIG. 6.

In addition, regarding the magnitude of the transmittance (total light transmittance) itself, it is understood that the transmittance L1 of the light modulating cell 22 according to the first arrangement mode is suppressed to be smaller than the transmittance L2 of the light modulating cell 22 according to the comparative mode as a whole, and the light modulating cell 22 according to the first arrangement mode can exhibit the excellent light shielding performance.

<Second Arrangement Mode>

FIG. 9 is a view illustrating the first resin substrate 29, the second resin substrate 30, the polarizing layer 48 of the first polarizing plate 41, the polarizing layer 48 of the second polarizing plate 42, and a phase difference compensation film 45a for describing a second arrangement mode.

In this mode, the phase difference compensation film 45a is provided between the first polarizing plate 41 and the first electrode alignment layer 43. The phase difference compensation film 45a adheres to the first polarizing plate 41 (the protective layer 47) via the adhesive layer (OCA) 46, adheres to the first electrode alignment layer 43 (the hard coat layer 53 (see FIG. 4A)) via the other adhesive layer (OCA) 46, and functions as an A-plate. In the phase difference compensation film 45*a* functioning as the A-plate, a refractive index (nx) in an X direction in a film plane is larger than a refractive index (ny) in a Y direction perpendicular to the X direction, and a refractive index (nz) in a Z direction perpendicular to the X direction and the Y direction is equal to the refractive index (ny) in the Y direction (that is, a relationship of "nx>ny=nz" is satisfied). A material forming the phase difference compensation film 45*a* is not particularly limited, but the phase difference compensation film 45*a* of the present embodiment is configured using a biaxially-stretched transparent film made of the COP.

Further, the optical axis of the first resin substrate 29 is parallel to the optical axis of the second resin substrate 30 (see the optical axis directions "Db1" and "Db2" in FIG. 9), the absorption axis of the polarizing layer 48 of the first polarizing plate 41 is perpendicular to the absorption axis of the polarizing layer 48 of the second polarizing plate 42 (see the absorption axis directions "Da1" and "Da2" in FIG. 9), the optical axis direction Db1 of the first resin substrate 29 is perpendicular to the direction Da1 of the absorption axis of the polarizing layer 48 of the first polarizing plate 41, and the optical axis direction Db2 of the second resin substrate 30 is parallel to the direction Da2 of the absorption axis of the polarizing layer 48 of the second polarizing plate 42.

Since the first resin substrate 29 and the second resin substrate 30 are arranged such that "the optical axis direction Db1 of the first resin substrate 29 and the optical axis direction Db2 of the second resin substrate 30 are parallel to each other (coincide with each other)" as described above, the first resin substrate 29 and the second resin substrate 30 can be continuously supplied while being fed out from rolls, respectively. In general, the first resin substrate 29 and the second resin substrate 30 are formed in a rolled state, sequentially fed out from the rolls, and cut out into a shape and size corresponding to each of the light modulating cells 22 for use. On the other hand, the substrate made of resin is granted with the optical anisotropy in which a stretching direction becomes a direction of an optical axis by the stretching treatment in the course of manufacturing, and the longitudinal direction (that is, the feed-out direction) is generally the optical axis direction in the rolled state. Thus, "when the optical axis direction Db1 of the first resin substrate 29 and the optical axis direction Db2 of the second resin substrate 30 coincide with each other" as in this arrangement mode, the first resin substrate 29 fed out from the roll and the second resin substrate 30 fed out from the roll can be continuously superimposed on each other while being fed out without adjusting directions thereof. Therefore, for example, it is possible to produce the long first electrode alignment layer 43 and second electrode alignment layer 44, and mass formation of the light modulating cells 22 having a large area can be performed efficiently, for example, by arranging the hard coat layer 53, the index matching layer 55, the first electrode layer 31, the second electrode layer 32, the first alignment layer 33, and the second alignment layer 34, as illustrated in FIG. 4A and FIG. 4B, on the first resin substrate 29 and the second resin substrate 30 fed out from the rolls.

Incidentally, when the first resin substrate 29 and the second resin substrate 30 are disposed such that "the optical axis direction Db1 of the first resin substrate 29 and the optical axis direction Db2 of the second resin substrate 30 are parallel to each other (coincident with each other)", the optical anisotropy of the first resin substrate 29 and the second resin substrate 30 strongly influences the transmitted light of the light modulating cell 22 so that there is a case where the viewing angle characteristics and the light shielding ratio deteriorate, for example, at the time of light shielding (that is, at the time of black display). In order to suppress such deterioration of the viewing angle characteristics and the light shielding ratio, the second resin substrate 30 and the polarizing layer 48 of the second polarizing plate 42 are disposed such that the optical axis direction Db2 of the second resin substrate 30 and the absorption axis direction Da2 of the polarizing layer 48 of the second polarizing plate 42 are parallel to each other in this arrangement mode. In addition, the phase difference compensation film 45*a* and the second resin substrate 30 are disposed such that the slow-axis direction Dc of the phase difference compensation film 45*a* and the optical axis direction Db2 of the second resin substrate 30 are parallel to each other. In addition, the polarizing layer 48 of the first polarizing plate 41 and the polarizing layer 48 of the second polarizing plate 42 are disposed such that the absorption axis direction Da1 of the polarizing layer 48 of the first polarizing plate 41 is perpendicular to the absorption axis direction Da2 of the polarizing layer 48 of the second polarizing plate 42. As a result, it is possible to suppress the "deterioration of the viewing angle characteristics and the deterioration of the light shielding ratio at the time of light shielding (that is, at the time of black display)" caused by the optical anisotropy of the first resin substrate 29 and the second resin substrate 30.

Incidentally, as a modification of the second arrangement mode illustrated in FIG. 9, the phase difference compensation film 45*a* functioning as the A-plate may be provided between the second resin substrate 30 and the polarizing layer 48 of the second polarizing plate 42 not between the first resin substrate 29 and the polarizing layer 48 of the first polarizing plate 41. In this case, the respective members are arranged such that the slow-axis direction Dc of the phase difference compensation film 45*a* is parallel to the optical axis direction Db1 of the first resin substrate 29, the optical axis direction Db2 of the second resin substrate 30, and the absorption axis direction Da1 of the polarizing layer 48 of the first polarizing plate 41. Even with such an arrangement, it is possible to suppress the "deterioration of the viewing angle characteristics and the deterioration of the light shielding ratio at the time of light shielding (that is, at the time of black display)" caused by the optical anisotropy of the first resin substrate 29 and the second resin substrate 30.

FIG. 10 is a view illustrating the first resin substrate 29, the second resin substrate 30, the polarizing layer 48 of the first polarizing plate 41, the polarizing layer 48 of the second polarizing plate 42, and the phase difference compensation film 45*a*, which illustrates a comparative mode with respect to the second arrangement mode. In the comparative mode illustrated in FIG. 10, the optical axis direction Db1 of the first resin substrate 29 is parallel to the optical axis direction Db2 of the second resin substrate 30, the absorption axis direction Da1 of the polarizing layer 48 of the first polarizing plate 41 is perpendicular to the absorption axis direction Da2 of the polarizing layer 48 of the second polarizing plate 42, the optical axis direction Db1 of the first resin substrate 29 is parallel to the direction Da1 of the absorption axis of the polarizing layer 48 of the first polarizing plate 41, and the optical axis direction Db2 of the second resin substrate 30 is perpendicular to the absorption axis direction Da2 of the polarizing layer 48 of the second polarizing plate 42.

FIG. 11 illustrates a viewing angle characteristic (see a reference sign "L3" in FIG. 11) of the light modulating cell 22 related to the second arrangement mode illustrated in FIG. 9 and a viewing angle characteristic (see a reference sign "L4" in FIG. 11) of the light modulating cell 22 related to the comparative mode illustrated in FIG. 10. Incidentally, the viewing angle characteristics L3 and L4 illustrated in FIG. 11 were obtained by using the light modulating device 10 having the configurations illustrated in FIGS. 1, 3, 4A, and 4B in which the phase difference compensation film 45*a* (see FIGS. 9 and 10) is disposed instead of the phase difference compensation film 45 (see FIG. 3) to measure the transmittance while changing an azimuth angle with a polar angle set at 60 degrees in a light shielding state (that is, a power-off state). In FIG. 11, the horizontal axis represents the azimuth angle (°) and the vertical axis represents the total light transmittance (%) including a diffusing component. Incidentally, the "azimuth angle=0°" illustrated in FIG. 11 corresponds to one side of the absorption axis direction Da1 of the polarizing layer 48 of the first polarizing plate 41. In addition, the total light transmittance was measured in the same manner as in the case illustrated in FIG. 8 described above.

As apparent from FIG. 11, it is understood that it is possible to reduce a fluctuation amount of the transmittance accompanying a change of the azimuth angle as compared with the comparative mode (refer to reference character "L4" in FIG. 11) illustrated in FIG. 10, and to provide the light modulating cell 22 (the light modulating device 10) excellent in viewing angle characteristics according to the second arrangement mode (see reference character "L3" in FIG. 11) illustrated in FIG. 9.

In addition, regarding the magnitude of the transmittance (total light transmittance) itself, it is understood that the transmittance L3 of the light modulating cell 22 according to the second arrangement mode is suppressed to be smaller than the transmittance L4 of the light modulating cell 22 according to the comparative mode as a whole, and the light modulating cell 22 according to the second arrangement mode can exhibit the excellent light shielding performance.

EXAMPLES

Next, various examples relating to a verification result of pasting performance of the light modulating cell 22 to the light transmissive plate 21 will be described.

FIG. 12 is a table illustrating state evaluations of pasting of the light modulating cells 22 (Examples 1 to 3) to the curved surface 20 of the light transmissive plate 21.

Although the same light modulating cell 22 was used in the light modulating device 10 of Example 1 and Example 3, planar sizes (an X direction size and a Y direction size in the direction perpendicular to the laminating direction) of the light transmissive plate 21, a thickness (a length in the laminating direction (a Z direction size)), and a curvature of the curved surface 20 of the light transmissive plate 21 were different therebetween. Incidentally, in FIG. 12, "1800 R" indicates a curvature of a curve drawn by a circle with a radius of 1800 mm, and "1400 R" indicates a curvature of a curve drawn by a circle with a radius of 1400 mm.

In the light modulating cell 22 used in the light modulating device 10 of Example 1 and Example 3, planar sizes (an X direction size and a Y direction size in the direction perpendicular to the laminating direction) were 280 mm (the X direction size) and 288 mm (the Y direction size), and a thickness (a length in the laminating direction (a Z direction size)) was 0.63 mm. Polycarbonate was used as a substrate (see the first resin substrate 29 and the second resin substrate 30 in FIG. 3), and an ITO film using this polycarbonate substrate was used as an electrode substrate. As a polarizing layer (see the polarizing layer 48 in FIG. 3), dye-based and iodine-based polarizing elements that have proven for applications of a liquid crystal display (LCD) and a car navigation were used. A large number of randomly disposed bead-shaped spacers having a diameter of 6 μm were used as a spacer (see the spacer 52 in FIG. 3) provided in the liquid crystal layer 49. The hybrid sealing member 36 containing a UV curable resin and a thermosetting resin, the sealing member 36 having a length in the width direction (a length in the direction perpendicular to the laminating direction) of 1.5 mm was used.

On the other hand, in the light modulating device 10 of Example 2, the same light transmissive plate 21 as that of Example 3 was used, planar sizes (an X direction size and a Y direction size in the direction perpendicular to the laminating direction) were 423 mm (the X direction size) and 337 mm (the Y direction size), and a thickness (a length in the laminating direction (a Z direction size)) was 0.7 mm. In addition, in the light modulating cell 22 used in the light modulating device 10 of Example 2, planar sizes (an X direction size and a Y direction size in the direction perpendicular to the laminating direction) were 280 mm (the X direction size) and 280 mm (the Y direction size), and a thickness (a length in the laminating direction (the Z direction size)) was 0.54 mm. A COP was used as a substrate (see the first resin substrate 29 and the second resin substrate 30 in FIG. 3), and a COP biaxial plate for VA compensation was used as an optical compensation film of a polarizing plate (see the polarizing layer 48 in FIG. 3). A plurality of columnar spacers having a cross-sectional diameter of 15 μm and spaced at a pitch of 230 μm was used as spacers (see the spacer 52 of FIG. 3) provided in the liquid crystal layer 49. The sealing member 36 having a length in the width direction (a length in the direction perpendicular to the laminating direction) of 5 mm was used. The other configurations of the light modulating cell 22 of Example 2 were the same as those of the light modulating cell 22 of Examples 1 and 3 described above.

The other configurations of the light modulating device 10 according to Examples 1 to 3 were the same as the configurations illustrated in FIG. 3.

When a pasting state of the light modulating cell 22 to the light transmissive plate 21 was visually confirmed in the light modulating device 10 of Examples 1 to 3, no conspicuous distortion (wrinkle or the like) was generated in the light modulating cells 22 of Examples 1 and 3, but a wrinkles was conspicuous in the light modulating cell 22 of Example 2, and it was difficult to properly paste the light modulating cells 22 to the light transmissive plate 21.

FIG. 13 is a table illustrating state evaluations of pasting of the light modulating cells 22 (Examples 4 to 9) to the curved surface 20 of the light transmissive plate 21.

In Examples 4 to 9, the "light modulating cells 22 having different characteristics" were pasted to the "light transmissive plate 21 having the same characteristic" via the "optically transparent adhesive film 24 having the same characteristic", and states of the light modulating cells 22 pasted to the light transmissive plate 21 were evaluated. Specifically, the light transmissive plate 21 had planar sizes of 423 mm (an X direction length) and 337 mm (a Y direction length), and a thickness (a Z direction length) of 0.7 mm.

Substrates (see the first resin substrate 29 in FIG. 4A and the second resin substrate 30 in FIG. 4B), a shape of the spacer 52, a length in the width direction of the sealing member 36 (see "Seal Width" in FIG. 13), the first polarizing plate 41 (particularly, see the "polarizing layer 48" in FIG. 3), and the second polarizing plate 42 (particularly, see the "polarizing layer 48" in FIG. 3) were mainly changed as appropriate as illustrated in FIG. 13 in the light modulating cells 22.

The item "Substrate" in FIG. 13 indicates a component of the substrate that was actually used, and a COP (Examples 4, 6, and 7) or polycarbonate (Examples 5, and 8 to 9) was used.

In the item "Spacer" in FIG. 13, "Columnar Shape" indicates that the plurality of columnar spacers 52 having a cross-sectional diameter of 15 μm was spaced at a pitch of 230 μm, and "Bead Shape" indicates that the plurality of spherical spacers 52 having a diameter of 6 μm was randomly disposed.

In "Seal Width" of FIG. 13, "5 mm (+a margin of 5 mm)" indicates a state where a length of the sealing member 36 in the direction perpendicular to the laminating direction was 5 mm, and the first electrode alignment layer 43 and the second electrode alignment layer 44 protruded by 5 mm with respect to the direction perpendicular to the laminating direction on the side opposite to the liquid crystal layer 49 via the sealing member 36. In addition, "1.5 mm (+a margin of 0 mm)" indicates a state where a length of the sealing member 36 in the direction perpendicular to the laminating direction was 1.5 mm, and the first electrode alignment layer 43 and the second electrode alignment layer 44 protruded by 0 mm (that is, the first electrode alignment layer 43 and the second electrode alignment layer 44 did not protrude from the sealing member 36) with respect to the direction perpendicular to the laminating direction on the side opposite to the liquid crystal layer 49 via the sealing member 36.

"First Polarizing Plate" in FIG. 13 indicates a member of the polarizing layer 48 of the first polarizing plate 41, and "Second Polarizing Plate" indicates a member of the polarizing layer 48 of the second polarizing plate 42. The "Iodine-Based (with COP Biaxial Compensation Plate)" in FIG. 13 indicates that the polarizing layer 48 was configured using an iodine-based polarizer, the polarizer in which a COP plate having biaxial optical compensation performance was attached, "Iodine-Based" indicates that the polarizing layer 48 was configured using an iodine-based polarizer (without an optical compensating plate), and "Dye-Based" indicates that the polarizing layer 48 was configured using a dye-based polarizer (without an optical compensator).

"Pasting State" in FIG. 13 indicates the state of the light modulating cell 22 (particularly the degree and presence or absence of distortion such as wrinkles) pasted to the curved surface 20 of the light transmissive plate 21 via the optically transparent adhesive film 24. "Very Bad" (Example 4) indicates that a very conspicuous wrinkle was generated in the light modulating cell 22, a tubular wrinkle portion called tunneling was formed in the light modulating cell 22, and the light modulating cell 22 was in a practically unusable state. "Bad" (Example 5) indicates that a conspicuous wrinkle was generated in the light modulating cell 22, tunneling was formed in the light modulating cell 22, and the light modulating cell 22 is in a state where practical use thereof was not easy. "Average" (Example 6) indicates that a wrinkle generated in the light modulating cell 22 was inconspicuous, but small tunneling was formed in the light modulating cell 22. "Good" (Example 7) indicates that an inconspicuous wrinkle was slightly generated in the light modulating cell 22, but tunneling was not formed, and the light modulating cell 22 was in a practically usable state. "Excellent" (Examples 8 to 9) indicates that distortion such as wrinkles was not confirmed in the light modulating cell 22, the light modulating cell 22 was pasted to the light transmissive plate 21 in a very good condition, and the light modulating cell 22 was in the state of exhibiting good light transmitting performance and light shielding performance.

The other configurations of the light modulating device 10 according to Examples 4 to 9 were the same as the configurations illustrated in FIG. 3.

From the results illustrated in FIG. 13, it is understood that the pasting state of the light modulating cell 22 is improved in the light modulating devices 10 of Examples 5 to 7 as compared with the light modulating device 10 of Example 4. The light modulating cell 22 of Example 5 has the same configuration as the light modulating cell 22 of Example 4 except that polycarbonate was used as a substrate (see the first resin substrate 29 in FIG. 4A and the second resin substrate 30 in FIG. 4B) instead of a COP. Therefore, it is understood that polycarbonate is preferable as a constituent material of the first resin substrate 29 and the second resin substrate 30. In addition, the light modulating cell 22 of Example 6 has the same configuration as the light modulating cell 22 of Example 4 except that a "dye-based polarizer" was used as the polarizing layers 48 of the first polarizing plate 41 and the second polarizing plate 42, instead of an "iodine-based polarizer to which a COP plate having biaxial optical compensation performance is attached" or an "iodine-based polarizer".

Therefore, it is understood that the dye-based polarizer is preferable as a constituent material of the polarizing layers 48 of the first polarizing plate 41 and the second polarizing plate 42. In addition, the light modulating cell 22 of Example 7 has the same configuration as the light modulating cell 22 of Example 4 except that a width of the sealing member 36 was 1.5 mm and there were no extended portions of the first electrode alignment layer 43 and the second electrode alignment layer 44 (that is, "a margin=0 mm"). Therefore, it is understood that the width of the sealing member 36 in the direction perpendicular to the laminating direction is preferably 1.5 mm. Incidentally, when the width of the sealing member 36 is too small, destruction of the light modulating cell 22 sometimes occurs due to a decrease in an adhesion force of the sealing member 36. On the other hand, when the width of the sealing member 36 is too large, there is a possibility that the followability of the sealing member 36 with respect to the curved surface whose shape changes three-dimensionally becomes insufficient.

In addition, the light modulating cells 22 of Examples 8 to 9 Illustrated in FIG. 13, has the same configuration as the light modulating cell 22 of Example 4 except that "polycarbonate was used as a constituent material of the first resin substrate 29 and the second resin substrate 30 (see Example 5)", a "dye-based polarizer was used as a constituent material of the polarizing layers 48 of the first polarizing plate 41 and the second polarizing plate 42 (see Example 6)", and a "width of the sealing member 36 was 1.5 mm, and there were no extended portions of the first electrode alignment layer 43 and the second electrode alignment layer 44" (see Example 7). It is inferred that the consideration of the above-described Examples 4 to 7 is appropriate even from the results that the pasting states of the light modulating cells 22 according to Examples 8 to 9 were better than those of the light modulating cells 22 according to Examples 4 to 7.

Incidentally, the light modulating cell 22 of Example 8 and the light modulating cell 22 of Example 9 have the same configuration except that shapes of the spacers 52 were different therebetween, and both the pasting states of the light modulating cell 22 of Example 8 and the light modulating cell 22 of Example 9 were very good. Therefore, it is inferred that the influence of the shape of the spacer 52 on the lamination state of the light modulating cell 22 is completely absent or very small.

FIG. 14 is a table illustrating state evaluations of pasting of the light modulating cells 22 (Examples 10 to 12) to the curved surface 20 of the light transmissive plate 21.

In Examples 10 to 12, the "light modulating cells 22 having the same characteristic" were pasted to the "light transmissive plate 21 having the different characteristics" via the "optically transparent adhesive film 24 having the same characteristic", and states of the light modulating cells 22 pasted to the light transmissive plate 21 were evaluated.

Specifically, the optically transparent adhesive films 24 having different thicknesses in the laminating direction, different storage moduli at room temperature, and different loss tangents were used while using the light transmissive plate 21 and the light modulating cell 22 having the same characteristics as those of the above-described Example 8 (FIG. 13). These properties of Examples 10 to 12 illustrated in FIG. 14 are values obtained by setting a frequency to 10 Hz (Hertz), setting a temperature rise condition to 5° C./min (minute), and performing measurement using UBM measuring instrument "Rheogel E4000". FIG. 14 illustrates the storage elastic modulus and the loss tangent at each of 25° C. and 50° C.

With respect to the item "Pasting State of Light modulating cells" in FIG. 14, "Average" (Example 10) illustrates a state where some degree of distortion is observed in the light modulating cell 22. "Good" (Example 11) indicates that distortion smaller than the distortion of the light modulating cell 22 of Example 10 was observed in the light modulating cell 22, but the light modulating cell 22 was in a relatively good state. "Excellent" (Example 12) indicates that no distortion in the light modulating cell 22 was observed and the light modulating cell 22 was in a very good state.

When comparing Examples 10 to 12, it is understood that the storage elastic modulus of the optically transparent adhesive film 24 is preferably small (for example, see Example 10 ("$2.9 \times 10^7$ Pa/25° C.") and Example 11 ("$1.1 \times 10^7$ Pa/25° C.")) from the viewpoint of improving the pasting state of the light modulating cell 22 with respect to the light transmissive plate 21. In addition, the loss tangent of the optically transparent adhesive film 24 is preferably small (for example, see Example 10 ("0.95/25° C."), Example 11 ("0.90/25° C.")), and Example 12 ("0.41/25° C."). In addition, it is conceivable that the thickness of the optically transparent adhesive film 24 in the laminating direction is preferably as thick as possible. When comparing Examples 10 to 12, it is conceivable that the storage elastic modulus and the loss tangent of the optically transparent adhesive film 24 have greater influence on the pasting state of the light modulating cell 22 with respect to the light transmissive plate 21 than the thickness of the optically transparent adhesive film 24.

<Detailed Configuration of Spacer>

A preferable relational example between the "hardness of the spacer 52" and the "hardness of a portion on which a distal end of the spacer 52 abuts" will be described hereinafter.

Figure 15:
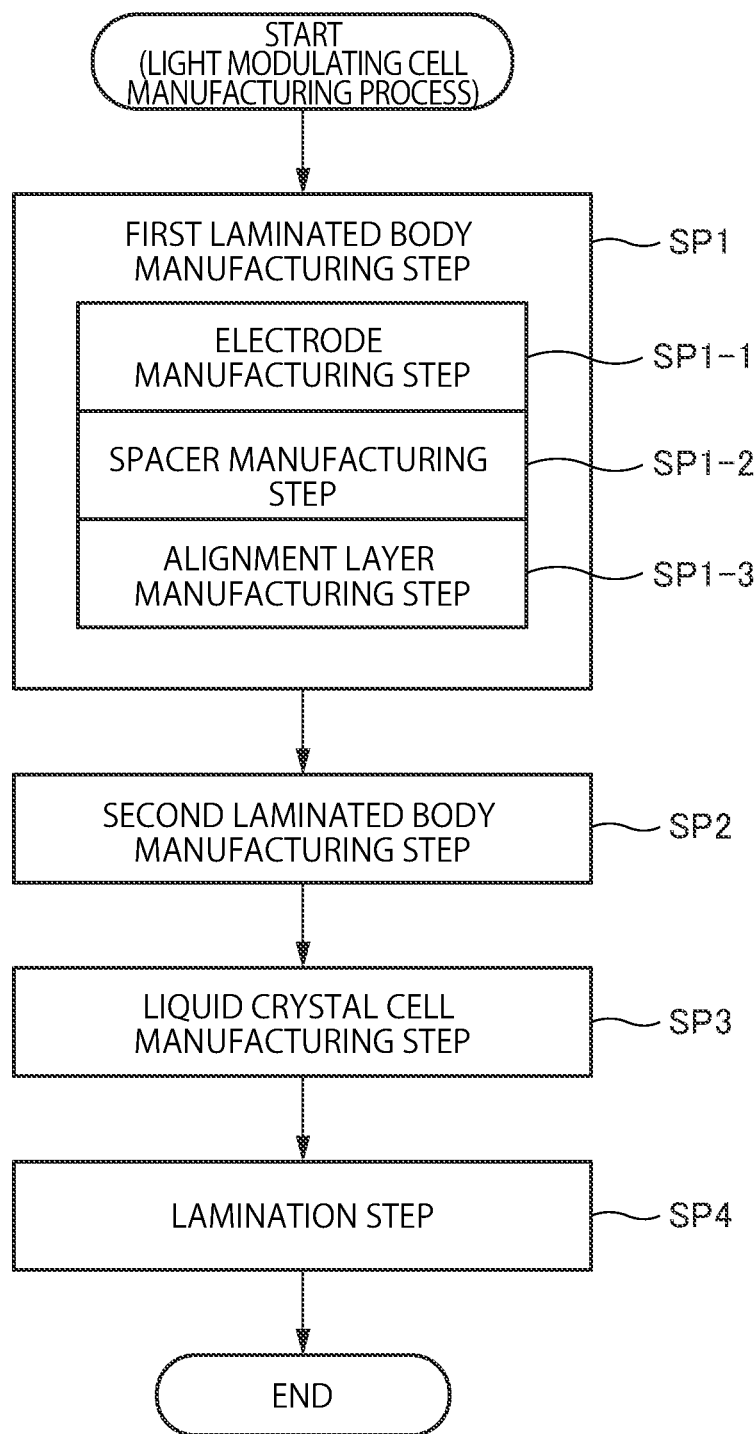
FIG. 15 is a flowchart illustrating an outline of a manufacturing process of a light modulating cell.

In the embodiment to be described below, a spacer 52 is formed in a cylindrical shape or a truncated cone shape using a photoresist in a manufacturing process of the light modulating cell 22 illustrated in FIG. 15. That is, in the manufacturing process of the light modulating cell 22, manufacture (see a reference sign "SP1" in FIG. 15) of a first laminated body, manufacture (see a reference sign "SP2" in FIG. 15) of a second laminated body, manufacture (see a reference sign "SP3" in FIG. 15) of a liquid crystal cell (see the "liquid crystal layer 49" in FIG. 3), and lamination (see a reference sign "SP4" in FIG. 15) of these members are sequentially performed. Incidentally, the formation step SP1 of the first laminated body includes a formation step SP1-1 of an electrode (that is, the "second electrode layer 32"), a formation step SP1-2 of the spacer 52, and a formation step SP1-3 of an alignment layer (that is, the "second alignment layer 34"). Although not illustrated, the formation step SP2 of the second laminated body includes a formation step of an electrode (that is, the first electrode layer 31) and a formation step of an alignment layer (that is, the "first alignment layer 33"). The spacer 52 is manufactured in this manner. In the present embodiment, a Vickers hardness value Xs of each of the spacers 52 is not less than 16.9 and not more than 40.2 (that is, "$16.9 \leq Xs \leq 40.2$" is satisfied), a Vickers hardness value Xf of the portion of the first electrode alignment layer 43 (particularly, the first alignment layer 33) on which the distal end of the spacer 52 abuts is set to be not less than 11.8 and not more than 35.9 (that is, "$11.8 \leq Xf \leq 35.9$" is satisfied), and as a result, the reliability of the spacer is further improved as compared with the related art. Incidentally, the Vickers hardness value is a measurement value under conditions described in the following Examples.

For example, in the case where each of the spacers 52 is mainly configured only using the core portion without the covering portion, (that is, the spacer 52 includes the core portion but does not include the covering portion), the above-described Xs is represented by the Vickers hardness value of each of the plurality of spacers (core portions) 52, and the above-described Xf is represented by the Vickers hardness value of the portion of the first alignment layer 33 on which the distal end of each of the plurality of spacers 52 abuts. On the other hand, when the covering portion is provided on the core portion and each of the spacers 52 is mainly configured using the combination of the core portion and the covering portion (that is, the spacer 52 includes the core portion and the covering portion), the above-described Xs is represented by a Vickers hardness value of the core portion and covering portion of each of the spacers 52, and the above-described Xf is represented by a Vickers hardness value of a portion of the first alignment layer 33 on which the covering portion covering the distal end of each of the plurality of spacers 52 abuts. The "Vickers hardness value of the core portion and the covering portion of each of the spacers 52" referred to herein means a Vickers hardness value measured in a state where the core portion is covered with the covering portion.

When the Vickers hardness value Xf of the portion of the first electrode alignment layer 43 (particularly, the first alignment layer 33) on which the distal end of the spacer 52 abuts is smaller than 11.8, the distal end of the spacer 52 penetrates an opposite surface due to a pressing force during use, and as a result, the cell gap becomes non-uniform or a local alignment defect occurs. In this case, scratches are generated in the first resin substrate 29 due to contact or the like at the time of assembling the spacer 52, or cracks are generated when the whole is bent.

In addition, when the Vickers hardness value Xs of the spacer 52 is smaller than 16.9, the spacer 52 is crushed by an external pressure, the cell gap is reduced, and it is difficult to obtain the desired cell gap. In addition, even when the Vickers hardness value Xs of the spacer 52 exceeds 40.2, or even when the Vickers hardness value Xf of the portion of the first electrode alignment layer 43 (particularly, the first alignment layer 33) on which the distal end of the spacer 52 abuts exceeds 35.9, there is a case where the cell gap is reduced or scratches or cracks occur.

However, when the Vickers hardness value Xs of the spacer 52 is not less than 16.9 and not more than 40.2 and the Vickers hardness value Xf of the portion of the first electrode alignment layer 43 (particularly the first alignment layer 33) on which the distal end of the spacer 52 abuts is set to not less than 11.8 and not more than 35.9, these problems are solved at once, and the reliability of the spacer 52 can be further improved as compared with the related art.

[Test Results]

FIGS. 16 and 17 are tables illustrating test results used to confirm the configuration relating to this spacer. Examples in FIGS. 16 and 17 are identically configured except that the configuration relating to the spacer 52 and an alignment layer on which the spacer 52 abuts is different. More specifically, the light modulating cells of these Examples, the spacer 52 is provided only on a lower laminated body (see the second electrode alignment layer 44), and the Vickers hardness value Xs of the spacer 52 was varied by adjusting manufacturing conditions relating to this spacer 52. In addition, the Vickers hardness value Xf of the portion of the first electrode alignment layer 43 (particularly, the first alignment layer 33) on which the distal end of the spacer 52 abuts was varied by adjusting conditions for manufacturing the first alignment layer 33.

That is, the spacer 52 is formed by applying a coating liquid on the spacer 52, drying the coating liquid, and then, a part for manufacturing the spacer 52 is selectively exposed by mask exposure using an exposure device. Incidentally, this corresponds to the case of a negative photoresist, and a part other than the part where the spacer 52 is disposed is selectively exposed in the case of a positive photoresist.

Thereafter, in the spacer 52, an unexposed part or the part having been subjected to the exposure treatment is selectively removed by development treatment, and treatment such as rinsing is executed, and treatment such as drying is executed as necessary.

In this exposure treatment, there is a case where the photoresist in a so-called half-cured state is heated in advance to perform the exposure treatment or the exposure treatment is performed under a heated environment in some cases. In addition, there is a case where heat treatment is performed to promote the reaction after the treatment such as rinsing in the development treatment. The hardness value Xs of the spacer 52 can be determined depending on selection of a material of the photoresist relating to the spacer 52, a coating step, an exposure step, a heating temperature at firing in an oven, a temperature of heating during a development step, setting of time, an exposure light amount and an exposure time, and setting of a mask cap.

In the present embodiment, by adjusting the heating temperature and time in these exposure step and development step, the lower laminated body (see second electrode alignment layer 44) having the Vickers hardness value Xs of the spacer 52 of 14.8, 16.9, 22.2, 40.2, or 51.4 was formed (FIG. 18).

Incidentally, this hardness is a measurement value measured by adjusting each of the manufacturing conditions of the spacer 52 to manufacture the lower laminated body (see the second electrode alignment layer 44) and once manufacturing the light modulating cell 22 using this lower laminated body (see the second electrode alignment layer 44), and then, disassembling the light modulating cell 22. In addition, this measurement value is a result of measurement performed by measuring twelve points in each light modulating cell and calculating an average value of remaining ten points excluding the maximum value and the minimum value.

Incidentally, the spacer 52 was manufactured in a cylindrical shape having a diameter of 9 μm and a height of 6 μm. In addition, the spacers 52 were regularly disposed at a pitch of 110 μm in two directions orthogonal to an in-plane direction of the second resin substrate 30. Therefore, a ratio (occupancy rate) occupied by the spacer 52 on the second resin substrate 30 is 0.5% ($=((9/2)^2 \times 3)/(110)^2$).

When the occupancy rate of the spacer 52 is large, the stress to be applied per spacer decreases so that the transmittance deteriorates and the light shielding ratio deteriorates although it is possible to mitigate the phenomenon that the spacer 52 collapses or the distal end penetrates. However, when the occupancy rate of the spacer 52 is small, it is impossible to avoid the phenomenon that the spacer 52 collapses or the distal end penetrates although it is possible to secure the optical characteristics such as the transmittance and light shielding ratio. As a result, the occupancy rate of the spacer 52 is desirably not less than 0.5% and not more than 10%.

On the other hand, the first alignment layer 33 of the first electrode alignment layer 43, the surface on which the spacer 52 abuts, was manufactured by applying a coating liquid, and drying and thermally curing the coating liquid, and the Vickers hardness value Xf was set to a desired value by adjusting conditions (a heating temperature and a heating time) of the thermal curing, and the like. As a result, the first electrode alignment layer 43 having the Vickers hardness value Xf of 10.2, 11.8, 24.8, 35.9, or 38.5 was manufactured in Examples (FIG. 19). Incidentally, this hardness value Xf is a measurement value measured by adjusting each of the manufacturing conditions of the first alignment layer 33 to manufacture the first electrode alignment layer 43 having a different hardness for the first alignment layer 33 of the first electrode alignment layer 43, the surface on which the spacer 52 abuts, and once measuring the light modulating cell 22 using this first electrode alignment layer 43, and then, disassembling the light modulating cell 22. In addition, this measurement value is a result of measurement performed by measuring twelve points and calculating an average value of remaining ten points excluding the maximum value and the minimum value.

Incidentally, the Vickers hardness values Xs and Xf were measured using a PICODENTOR HM500 manufactured by Helmut Fischer GmbH. The measurement was performed with measurement conditions by setting a maximum load of 100 mN with a pushing speed of 300 mN/20 sec, a release speed of 300 mN/20 sec, and a creep time of 5 seconds.

In each of Examples of FIGS. 16 and 17, a light modulating cell was manufactured using the first electrode alignment layer 43 and the second electrode alignment layer 44, manufactured in this manner, and tested. In tests of FIGS. 16 and 17, a weight corresponding to 0.8 MPa was applied in a state where the light modulating cell was placed on a smooth surface having a high hardness using a surface plate, the cell gap was measured to determine a decrease of the cell gap.

Incidentally, the weighting time was 24 hours. In addition, an upper laminated body including the first alignment layer 33 and a lower laminated body including the second alignment layer 34 were peeled off after applying the weight as described above, the spacer 52 was observed with a microscope, collapse of the spacer 52 (hereinafter also referred to as a "spacer collapse") was observed to observe a decrease in cell gap. In addition, the portion on which the spacer 52 abuts was observed with the microscope and a state of penetration (film penetration) at a distal end of the spacer 52 was observed.

Here, in the observation with this microscope, a front view, an oblique view, and a cross section were observed using a technique such as SEM, the presence or absence of deformation of the spacer 52 was visually confirmed. When deformation of the spacer 52 was confirmed, the presence or absence of "a cell gap decrease and a spacer collapse" was determined in accordance with such a situation. Therefore, in FIGS. 16 and 17, "G" indicates a case where no abnormality relating to the corresponding item was observed, and "N" indicates a case where an abnormality relating to the corresponding item was observed.

Similarly, a portion where the spacer 52-abuts was obliquely observed using a technique such as SEM, "Film Penetration" was determined as "N" when a depression (concave portion) was confirmed, and "Film Penetration" was determined as "G" when no concave portion was observed.

In addition, the relative positions of the first electrode alignment layer 43 and the second electrode alignment layer 44 were displaced at 0.1 cm/sec in a state where the first electrode alignment layer 43 and the second electrode alignment layer 44 were laminated and a load corresponding to 0.1 MPa was applied, and generation of scratches was visually confirmed. Here, the item of "Scratch" in FIGS. 16 and 17 was indicated by "N" when the generation of scratches was confirmed in more than half of a plurality of samples. Conversely, the item of "Scratch" was indicated by "G" when generation of scratches was not confirmed in more than half of the plurality of samples.

In addition, the light modulating cell was wound around a cylindrical mandrel having a diameter of 2 mm following the provision of a bending test in JIS K5600-5-1 in a state of the light modulating cell, and the presence or absence of generation of cracks in the substrate (generation of cracks in the first resin substrate 29 and the second resin substrate 3) was confirmed. In this test, the item of "Crack" in FIGS. 16 and 17 was indicated by "N" when the generation of cracks in the substrate was confirmed in more than half of the plurality of samples. Conversely, the item of "Crack" was indicated by "G" when the generation of cracks in the substrate was not confirmed in more than half of the plurality of samples.

As apparent from the measurement results in FIGS. 16 and 17, when the Vickers hardness value Xs of the spacer 52 was less than 16.9 (Examples 30 and 32), a cell gap decrease was observed, and penetration of the spacer distal end into the film, a scratch, and a crack were observed in Example 30. In addition, when the Vickers hardness value Xf of the portion of the first electrode alignment layer 43 (particularly, the first alignment layer 33) where the distal end of the spacer 52 abuts was less than 11.8 (Examples 20 and 22), a scratch and a crack were observed, and penetration of the spacer distal end into the film was observed in Example 22.

In addition, when the Vickers hardness value Xs of the spacer 52 exceeded 40.2 (Examples 31 and 33), a cell gap decrease and penetration of the spacer distal end into the film were observed in Example 31, and a scratch was observed in Example 33. In addition, when the Vickers hardness value Xf of the portion of the first electrode alignment layer 43 (particularly, the first alignment layer 33) where the distal end of the spacer 52 abuts exceeds 35.9 (Examples 21 and 23), a cell gap decrease and a scratch were observed, and a crack was observed in Example 23.

However, in Examples 13 to 19 and 24 to 29, these phenomena ("Cell Gap Decrease", "Film Penetration", "Scratch", and "Crack" illustrated in FIGS. 16 and 17) were not observed, and as a result, it was confirmed that the reliability can be sufficiently secured with respect to the spacer 52.

<Guest-Host Liquid Crystal>

The present invention is also applicable to a light modulating cell 22 employing a guest-host liquid crystal. That is, a liquid crystal layer 49 may contain a dichroic dye (guest) and a liquid crystal (host). The dichroic dye contained in the liquid crystal layer 49 is preferably a coloring material that has a light shielding property and capable of shielding (absorbing) desired visible light.

Figure 21A:
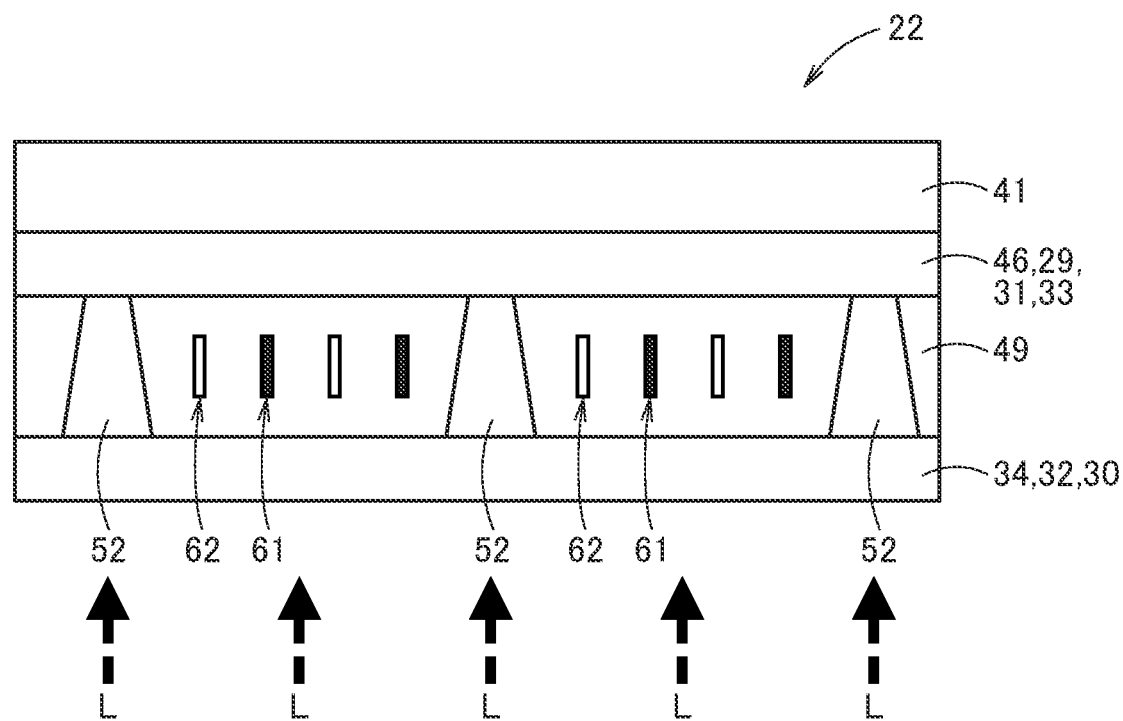
FIG. 21A is a conceptual view for describing the same light modulating cell (a light transmitting state) as those in FIGS. 20A and 20B, and is a cross sectional view of the light modulating cell.
Figure 21B:
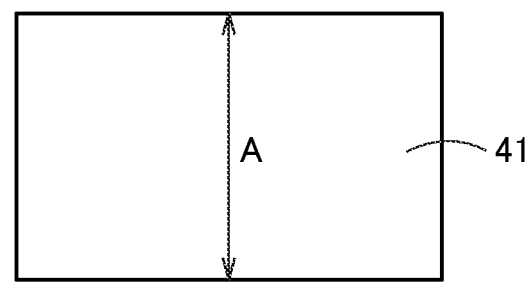
FIG. 21B is a conceptual view for describing the same light modulating cell (a light transmitting state) as those in FIGS. 20A and 20B, and is a plan view of the first polarizing plate in which the absorption axis direction is indicated by the arrow "A".
Figure 22:
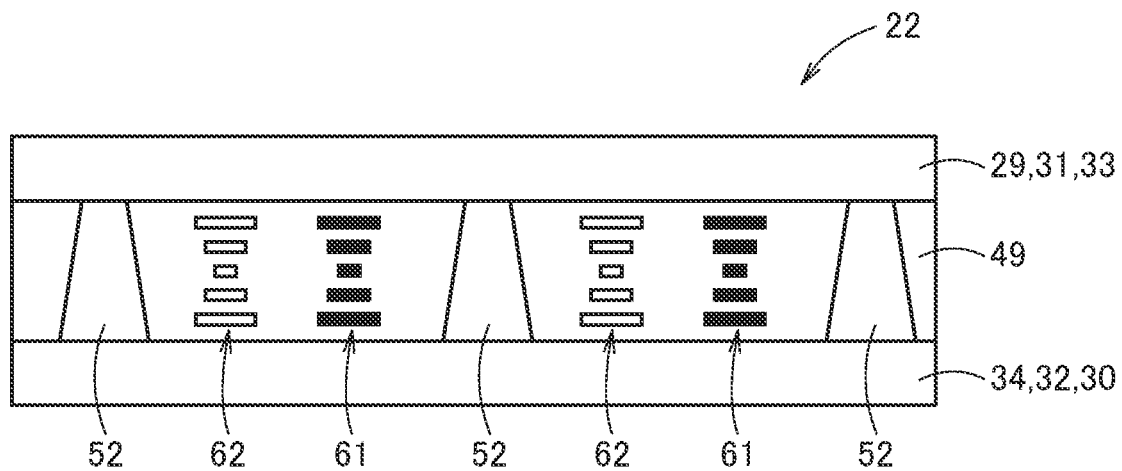
FIG. 22 is a conceptual view for describing another example (a light shielding state) of the light modulating cell employing the guest-host liquid crystal, and illustrates a cross section of the light modulating cell.
Figure 23:
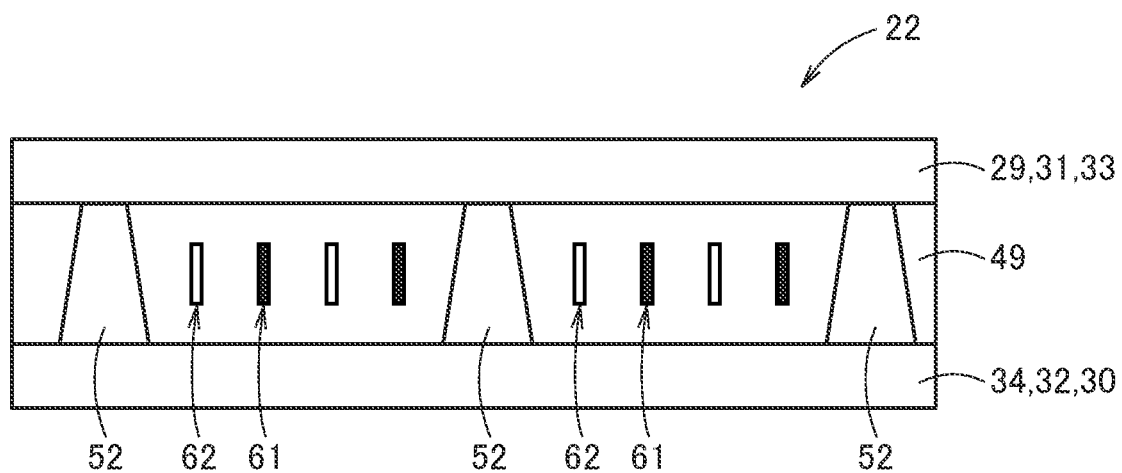
FIG. 23 is a conceptual view for describing the same light modulating cell (the light transmitting state) as that of FIG. 22, and illustrates a cross section of the light modulating cell.

A specific configuration of the light modulating cell 22 employing the guest-host liquid crystal to which the present invention is applicable is not particularly limited. For example, only one polarizing plate may be provided as illustrated in FIGS. 20 and 21 to be described later, or a polarizing plate is not necessarily provided as illustrated in FIGS. 22 and 23 to be described later, instead of providing a pair of polarizing plates (see the first polarizing plate 41 and the second polarizing plate 42 in FIG. 3). Hereinafter, a typical example of the light modulating cell 22 employing the guest-host liquid crystal will be described.

Figure 20A:
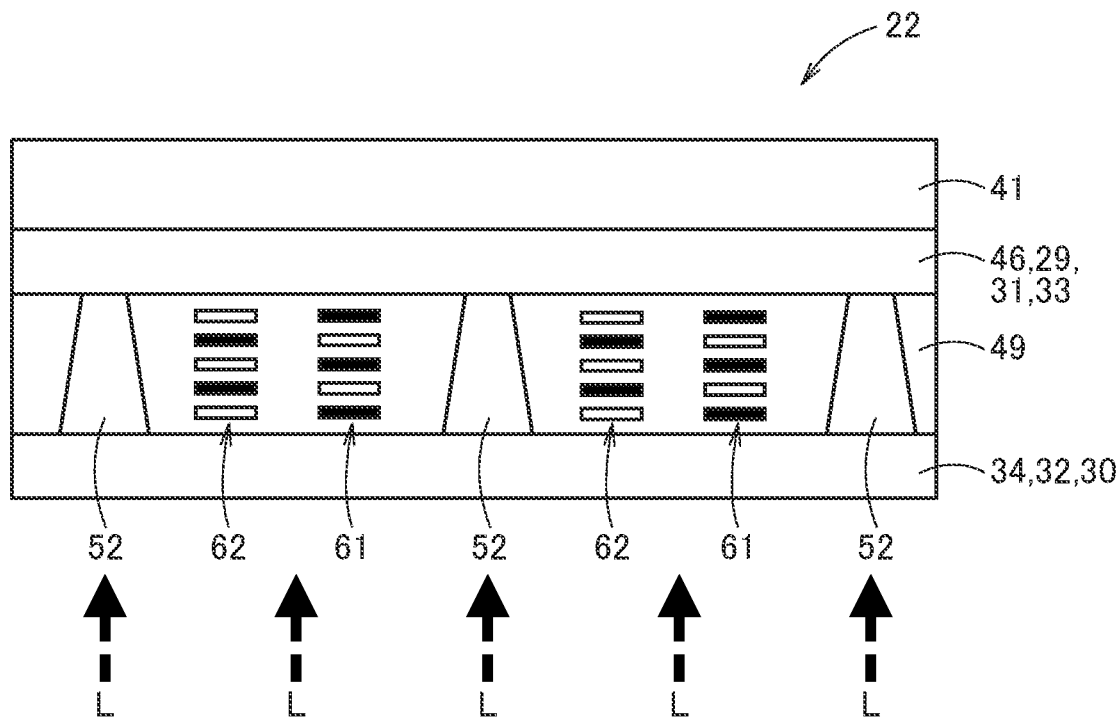
FIG. 20A is a conceptual view for describing an example (a light shielding state) of a light modulating cell employing a guest-host liquid crystal, and is a cross-sectional view of the light modulating cell.
Figure 20B:
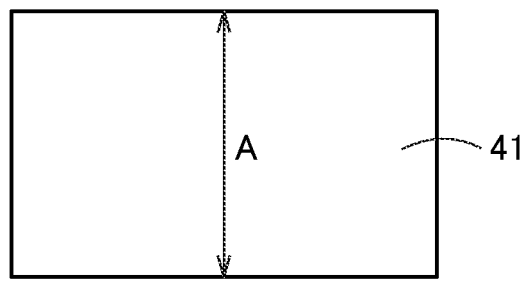
FIG. 20B is a conceptual view for describing an example (a light shielding state) of the light modulating cell employing the guest-host liquid crystal, and is a plan view of a first polarizing plate in which an absorption axis direction is indicated by an arrow "A".

FIG. 20 is a conceptual view for describing an example (a light shielding state) of the light modulating cell 22 employing the guest-host liquid crystal, FIG. 20(a) is a cross-sectional view of the light modulating cell 22, and FIG. 20(b) is a plan view of a first polarizing plate 41 in which an absorption axis direction is indicated by an arrow "A". FIG. 21 is a conceptual view for describing the same light modulating cell 22 (a light transmitting state) as FIG. 20, FIG. 21(a) is a cross-sectional view of the light modulating cell 22, and FIG. 21(b) is a plan view of the first polarizing plate 41 in which the absorption axis direction is indicated by an arrow "A". Incidentally, an absorption axis of the first polarizing plate 41 and a polarization axis (light transmission axis) extend in directions vertical to each other.

Similarly to the light modulating cell 22 illustrated in FIG. 3, the light modulating cell 22 illustrated in FIGS. 20 and 21 also includes: a pair of film substrates (that is, the first resin substrate 29 and the second resin substrate 30); a pair of transparent electrodes (that is, the first electrode layer 31 and the second electrode layer 32) disposed between the pair of film substrates; a pair of alignment layers (that is, the first alignment layer 33 and the second alignment layer 34) disposed between the pair of transparent electrodes; and the liquid crystal layer 49 and the spacer 52 disposed between the pair of alignment layers. In the light modulating cell 22 illustrated in FIGS. 20 and 21, however, only one polarizing plate (the first polarizing plate 41 in this example) is provided on the opposite side of the pair of transparent electrodes with one of the pair of film substrates (the first resin substrate 29 in this example) interposed therebetween. Incidentally, the first polarizing plate 41 is attached to the first resin substrate 29 via the adhesive layer 46. In addition, the liquid crystal layer 49 is configured using the guest-host liquid crystal containing dichroic dyes (dyes) 61 and liquid crystals 62.

The dichroic dyes 61 exist in a dispersed state in the liquid crystals 62, have the same alignment as the liquid crystals 62, and are basically aligned in the same direction as the liquid crystals 62.

In this example, when a voltage between the pair of transparent electrodes (the first electrode layer 31 and the second electrode layer 32) is in an OFF state, the dichroic dye 61 and the liquid crystal 62 are aligned in the horizontal direction (particularly, a direction vertical to the absorption axis direction A of the first polarizing plate 41 (that is, the same direction as the polarization axis of the first polarizing plate 41)) vertical to the light traveling direction L (that is, the laminating direction of the light modulating cell 22) (see FIG. 20(*a*)). On the other hand, when the voltage between the pair of transparent electrodes (the first electrode layer 31 and the second electrode layer 32) is in an ON state, the dichroic dye 61 and the liquid crystal 62 are aligned in the vertical direction (that is, the light traveling direction L) (see FIG. 21(*a*)).

Incidentally, FIGS. 20(*a*) and 21(*a*) conceptually illustrate the dichroic dye 61 and the liquid crystal 62 in order to illustrate the alignment directions of the dichroic dye 61 and the liquid crystal 62.

For example, when no voltage is applied to the first electrode layer 31 and the second electrode layer 32 by a dimming controller (not illustrated), a desired electric field is not applied to the liquid crystal layer 49, and the dichroic dye 61 and the liquid crystal 62 are aligned in the horizontal direction (see FIG. 20(*a*)). In this case, light vibrating in the direction orthogonal to the absorption axis direction A of the first polarizing plate 41 is shielded by the dichroic dye 61, and light vibrating in the other direction is shielded by the first polarizing plate 41. Therefore, light traveling in the direction from the second film substrate 24 toward the first polarizing plate 41 (see an arrow "L") is shielded by the dichroic dye 61 and the first polarizing plate 41.

On the other hand, when a voltage is applied to the first electrode layer 31 and the second electrode layer 32 by a dimming controller (not illustrated), a desired electric field is applied to the liquid crystal layer 49, and the dichroic dye 61 and the liquid crystal 62 are aligned in the vertical direction (see FIG. 21(*a*)). In this case, the light shielding performance of the dichroic dye 61 with respect to the light passing through the liquid crystal layer 49 is hardly exerted regardless of the light vibrating direction, and the light entering the liquid crystal layer 49 passes through the liquid crystal layer 49 (the dichroic dye 61 and the liquid crystal 62) with a high probability. In addition, the light vibrating in parallel with the polarization axis (light transmission axis) of the first polarizing plate 41 (light vibrating in the direction vertical to the absorption axis direction A of the first polarizing plate 41 in this example) passes through the first polarizing plate 41 and is emitted from the light modulating cell 22.

Even in the case of using the guest-host liquid crystal layer 49 illustrated in FIGS. 20 and 21 as described above, it is possible to appropriately change a light-transmitting property of the light modulating cell 22 by controlling the voltage to be applied to the first electrode layer 31 and the second electrode layer 32.

Incidentally, the case of using the so-called normally black type alignment layers 33 and 34 and liquid crystal layer 49 has been described as above regarding the light modulating cell 22 illustrated in FIGS. 20 and 21, but so-called normally white type alignment layers 33 and 34 and liquid crystal layer 49 may be used. That is, in the case of the normally black type, it is necessary to cause the dichroic dye 61 and the liquid crystal 62 to be aligned in the vertical direction when the electric field is applied to the liquid crystal layer 49 by applying the voltage between the electrodes 25 and 26 as described above, and thus, a horizontal alignment layer is used as the alignment layers 33 and 34, and a positive liquid crystal is used for the liquid crystal layer 49. On the other hand, in the case of the normally white type, it is necessary to cause the dichroic dye 61 and the liquid crystal 62 to be aligned in the horizontal direction as illustrated in FIG. 20(*a*) when the electric field is applied to the liquid crystal layer 49 by applying the voltage between the electrodes 25 and 26, and thus, a vertical alignment layer is used as the alignment layers 33 and 34, and a negative liquid crystal is used for the liquid crystal layer 49.

FIG. 22 is a conceptual view for describing another example (a light shielding state) of a light modulating cell 22 employing a guest-host liquid crystal, and illustrates a cross section of the light modulating cell 22. FIG. 23 is a conceptual view for describing the same light modulating cell 22 (a light transmitting state) as FIG. 22, and illustrates a cross section of the light modulating cell 22.

The light modulating cell 22 of this example has basically the same configuration as those of the light modulating cells 22 illustrated in FIGS. 20 and 21, but has a liquid crystal layer 49 of the guest-host type containing a dichroic dye (dye) 51 and a liquid crystal 62 without providing a polarizing plate (a first polarizing plate 41 and a second polarizing plate 42). That is, the dichroic dyes 61 exist in a dispersed state in the liquid crystals 62, have the same alignment as the liquid crystals 62, and are basically aligned in the same direction as the liquid crystals 62.

In this example, when a voltage between a pair of transparent electrodes (the first electrode layer 31 and the second electrode layer 32) is in an OFF state, the dichroic dye 61 and the liquid crystal 62 are aligned in the horizontal direction (that is, the direction vertical to the light traveling direction L) (see FIG. 22). In particular, it is preferable that the alignment of the dichroic dye 61 and the liquid crystal 62 of this example be twisted by 180 degrees or more with respect to the horizontal direction in a state where no electric field is applied so that the dichroic dyes 61 are directed in every horizontal direction. On the other hand, when the voltage between the pair of transparent electrodes (the first electrode layer 31 and the second electrode layer 32) is in an ON state, the dichroic dye 61 and the liquid crystal 62 are aligned in the vertical direction (that is, the light traveling direction L) (see FIG. 23). Incidentally, FIGS. 22 and 23 conceptually illustrate the dichroic dye 61 and the liquid crystal 62 in order to illustrate the alignment directions of the dichroic dye 61 and the liquid crystal 62.

For example, when no voltage is applied to the first electrode layer 31 and the second electrode layer 32 by a dimming controller (not illustrated), a desired electric field is not applied to the liquid crystal layer 49, and the dichroic dye 61 and the liquid crystal 62 are aligned in the horizontal direction (see FIG. 22). As a result, the light entering the liquid crystal layer 49 is shielded (absorbed) by the dichroic dye 61.

On the other hand, when a voltage is applied to the first electrode layer 31 and the second electrode layer 32 by the dimming controller (not illustrated), the desired electric field is applied to the liquid crystal layer 49, and the dichroic dye 61 and the liquid crystal 62 are aligned in the vertical direction (see FIG. 23). In this case, the light shielding performance of the dichroic dye 61 with respect to the light passing through the liquid crystal layer 49 is hardly exerted regardless of the light vibrating direction, and the light entering the liquid crystal layer 49 passes through the liquid crystal layer 49 (the dichroic dye 61 and the liquid crystal 62) with a high probability. In addition, since no polarizing plate is provided in this example, the entire light passing through the liquid crystal layer 49 and emitted from a first film substrate 23 is emitted from the light modulating cell 22.

Even in the case of using the guest-host liquid crystal layer 49 illustrated in FIGS. 22 and 23 as described above, it is possible to change the light-transmitting property of the light modulating cell 22 by controlling the voltage to be applied to the first electrode layer 31 and the second electrode layer 32.

Incidentally, the guest-host light modulating cell 22 of the normally black type in which the horizontal alignment layer is used as the alignment layers 33 and 34 and the positive liquid crystal is used for the liquid crystal layer 49 has been described as above regarding the light modulating cell 22 illustrated in FIGS. 22 and 23, a guest-host light modulating cell 22 of a normally white type may be used. That is, a vertical alignment layer is used as the alignment layers 33 and 34, and a negative liquid crystal is used for the liquid crystal layer 49 such that the dichroic dye 61 and the liquid crystal 62 may be aligned in the horizontal direction as illustrated in FIG. 22 when the electric field is applied to the liquid crystal layer 49 by applying the voltage between the electrodes 25 and 26.

Although the hard coat layer 26 illustrated in FIG. 3 is not illustrated in FIGS. 20 to 23 described above, the hard coat layer 26 may be provided or not necessarily provided in each of the light modulating cells 22 illustrated in FIGS. 20 to 23. When the hard coat layer 26 is provided, for example, the hard coat layer 26 may be attached to the second resin substrate 30 via the adhesive layer 46. In addition, the phase difference compensation film 45 illustrated in FIG. 3 is not illustrated in FIGS. 20 to 23. However, the phase difference compensation film 45 may be provided or not necessarily provided in in each of the light modulating cells 22 illustrated in FIGS. 20 to 23. When the phase difference compensation film 45 is provided, for example, the phase difference compensation film 45 may be attached to the second resin substrate 30 via the adhesive layer 46.

Even in the case of using the light modulating cell 22 having the above guest-host liquid crystal (that is, the liquid crystal layer 49 including the dichroic dye 61), it is possible to dispose the optically transparent adhesive film 24 between the curved surface 20 of the light transmissive plate 21 and the light modulating cell 22 and to attach one side of the light modulating cell 22 to the curved surface 20 of the light transmissive plate 21.

<E-Type Linear Polarizing Plate>

In addition, the present invention is also applicable to the light modulating cell 22 including an E-type linear polarizing plate. Although the light modulating cell of the VA type is exemplarily described hereinafter, the drive mode of the light modulating cell is not particularly limited, and the technique to be described hereinafter can also be applied to the light modulating cell of a TN type, an IPS type, or an FFS type, for example. That is, the liquid crystal layer may be a liquid crystal layer of the VA mode, the TN mode, the IPS mode, or the FFS mode.

[First Mode]
[Basic Configuration]

Figure 24:
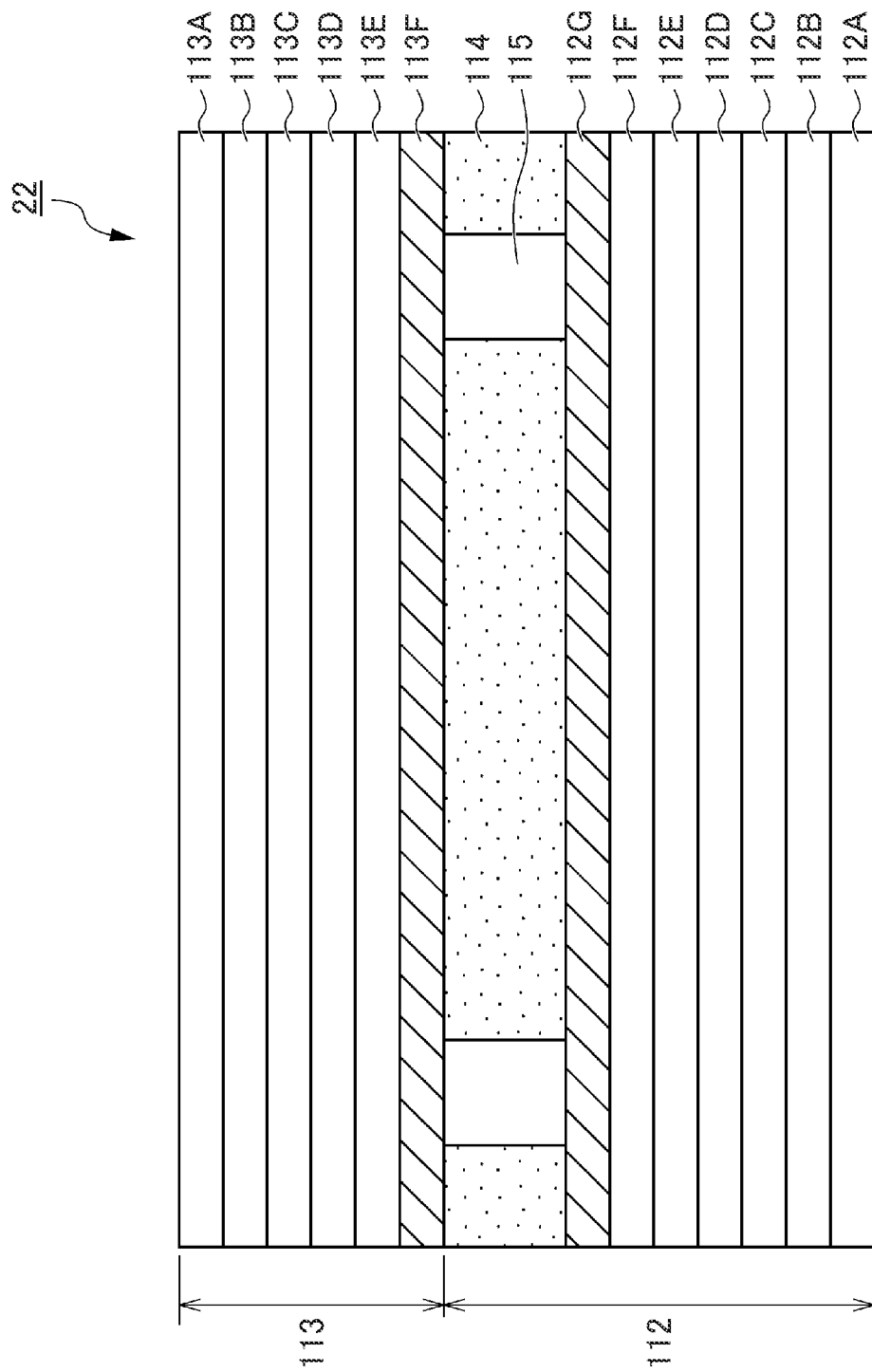
FIG. 24 is a cross-sectional view for describing a basic configuration of the light modulating cell.

FIG. 24 is a cross-sectional view for describing a basic configuration of a light modulating cell according to the present invention. The light modulating cell 22 is a lighting control film according to the VA type, and is configured by sandwiching a liquid crystal layer 114 and a spacer 115 with a lower laminated body 112 and an upper laminated body 113 which are film-shaped first and second laminated bodies. The lower laminated body 112 is provided with a linear polarizing plate 112D on a substrate 112B made of a transparent film material including a hard coat layer 112A and a hard coat layer 112C. In addition, a negative C-plate layer 112F, a transparent electrode 112G, and an alignment layer 112E to be subjected to optical compensation are sequentially provided on the linear polarizing plate 112D. Incidentally, the outer hard coat layer 112A is configured using a laminated structure of two hard coat layers, for example.

In addition, the upper laminated body 113 is provided with a transparent electrode 113D on a substrate 113B made of a transparent film material including a hard coat layer 113A and a hard coat layer 113C, and is further provided with a linear polarizing plate 113E. Incidentally, an alignment layer 113F is provided on the liquid crystal layer 114 side of the linear polarizing plate 113E in the upper laminated body 113.

Here, the hard coat layers 112A and 112C are formed with a thickness of about 10 μm and 5 μm, respectively. In addition, the hard coat layers 113A and 113C are formed with a thickness of 5 μm and a thickness of about 5 μm, respectively. A film material having high optical anisotropy and high general versatility is applied, and for example, a PET film having a thickness of 100 μm is applied to the substrates 112B and 113B.

In addition, the transparent electrodes 112G and 113D are formed using ITO having a thickness of 50 nm.

The linear polarizing plates 112D and 113E are optical functional layers that function as E-type linear polarizing plates. Here, as described in JP 2011-59266 A and JP H8-511109 A, the E-type linear polarizing plate is a linear polarizing plate having a polarizing layer formed by alignment of dye molecules. Each polarizing layer of the linear polarizing plates 112D and 113E has an absorption axis in a direction perpendicular to an alignment direction of the dye molecules, and is the polarizing layer whose extraordinary light refractive index is smaller than an ordinary light refractive index and a transmittance of an extraordinary wave is greater than that of an ordinary wave.

The E-type polarizing layer is formed by applying a coating liquid having dye molecules relating to the polarizing layer to form a coating film, and then, applying a mechanical stress (shearing force) to this coating layer to align the dye molecules, and it is possible to apply various formation methods such as applying stress while applying a coating liquid. As a result, the entire thickness is made thin, and various film materials having high versatility can be applied to the substrates 112B and 113B in this mode.

That is, in a light modulating cell having the conventional configuration, transmitted light of a liquid crystal layer incident on a linear polarizing plate needs to prevent a polarization surface controlled by the liquid crystal layer from being damaged, and thus, it is necessary to use a transparent film material having small optical anisotropy so that it is difficult to apply a highly versatile film material. However, in the case where the linear polarizing plates 112D and 113E are provided on the liquid crystal layer 114 side of the substrates 112B and 113B as in this mode, it is possible to prevent the transmitted light of the liquid crystal layer 114 from having any influence on the polarization surface even if the transmitted light is polarized variously by the substrates 112B and 113B. As a result, a film material having a large optical anisotropy, such as a PET film, for example, can be applied to the substrates 112B and 113B so that it is possible to use the highly versatile transparent film.

In addition, it is possible to sufficiently shield the transmitted light in the oblique direction by applying the linear polarizing plates 112D and 113E relating to the E-type linear polarizing plate so that it is possible to reduce the overall thickness by not providing a compensation film.

In addition, the linear polarizing plates 112D and 113E relating to the E-type linear polarizing plate can be provided at the inner side of the liquid crystal cell by the coating film.

As a result, it is possible to simplify the configuration of the linear polarizing plate by arranging the linear polarizing plates 112D and 113E on the liquid crystal layer 114 side of the substrates 112B and 113B, and it is possible to further reduce the thickness. In practice, when arranging the linear polarizing plates 112D and 113E as illustrated in FIG. 24, the linear polarizing plates 112D and 113E of the E-type linear polarizing plate have the thickness of about 1 μm, and thus, it is possible to set the thickness of the light modulating cell 22 as a whole to about 300 μm so that it is possible to significantly reduce the thickness as compared with the prior art.

[Specific Configuration of First Mode]

Figure 25:
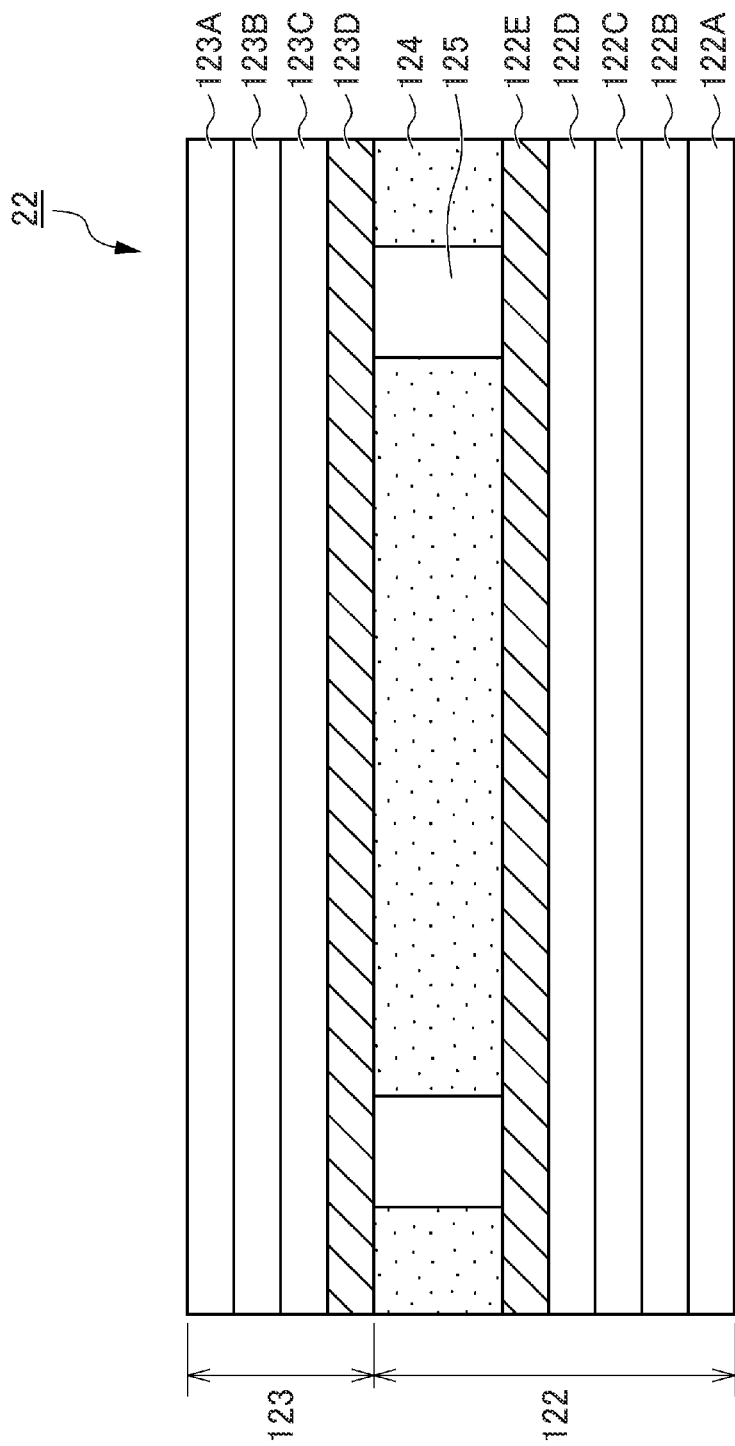
FIG. 25 is a cross-sectional view illustrating a light modulating cell according to a first mode.

FIG. 25 is a cross-sectional view illustrating a specific configuration of the light modulating cell 22 according to the first mode of the present invention. The light modulating cell 22 is formed in a film shape. The light modulating cell 22 is the VA-type lighting control film that controls transmitted light using the liquid crystal, and is formed by sandwiching the liquid crystal layer 124 with the lower laminated body 122 and the upper laminated body 123 which are film-shaped first and second laminate bodies, respectively. Here, the light modulating cell 22 is a liquid crystal cell that controls the alignment of liquid crystal molecules according to the liquid crystal layer 124 by the VA type.

That is, the lower laminated body 122 has a transparent electrode 122B as a first electrode formed on the entire surface of a substrate 122A made of a transparent film material having hard coat layers on both sides in the light modulating cell 22. Here, for example, a PET film is applied to the substrate 122A.

In addition, for example, ITO is applied to the transparent electrode 122B. In addition, an E-type linear polarizing plate 122C, a negative C-plate layer 122D, and an alignment layer 122E are sequentially provided in the lower laminated body 122.

In the upper laminated body 123, a transparent electrode 123B, a linear polarizing plate 123C, and an alignment layer 123D are sequentially formed on a substrate 123A made of a transparent film material having hard coat layers on both sides.

Here, the linear polarizing plates 122C and 123C are provided in a cross=Nicol arrangement.

Here, ITO is applied to the transparent electrodes 122B and 123B. The E-type linear polarizing plate is applied to the linear polarizing plates 122C and 123C, and more specifically, for example, the configuration disclosed in JP H8-511109 A can be applied. The linear polarizing plates 122C and 123C are formed by a coating film of a dichroic organic dye exhibiting optical anisotropy in the vertical direction. The negative C-plate layer 122D is a negative uniaxial phase difference optical layer satisfying a refractive index distribution of nz<nx=ny when an in-plane principal refractive index is nx (slow-axis direction), ny is a refractive index in a fast-axis direction, and a refractive index in the thickness direction is nz. Although a triacetyl cellulose (TAG) film material, for example, can be applied to the negative C-plate layer 122D, the negative C-plate layer 122D is formed using a cholesteric polymerizable liquid crystal layer made of an ultraviolet curable resin in this mode. Although a photo-alignment layer is applied to the alignment layers 122E and 123D, various configurations can be applied such as an alignment layer obtained by rubbing treatment, and an alignment layer formed by performing shaping treatment on a fine linear uneven shape by shaping treatment.

Incidentally, a columnar spacer 125 to retain the thickness of the liquid crystal layer 124 is formed on the alignment layer 122E of the lower laminated body 122 in the light modulating cell 22, but may be provided on the negative C-plate layer 122D, or may be provided on the linear polarizing plate 122C or the transparent electrode 122B. In addition, the spacer 125 may be provided on the upper laminated body 123 or both the lower laminated body 122 and the upper laminated body 123.

Incidentally, a sealing member is disposed in a frame shape surrounding the liquid crystal layer 124 in the light modulating cell 22, a leakage of liquid crystal relating to the liquid crystal layer 124 is prevented by this sealing member, and further, the upper laminated body 123 and the lower laminated body 122 are integrally held. Here, various materials capable of preventing the leakage of the liquid crystal and integrally holding the upper laminated body 123 and the lower laminated body 122 can be applied to the sealing member, and a thermosetting resin of an epoxy resin, an ultraviolet curing resin of an acrylic resin, a curing resin which is cured by heat and ultraviolet rays, or the like is applied, for example, in this mode.

As a result, an E-type linear polarizing plate is applied to the linear polarizing plates 122C and 123C in the light modulating cell 22 of FIG. 25, and the linear polarizing plates 122C and 123C are provided on the liquid crystal layer 124 side of the lower laminated body 122 and the upper laminated body 123 so that it is possible to apply a highly versatile material to the substrates 122A and 123A of the lower laminated body 122 and the upper laminated body 123. In addition, since the E-type linear polarizing plate is applied to the linear polarizing plates 122C and 123C, it is possible to reduce the overall thickness.

Figure 26:
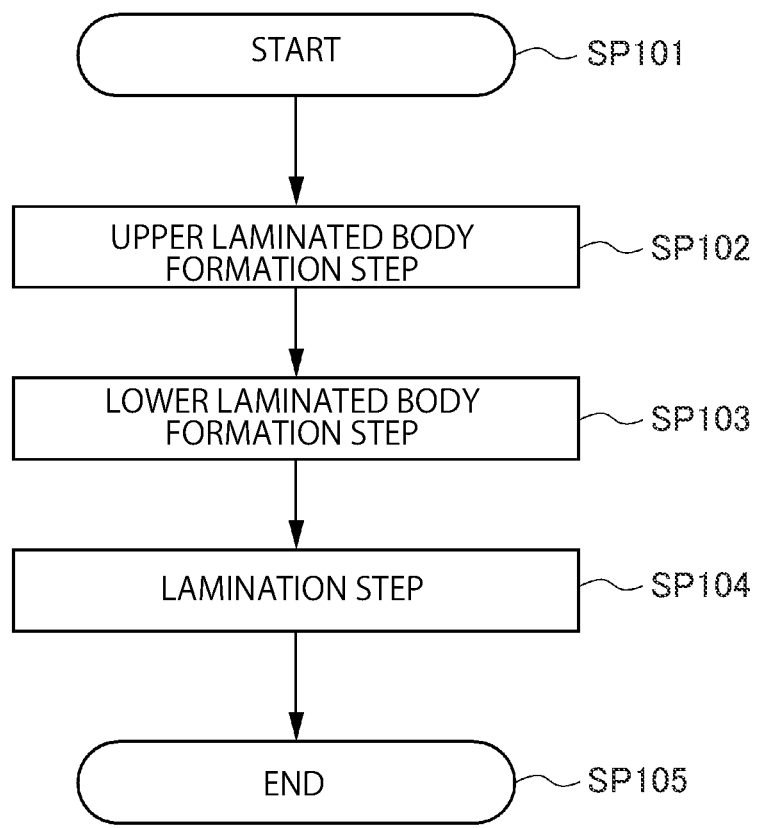
FIG. 26 is a flowchart illustrating a manufacturing process of the light modulating cell of FIG. 25.

FIG. 26 is a flow chart for describing the manufacturing process of the light modulating cell 22. In the light modulating cell manufacturing process, the upper laminated body 123 and the lower laminated body 122 are formed in an upper laminated body formation step SP102 and a lower laminated body formation step SP103, respectively. In a lamination step SP104, the upper laminated body 123 and the lower laminated body 122 are stacked with the liquid crystal layer 124 sandwiched therebetween, and then, the light modulating cell 22 is formed by integrating the resultant with a sealing member.

Figure 27:
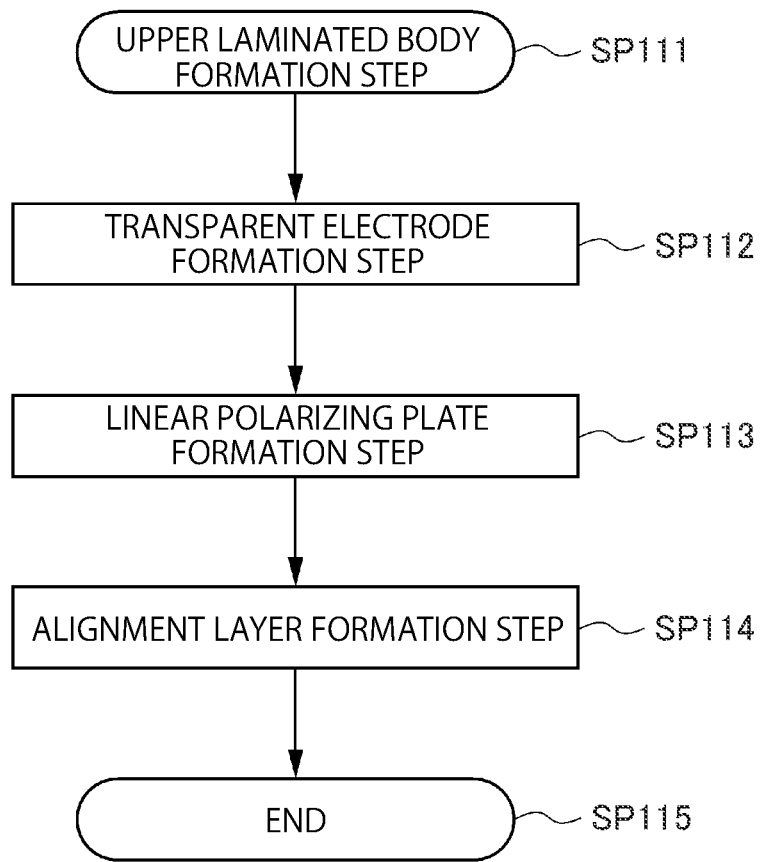
FIG. 27 is a flowchart illustrating a step of forming an upper laminated body in the manufacturing process of FIG. 26.

FIG. 27 is a flowchart illustrating the upper laminated body formation step SP102 in detail. In this upper laminated body formation step SP102 (SP111), the transparent electrode 123B made of ITO is formed by sputtering or the like in a transparent electrode formation step SP112. Subsequently, in a linear polarizing plate formation step SP113, the substrate 123A obtained by forming the transparent electrode 123B is coated with a coating liquid of the linear polarizing plate 123C, and then, the resultant is dried, whereby the linear polarizing plate 123C is formed. In addition, in the linear polarizing plate formation step, a shearing force is applied to the coating film by stretching a coating film using a blade or the like at the time of applying the coating liquid, or after forming a coating film, and dye relating to the linear polarizing plate 123C is aligned in this stretching direction, thereby forming the linear polarizing plate 123C so as to function as a linear polarizing plate.

Subsequently, a coating liquid for the alignment layer 123D is applied and dried, and then, cured by irradiation with ultraviolet rays using linearly polarized light, thereby forming the alignment layer 123D in an alignment layer formation step SP114 in this manufacturing process.

Figure 28:
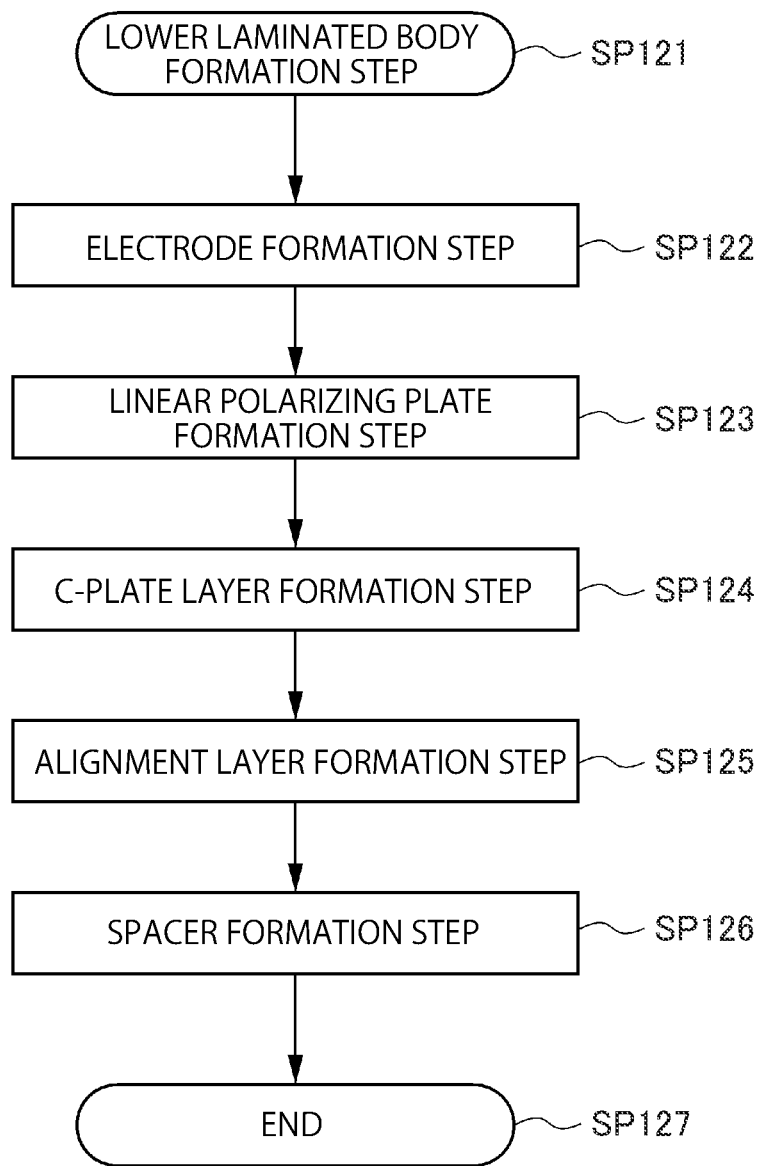
FIG. 28 is a flowchart illustrating a step of forming a lower laminated body in the manufacturing process of FIG. 26.

FIG. 28 is a flowchart illustrating the lower laminated body formation step SP103 in detail. In this lower laminated body formation step SP103 (SP121), the transparent electrode 122B made of ITO is formed on the entire surface of the substrate 122A by sputtering in an electrode formation step SP122. Subsequently, a coating liquid of the linear polarizing plate 122C is applied, and then, dried to form the linear polarizing plate 122C in a linear polarizing plate formation step SP123 in the same manner as the linear polarizing plate formation step SP112, in this manufacturing process.

Subsequently, a coating liquid of the alignment layer of the negative C-plate layer 122D is applied, and then, dried, and an alignment regulating force is set by ultraviolet irradiation or the like to form an alignment layer in a C-plate layer formation step SP124 in this manufacturing process. In addition, a coating liquid for cholesteric liquid crystal is applied on the alignment layer and dried, and then, cured by irradiation with ultraviolet rays, thereby forming the negative C-plate layer 122D.

In addition, a coating liquid for the alignment layer 122E is applied, dried, and exposed to form an alignment layer 122E in a subsequent alignment layer forming step SP125. In addition, a photoresist material is applied on the entire surface, dried, and exposed to light to be developed to form the spacer 125 in a subsequent spacer formation step SP126. Incidentally, a transparent film material such as TAC may be applied to the negative C-plate layer 122D such that the alignment layer 122E and the like may be formed beforehand on the transparent film material to be laminated with the substrate 122A side.

[Second Mode]

Figure 29:
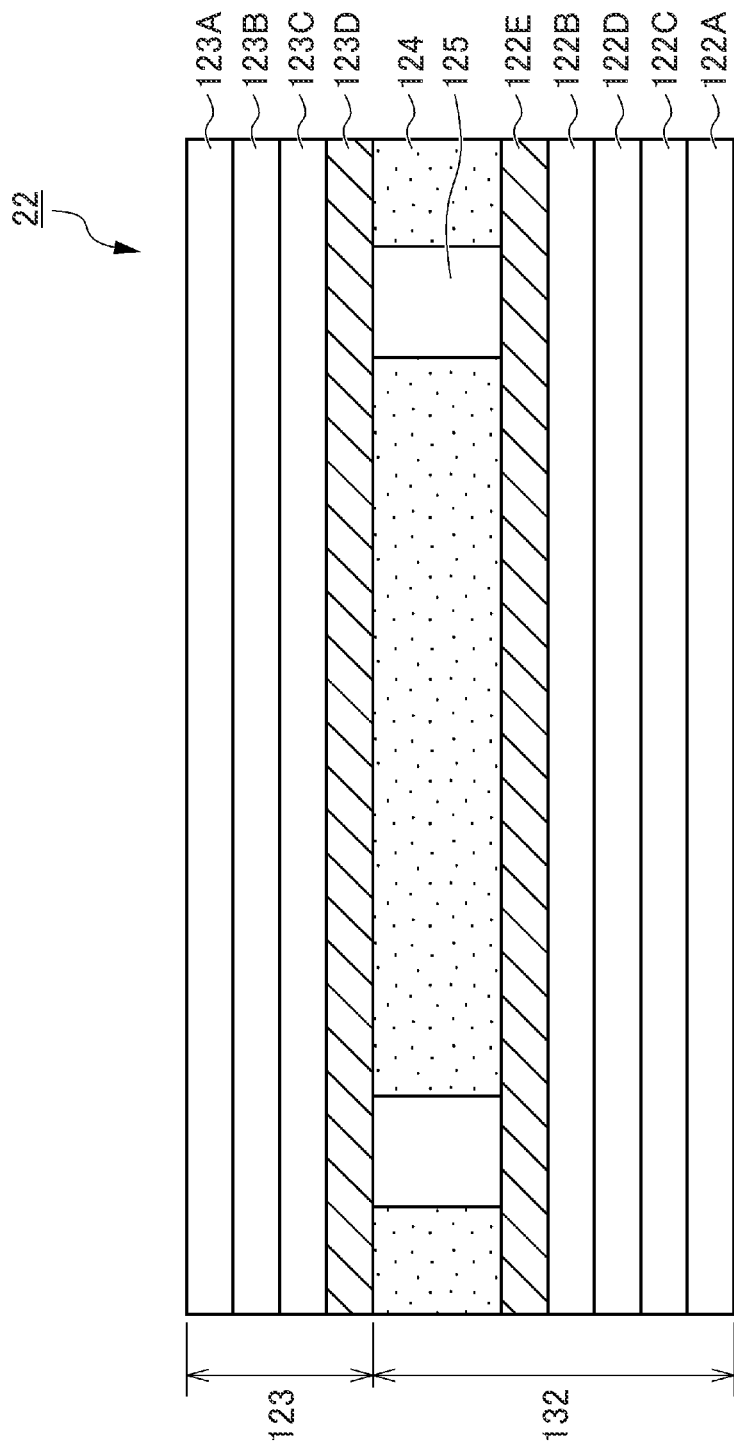
FIG. 29 is a cross-sectional view illustrating a light modulating cell according to a second mode of the present invention.

FIG. 29 is a cross-sectional view illustrating a light modulating cell according to a second mode of the present invention. This light modulating cell 22 is configured similarly to the light modulating cell 22 according to the first mode except that the transparent electrode 122B is disposed between the alignment layer 122E and the negative C-plate layer 122D to form the lower laminated body 132.

According to this mode, it is possible to obtain the same effect as the light modulating cell 22 according to the first mode even if a lower laminated body is configured by disposing the transparent electrode 122B between the alignment layer 122E and the negative C-plate layer 122D.

[Third Mode]

Figure 30:
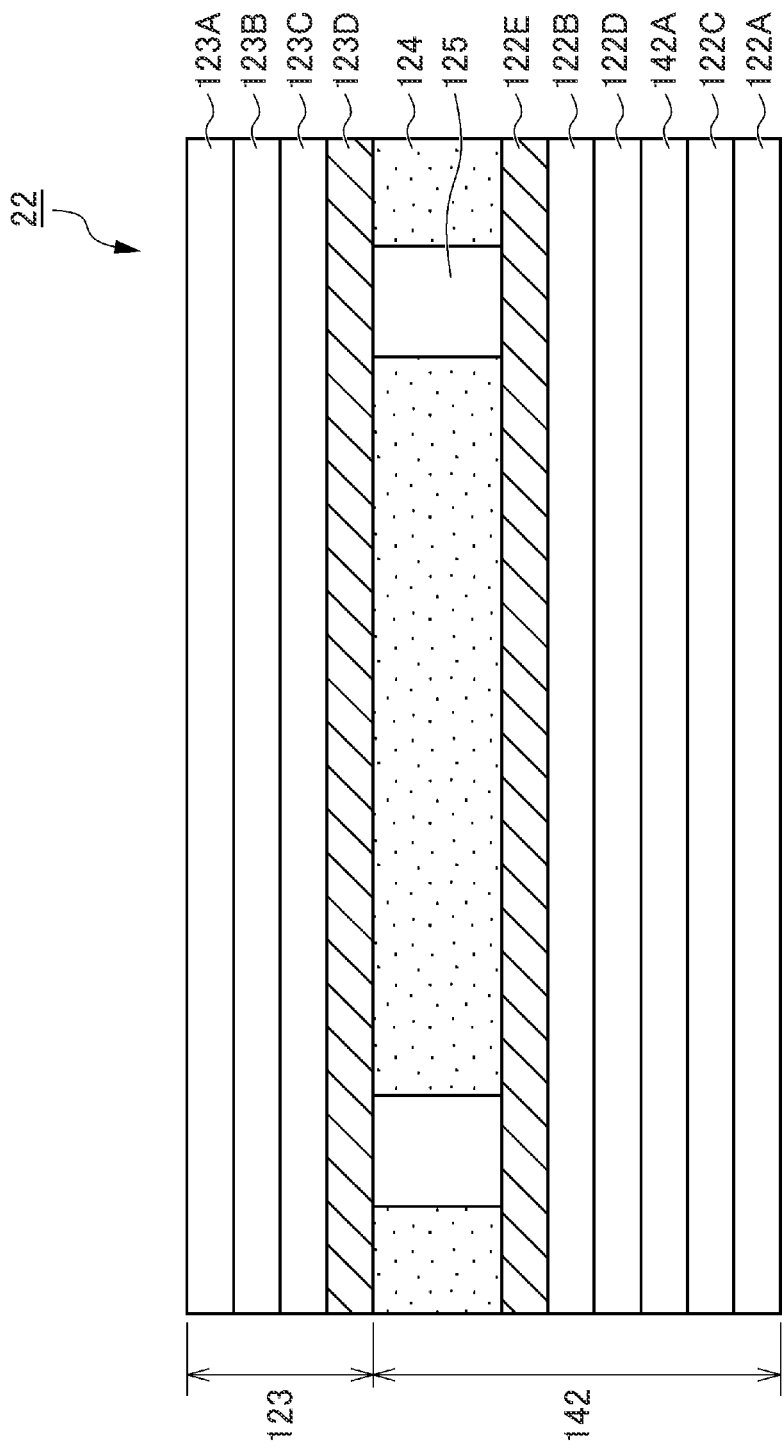
FIG. 30 is a cross-sectional view illustrating a light modulating cell according to a third mode of the present invention.

FIG. 30 is a cross-sectional view illustrating a light modulating cell according to a third mode of the present invention. In this light modulating cell 22, the transparent electrode 122B and the alignment layer 122E are formed on a transparent film material such as TAC for the negative C-plate layer 122D to form a laminated body for the negative C-plate layer 122D, and this laminated body for the negative C-plate layer is stacked on the substrate 122A formed with the linear polarizing plate 122C by an adhesive layer 142A to form a lower laminated body 142. Incidentally, after the transparent film material for the negative C-plate layer 122D is stacked on the substrate 122A obtained by forming the linear polarizing plate 122C, the transparent electrode 122B, and the alignment layer 122E may be formed, or only the transparent electrode 122B may be formed on the transparent film material for the negative C-plate layer 122D. In this mode, the light modulating cell is configured similarly to the light modulating cell according to the above mode except that this configuration of the lower laminated body 142 is different.

According to this mode, it is possible to obtain the same effect as the light modulating cell according to the first mode or the second mode even if a lower laminated body is formed by laminating a laminated body for the negative C-plate layer 122D with an adhesive layer.

[Fourth Mode]

Figure 31:
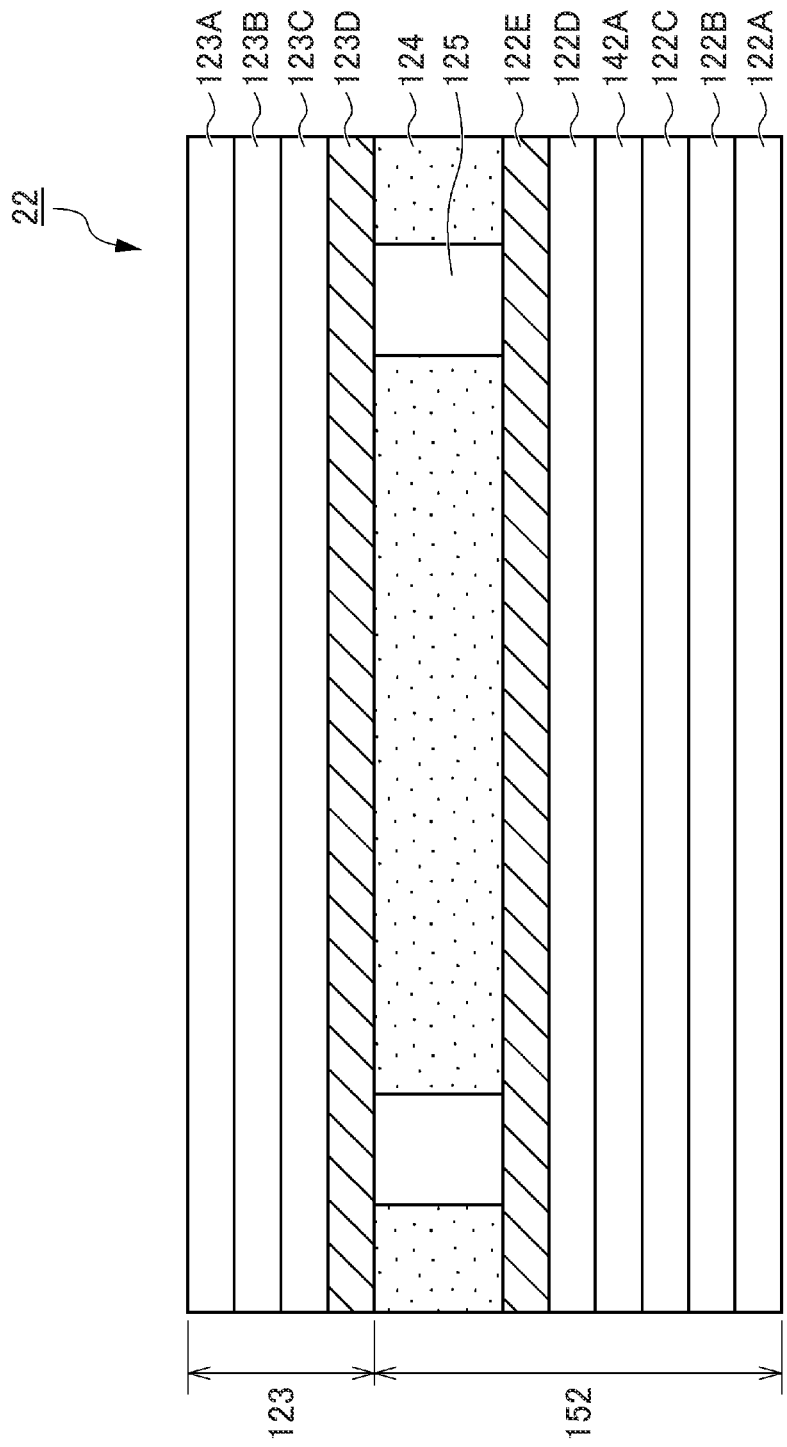
FIG. 31 is a cross-sectional view illustrating a light modulating cell according to a fourth mode of the present invention.

FIG. 31 is a cross-sectional view illustrating a light modulating cell according to a fourth mode of the present invention. In this light modulating cell 22, a lower laminated body 152 is formed by laminating a transparent film material for the negative C-plate layer 122D formed with the alignment layer 122E and the spacer 125 on the substrate 122A, obtained by sequentially forming the transparent electrode 122B and the linear polarizing plate 122C, with the adhesive layer 142A. Incidentally, the alignment layer 122E and/or the spacer 125 may be formed after the lamination with the substrate 122A. In this mode, the light modulating cell is configured similarly to the light modulating cells according to the above modes except that the manufacturing order of these respective parts is different.

According to this mode, it is possible to obtain the same effect as the above modes even if the lower laminated body 152 is formed by laminating the laminated body for the negative C-plate layer 122D formed with the alignment layer 122E and the spacer 125 on the substrate 122A, obtained by sequentially forming the transparent electrode 122B and the linear polarizing plate 122C, with the adhesive layer 142A. In this case, an upper laminated body and the lower laminated body can have the same configuration in terms of a laminated body of a substrate, a transparent electrode, and a linear polarizing plate, and thus, it is possible to simplify the manufacturing process.

[Fifth Mode]

Figure 32:
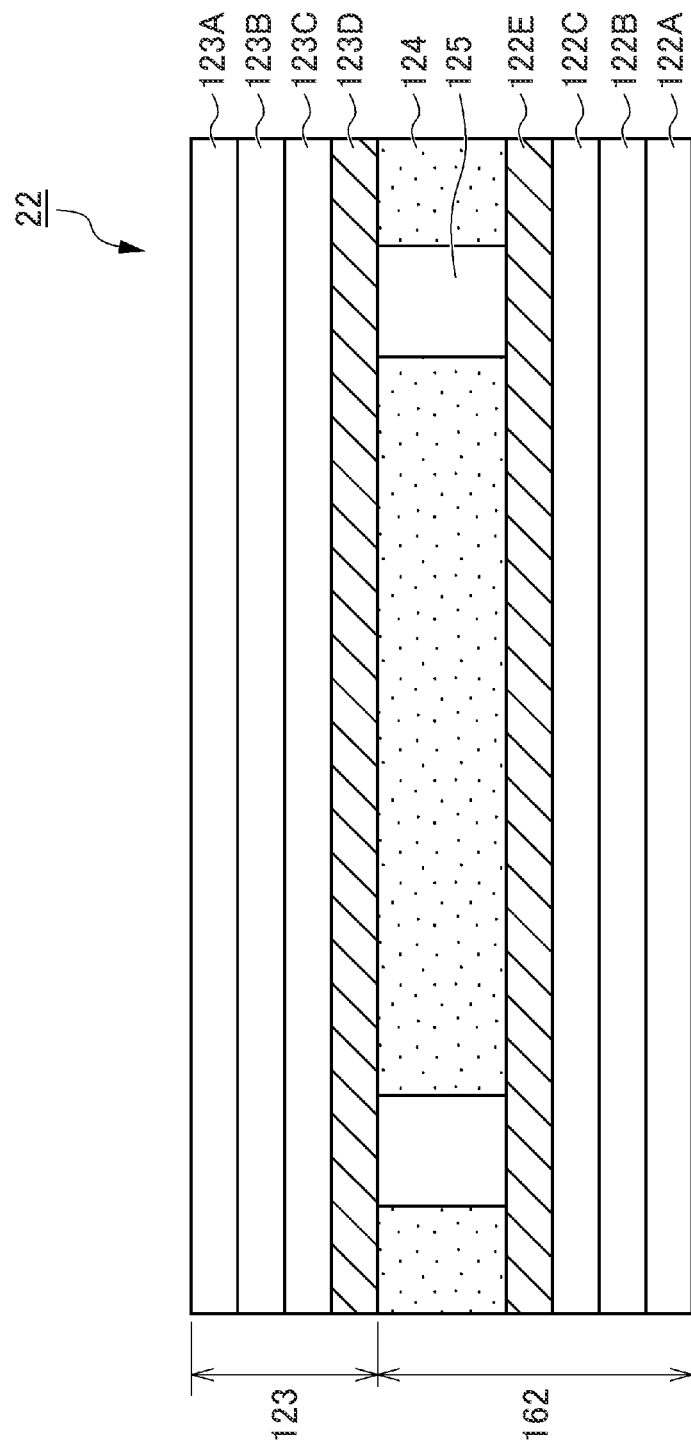
FIG. 32 is a cross-sectional view illustrating a light modulating cell according to a fifth mode of the present invention.

FIG. 32 is a cross-sectional view illustrating a light modulating cell according to a fifth mode of the present invention. This light modulating cell 22 is configured similarly to the first mode, except that a lower laminated plate 162 is formed by omitting the negative C-plate layer 122D.

In this mode, when practically sufficient optical characteristics can be secured, it is possible to obtain the same effect as the above modes with the simple configuration by omitting the negative C-plate layer.

[Other Modes]

Although the specific configurations suitable for implementation of the present invention have been described in detail as above, it is possible to combine the above-described respective modes and further to change the above-described respective modes variously in the present invention within a scope not departing from a gist of the present invention.

For example, the case where the lower laminated body is configured by disposing the transparent electrode directly below the alignment layer has been described in the above-described second mode, but the present invention is not limited thereto, and the transparent electrode may be disposed directly below the alignment layer even in the upper laminated body.

In addition, the case where the spacer is formed by the column shape using the photoresist has been described in the above modes, the present invention is not limited thereto, and a so-called bead spacer may be applied.

Even in the case of using the light modulating cell 22 using the above-described E-type linear polarizing plate, it is possible to dispose the optically transparent adhesive film 24 between the curved surface 20 of the light transmissive plate 21 and the light modulating cell 22 and to attach one side of the light modulating cell 22 to the curved surface 20 of the light transmissive plate 21.

<Sandwiching Structure of Light modulating cell by Light Transmissive Plates>

The present invention is also applicable to a case where the light modulating cell 22 is sandwiched between a pair of light transmissive plates.

Figure 33:
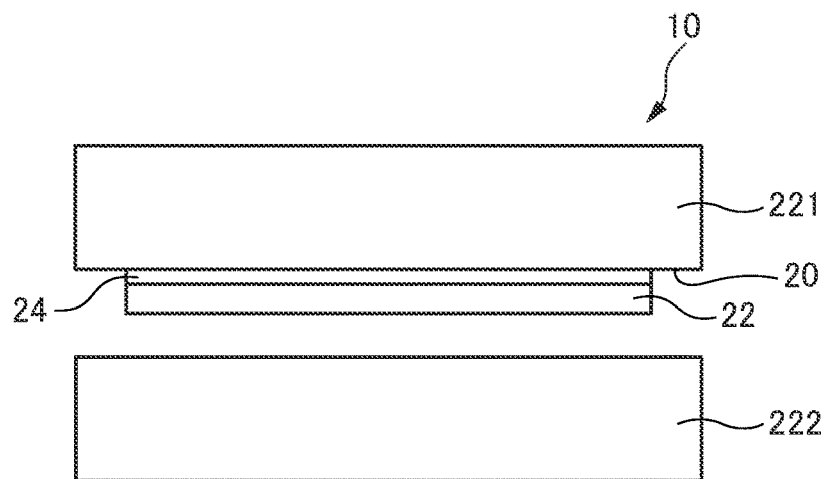
FIG. 33 is a schematic cross-sectional view illustrating another example of the light modulating device.

FIG. 33 is a schematic cross-sectional view illustrating another example of the light modulating device 10. The light modulating device 10 illustrated in FIG. 33 is basically configured similarly to the light modulating device 10 illustrated in FIG. 1. That is, the optically transparent adhesive film 24 is disposed between the curved surface 20 of a first light transmissive plate 221 containing ultraviolet ray inhibiting components and the light modulating cell 22, and one side of the light modulating cell 22 adheres to the curved surface 20 of the first light transmissive plate 221 via the optically transparent adhesive film 24. In this manner, the first light transmissive plate 221 is configured similarly to the light transmissive plate 21 illustrated in FIG. 1.

However, the light modulating device 10 illustrated in FIG. 33 further includes a second light transmissive plate 222, and the light modulating cell 22 is disposed between the first light transmissive plate 221 and the second light transmissive plate 222. The second light transmissive plate 222 is disposed apart from the light modulating cell 22 with respect to a laminating direction of the first light transmissive plate 221, the optically transparent adhesive film 24, and the light modulating cell 22, and a space between the second light transmissive plate 222 and the light modulating cell 22 is configured as an air gap (air layer). Incidentally, the second light transmissive plate 222 can be configured similarly to, for example, the first light transmissive plate 221, and a surface opposing the light modulating cell 22 among surfaces of the second light transmissive plate 222 may be configured as the same curved surface as the curved surface 20 of the first light transmissive plate 221. However, the second light transmissive plate 222 may have a different shape from the first light transmissive plate 221. For example, the surface opposing the light modulating cell 22 among the surfaces of the second light transmissive plate 222 may be configured as a curved surface different from the curved surface 20 of the first light transmissive plate 221, or may be configured as a flat surface. In addition, constituent components of the second light transmissive plate 222 may be the same as or different from constituent components of the first light transmissive plate 221.

Since the air gap is provided between the second light transmissive plate 222 and the light modulating cell 22, the light modulating device 10 illustrated in FIG. 33 is excellent in heat insulating performance, and it is possible to prevent overheating of the light modulating device 10.

Incidentally, the light modulating cell 22 is protected by the first light transmissive plate 221 and the second light transmissive plate 222 in the light modulating device 10 of FIG. 33. Thus, the light modulating cell 22 does not necessarily have the hard coat layer 26 illustrated in FIG. 3.

Figure 34:
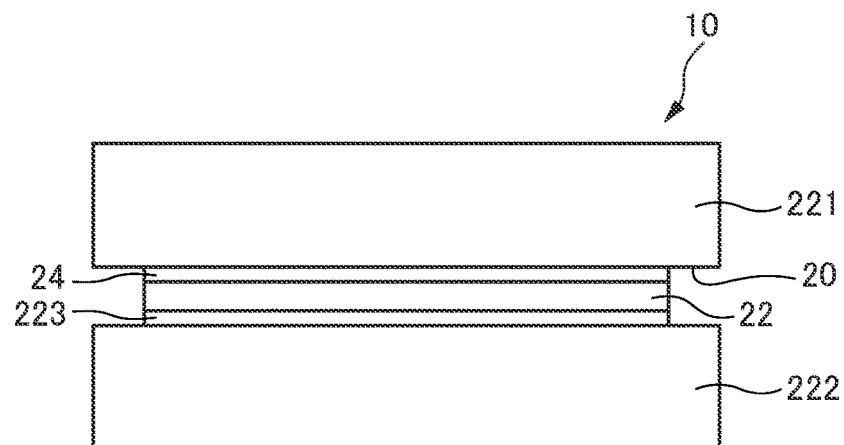
FIG. 34 is a schematic cross-sectional view illustrating still another example of the light modulating device.

FIG. 34 is a schematic cross-sectional view illustrating still another example of the light modulating device 10. The light modulating device 10 illustrated in FIG. 34 is basically configured similarly to the light modulating device 10 illustrated in FIG. 33, but the second light transmissive plate 222 is attached to the other side of the light modulating cell 22 via an adhesive layer 223.

Specific constituent components of the adhesive layer 223 are not particularly limited. For example, it is possible to form the adhesive layer 223 with a thermoplastic resin having excellent adhesiveness such as polyvinyl butyral (PVB) or other adhesive materials having optical transparency.

Even in the light modulating device 10 in FIG. 34, the light modulating cell 22 is protected by the first light transmissive plate 221 and the second light transmissive plate 222, and thus, the light modulating cell 22 does not necessarily have the hard coat layer 26.

Figure 35:
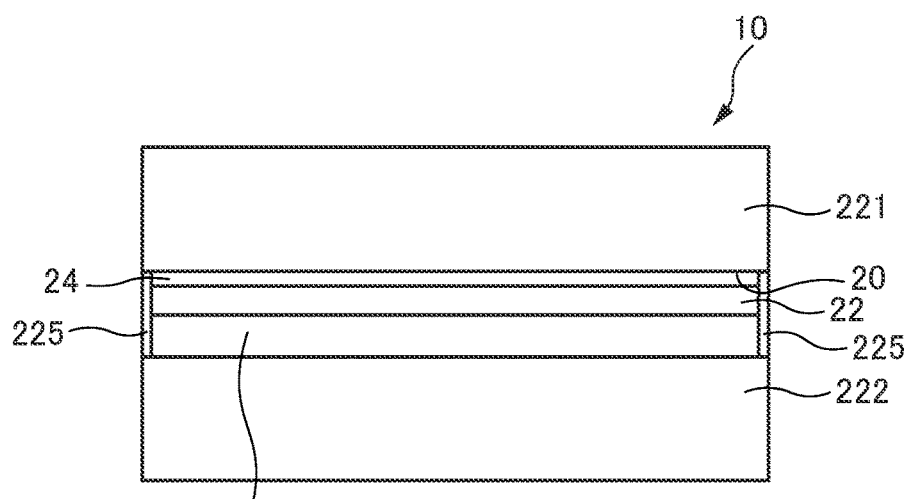
FIG. 35 is a schematic cross-sectional view illustrating still another example of the light modulating device.

FIG. 35 is a schematic cross-sectional view illustrating still another example of the light modulating device 10. The light modulating device 10 illustrated in FIG. 35 is basically configured similarly to the light modulating device 10 illustrated in FIG. 33, but a space between the second light transmissive plate 222 and the light modulating cell 22 is sealed by a sealing member 225 to be hermetically sealed. In the light modulating cell 22 illustrated in FIG. 35, the space between the first light transmissive plate 221 and the second light transmissive plate 222 is sealed with the sealing member 225, and the optically transparent adhesive film 24 and the light modulating cell 22 are disposed in the sealed space.

It is possible to add an arbitrary function to the light modulating device 10 by disposing a functional member in the hermetically sealed space between the second light transmissive plate 222 and the light modulating cell 22. For example, when silicone is disposed in the space between the second light transmissive plate 222 and the light modulating cell 22 sealed by the sealing member 225, the light modulating device 10 can have functional characteristics of the silicone. In addition, it is possible to dispose other fluids (gases and liquids) or solid (including a gelled body) having optical transparency in the space between the second light transmissive plate 222 and the light modulating cell 22 sealed by the sealing member 225.

Incidentally, the sealed space between the second light transmissive plate 222 and the light modulating cell 22 may be filled with a member containing one or more kinds of components. Further, the sealed space between the second light transmissive plate 222 and the light modulating cell 22 may be formed in a vacuum.

<Other Functional Layers>

An arbitrary functional layer may be added to the light modulating device 10 according to the above-described embodiment and modifications. For example, it is possible to improve optical characteristics by adding a reflection preventing layer to the light modulating device 10.

Figure 36:
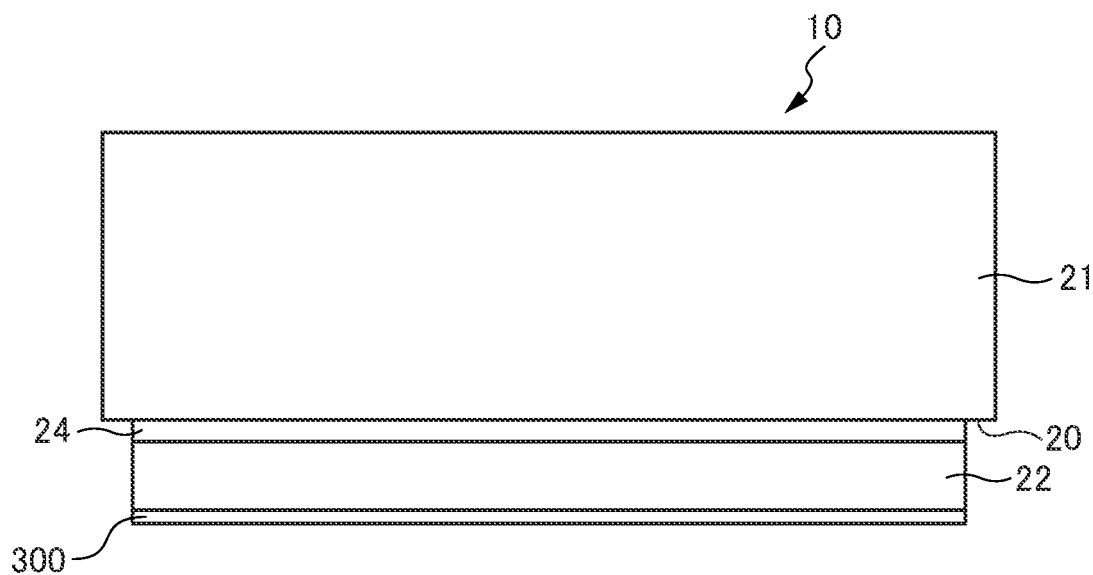
FIG. 36 is a schematic cross-sectional view illustrating an example of a light modulating device including a reflection preventing layer.

FIG. 36 is a schematic cross-sectional view illustrating an example of the light modulating device 10 including a reflection preventing layer 300. The light modulating device 10 illustrated in FIG. 36 includes the light transmissive plate 21 having the curved surface 20, the light modulating cell 22, and the optically transparent adhesive film 24 provided between the light transmissive plate 21 and the light modulating cell 22, which is similar to the light modulating device 10 illustrated in FIG. 1. However, the reflection preventing layer 300 is provided in the outermost layer of the light modulating cell 22 in the light modulating device 10 illustrated in FIG. 36.

Specific kind and configuration of the reflection preventing layer 300 are not particularly limited, but an optical layer, capable of exhibiting excellent anti-glare properties or suppressing reflection in the outward direction by adjusting reflection of incident light, can be used as the reflection preventing layer 300. Typically, the reflection preventing layer 300 includes at least one of an anti-glare (AG) layer capable of reducing specular reflection by diffusing incident light, an anti-reflection (AR) layer capable of suppressing specular reflection by utilizing interference of reflected light, and a low-reflection (LR) layer configured using a low-reflective material having a low reflectance. Therefore, for example, the reflection preventing layer 300 may be configured using an anti-glare low-reflection (AGLR) layer formed by a combination of the anti-glare layer and the low-reflection layer. Incidentally, a structure, constituent components, a manufacturing method, and the like of the functional layer forming the reflection preventing layer 300 are not particularly limited, and the reflection preventing layer 300 can be formed using any functional layer.

The reflection preventing layer 300 illustrated in FIG. 36 is provided so as to cover the hard coat layer 26 (see FIG. 3) of the light modulating cell 22. However, the hard coat layer 26 and the reflection preventing layer 300 may be realized as a single layer by mixing fine particles for reflection adjustment in the hard coat layer or the like.

Although not illustrated in the drawing, the functional layer such as the reflection preventing layer 300 may be provided at another location of the light modulating device 10. For example, a functional layer such as a reflection preventing layer may be provided on a surface of the light transmissive plate 21 in addition to the reflection preventing layer 300 or in place of the reflection preventing layer 300 illustrated in FIG. 1.

In this manner, the reflection preventing layer 300 may be provided on at least one of the light modulating cell 22 and the light transmissive plate 21.

Figure 37:
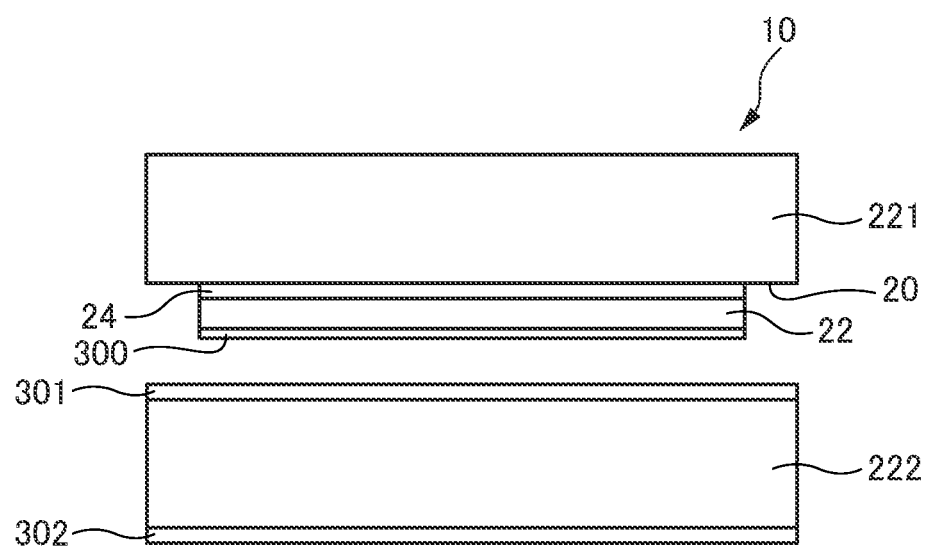
FIG. 37 is a schematic cross-sectional view illustrating another example of the light modulating device including the reflection preventing layer.

FIG. 37 is a schematic cross-sectional view illustrating another example of the light modulating device 10 including the reflection preventing layers 300, 301, and 302. The light modulating device 10 illustrated in FIG. 37 includes the first light transmissive plate 221 having the curved surface 20, the second light transmissive plate 222, the light modulating cell 22 provided between the first light transmissive plate 221 and the second light transmissive plate 222, and the optically transparent adhesive film 24 provided between the first light transmissive plate 221 and the light modulating cell 22, which is similar to the light modulating device 10 illustrated in FIG. 33.

However, in the light modulating device 10 illustrated in FIG. 37, the reflection preventing layer 300 is provided in the outermost layer of the light modulating cell 22, and the reflection preventing layers 301 and 302 are provided on a front surface (an upper surface in FIG. 37) and a back surface (a lower surface in FIG. 37) of the second light transmissive plate 222, respectively. As described above, the reflection preventing layers 300, 301, and 302 can include at least one of, for example, an anti-glare layer, an anti-reflection layer, and a low-reflection layer. In addition, the reflection preventing layers 300, 301, and 302 may mutually have the same function and configuration, or may have mutually different functions and configurations.

According to the light modulating device 10 illustrated in FIG. 37, it is possible to prevent reflection by the reflection preventing layer 302 while improving the light transmittance, for example, by the reflection preventing layers 300 and 301.

Incidentally, functional layers such as the reflection preventing layers 300, 301, and 302 may be provided at other locations of the light modulating device 10 although not illustrated. For example, a functional layer such as a reflection preventing layer may be provided on a surface of the first light transmissive plate 221 in addition to the reflection preventing layers 300, 301, and 302 or in place of the reflection preventing layers 300, 301, and 302 illustrated in FIG. 37. In addition, one or two of the reflection preventing layers 300, 301, and 302 illustrated in FIG. 37 may be omitted. In this manner, it is possible to provide the reflection preventing layer 300 on at least one of the light modulating cell 22 and the second light transmissive plate 222. Incidentally, it is often preferable to dispose a functional layer such as a reflection preventing layer on the viewer's side from the viewpoint of improving the visibility. Therefore, when the second light transmissive plate 222 is disposed to be closer to the viewer side than the first light transmissive plate 221 in the example illustrated in FIG. 37, it is often preferable to dispose a functional layer such as a reflection preventing layer or the like on the second light transmissive plate 222 rather than the first light transmissive plate 221.

The present invention is not limited to the above-described embodiments and modifications, but may include various aspects to which various modifications that can be conceived by those skilled in the art are added, and the effects exerted by the present invention are not limited to the above-described matters, either. Therefore, various additions, modifications, and partial deletions can be made to the respective elements described in the claims and the specification without departing from a technical idea and a gist of the present invention. For example, the above-described respective embodiments and modifications may be appropriately combined with each other.

REFERENCE SIGNS LIST 10 light modulating device
20 curved surface
20a three-dimensional curved surface
21 light transmissive plate
22 light modulating cell
24 optically transparent adhesive film
26 hard coat layer
29 first resin substrate
30 second resin substrate
31 first electrode layer
32 second electrode layer
33 first alignment layer
34 second alignment layer
35 liquid crystal space
36 sealing member
41 first polarizing plate
42 second polarizing plate
43 first electrode alignment layer
44 second electrode alignment layer
45 phase difference compensation film
45a phase difference compensation film
46 adhesive layer
47 protective layer
48 polarizing layer
49 liquid crystal layer
52 spacer
53 hard coat layer
55 index matching layer
61 dichroic dye
62 liquid crystal
112 lower laminated body
112A hard coat layer
112B substrate
112C hard coat layer
112D linear polarizing plate
112E alignment layer
112F plate layer
112G transparent electrode 113 upper laminated body
113A hard coat layer
113B substrate
113C hard coat layer
113D transparent electrode
113E linear polarizing plate
113F alignment layer
114 liquid crystal layer
115 spacer
122 lower laminated body
122A substrate
122B transparent electrode
122C linear polarizing plate
122D plate layer
122E alignment layer
123 upper laminated body
123A substrate
123B transparent electrode
123C linear polarizing plate
123D alignment layer
124 liquid crystal layer
125 spacer
132 lower laminated body
142 lower laminated body
142a adhesive layer
152 lower laminated body
162 lower laminated plate
221 first light transmissive plate
222 second light transmissive plate
223 adhesive layer
225 sealing member
226 enclosed space
300 reflection preventing layer
301 reflection preventing layer
302 reflection preventing layer

The invention claimed is:

1. A light modulating device comprising:
a light transmissive plate comprising one or a plurality of glass plates and having a three-dimensional curved surface;
a light modulating cell configured to change between a light shielding state and a light transmitting state, the light modulating cell comprising:
  a first laminated body comprising:
    a first resin substrate;
    a first transparent electrode;
    a first E-type linear polarizing plate; and
    a first alignment layer;
  a second laminated body comprising:
    a second resin substrate;
    a second E-type linear polarizing plate; and
    a second alignment layer;
  a liquid crystal layer of a guest-host type that is disposed between the first laminated body and the second laminated body and contains a dichroic dye;
  a sealing member that defines a liquid crystal space of the liquid crystal layer between the first alignment layer and the second alignment layer; and
  a plurality of spacers that define a thickness of the liquid crystal layer; and
an optically transparent adhesive film that is disposed between the curved surface of the light transmissive plate and the light modulating cell and attaches one side of the light modulating cell to the curved surface of the light transmissive plate,
wherein:
  the first laminated body has an extension portion being extended to an outside of the sealing member and being pasted to the curved surface of the light transmissive plate, and
  a length in a width direction of the sealing member is not less than 1 mm and not more than 5 mm.

2. The light modulating device according to claim 1, wherein at least one of the light modulating cell and the light transmissive plate further comprises an anti-reflection layer.

3. The light modulating device according to claim 1, wherein the optically transparent adhesive film has a loss tangent of not less than 0.5 and not more than 1.5.

4. A vehicle comprising the light modulating device according to claim 1.

5. A light modulating device comprising:
a light transmissive plate comprising one or a plurality of glass plates and has a curved surface;
a light modulating cell comprising:
  a first laminated body;
  a second laminated body; and
  a liquid crystal layer disposed between the first laminated body and the second laminated body; and
an optically transparent adhesive film that is disposed between the curved surface of the light transmissive plate and the light modulating cell and attaches one side of the light modulating cell to the curved surface of the light transmissive plate,
wherein:
  the first laminated body comprises:
    a first resin substrate;
    a first transparent electrode;
    a first alignment layer; and
    a first E-type linear polarizing plate provided on a side of the liquid crystal layer on the first resin substrate;
  the second laminated body comprises:
    a second resin substrate;
    a second alignment layer; and
    a second E-type linear polarizing plate provided on a side of the liquid crystal layer on the second resin substrate.

6. The light modulating device according to claim 5, wherein at least one of the light modulating cell and the light transmissive plate further comprises an anti-reflection layer.

7. The light modulating device according to claim 5, wherein the optically transparent adhesive film has a loss tangent of not less than 0.5 and not more than 1.5.

8. A vehicle comprising the light modulating device according to claim 5.

9. A light modulating device comprising:
a light transmissive plate comprising one or a plurality of glass plates and has a curved surface;
a light modulating cell comprising:
  a first laminated body comprising, in sequential order:
    a first resin substrate;
    a first transparent electrode;
    a first E-type linear polarizing plate;
    a negative C-plate layer; and
    a first alignment layer;
  a second laminated body comprising, in sequential order:
    a second resin substrate;
    a second E-type linear polarizing plate; and
    a second alignment layer; and
  a liquid crystal layer disposed between the first laminated body and the second laminated body; and an optically transparent adhesive film that is disposed between the curved surface of the light transmissive plate and the light modulating cell and attaches one side of the light modulating cell to the curved surface of the light transmissive plate.

10. The light modulating device according to claim 9, wherein at least one of the light modulating cell and the light transmissive plate further comprises an anti-reflection layer.

11. The light modulating device according to claim 9, wherein the optically transparent adhesive film has a loss tangent of not less than 0.5 and not more than 1.5.

12. The light modulating device according to claim 9, wherein:
the first laminated body further comprises an adhesive layer, and
the negative C-plate layer is stacked on the adhesive layer.

13. A vehicle comprising the light modulating device according to claim 9.

14. A light modulating device comprising:
a light transmissive plate which includes one or a plurality of glass plates and has a curved surface;
a light modulating cell comprising:
a first laminated body comprising, in sequential order:
a first resin substrate;
a first E-type linear polarizing plate;
a negative C-plate layer;
a first transparent electrode; and
a first alignment layer;
a second laminated body comprising, in sequential order:
a second resin substrate;
a second E-type linear polarizing plate; and
a second alignment layer; and
a liquid crystal layer disposed between the first laminated body and the second laminated body; and
an optically transparent adhesive film that is disposed between the curved surface of the light transmissive plate and the light modulating cell and attaches one side of the light modulating cell to the curved surface of the light transmissive plate.

15. The light modulating device according to claim 14, wherein at least one of the light modulating cell and the light transmissive plate further comprises an anti-reflection layer.

16. The light modulating device according to claim 14, wherein the optically transparent adhesive film has a loss tangent of not less than 0.5 and not more than 1.5.

17. The light modulating device according to claim 14, wherein:
the first laminated body further comprises an adhesive layer, and
the negative C-plate layer is stacked on the adhesive layer.

18. A vehicle comprising the light modulating device according to claim 14.

19. A light modulating device comprising:
a light transmissive plate having a three-dimensional curved surface;
a light modulating cell configured to change between a light shielding state and a light transmitting state, the light modulating cell comprising:
a first laminated body comprising:
a first resin substrate;
a first electrode layer; and
a first alignment layer;
a second laminated body comprising:
a second resin substrate; and
a second alignment layer;
a liquid crystal layer of a guest-host type that is disposed between the first laminated body and the second laminated body and contains a dichroic dye;
a sealing member that defines a liquid crystal space of the liquid crystal layer between the first alignment layer and the second alignment layer; and
a plurality of spacers that define a thickness of the liquid crystal layer; and
an optically transparent adhesive film that is disposed between the curved surface of the light transmissive plate and the light modulating cell and attaches one side of the light modulating cell to the curved surface of the light transmissive plate,
wherein:
the first laminated body has an extension portion being extended to an outside of the sealing member and being pasted to the curved surface of the light transmissive plate, a length in a width direction of the sealing member is not less than 1 mm and not more than 5 mm,
a thickness of the optically transparent adhesive film in a direction in which the optically transparent adhesive film and the light modulating cell are stacked is not less than 50 μm and not more than 500 μm, and
a storage elastic modulus of the optically transparent adhesive film in a room temperature environment is not less than $1 \times 10^7$ Pa and not more than $1 \times 10^8$ Pa.

20. The light modulating device according to claim 19, wherein the optically transparent adhesive film has a loss tangent of not less than 0.5 and not more than 1.5.

21. A vehicle comprising the light modulating device according to claim 19.

* * * * *